United States Patent … US 8,858,830 B2
Yamamoto et al. (45) Date of Patent: Oct. 14, 2014

(54) OPTICALLY ISOTROPIC LIQUID CRYSTAL MEDIUM AND OPTICAL DEVICE

(71) Applicants: JNC Corporation, Tokyo (JP); JNC Petrochemical Corporation, Tokyo (JP)

(72) Inventors: Shin-Ichi Yamamoto, Chiba (JP); Yasuhiro Haseba, Chiba (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 0 days.

(21) Appl. No.: 13/688,227

(22) Filed: Nov. 29, 2012

(65) Prior Publication Data

US 2013/0135544 A1    May 30, 2013

(30) Foreign Application Priority Data

Nov. 30, 2011 (JP) ................................. 2011-261795

(51) Int. Cl.
| | |
|---|---|
| C09K 19/12 | (2006.01) |
| C09K 19/52 | (2006.01) |
| C09K 19/06 | (2006.01) |
| C09K 19/30 | (2006.01) |
| C09K 19/00 | (2006.01) |
| G02F 1/1333 | (2006.01) |
| C09K 19/02 | (2006.01) |
| C09K 19/46 | (2006.01) |
| C09K 19/58 | (2006.01) |
| G02F 1/136 | (2006.01) |
| C09K 19/34 | (2006.01) |
| C09K 19/32 | (2006.01) |
| C09K 19/04 | (2006.01) |

(52) U.S. Cl.
CPC ..... *C09K 19/3402* (2013.01); *C09K 2019/3422* (2013.01); *C09K 19/46* (2013.01); *C09K 19/3444* (2013.01); *C09K 19/588* (2013.01); *G02F 1/136* (2013.01); *C09K 2019/323* (2013.01); *C09K 2019/0448* (2013.01); *C09K 2019/0466* (2013.01); *C09K 2019/3433* (2013.01); *C09K 19/0275* (2013.01); *C09K 19/3458* (2013.01); *C09K 19/586* (2013.01)
USPC ............. 252/299.66; 252/299.01; 252/299.6; 252/299.63; 428/1.1; 349/19; 349/33; 349/56

(58) Field of Classification Search
USPC ............... 252/299.01, 299.6, 299.63, 299.66; 428/1.1; 349/19, 33, 56
See application file for complete search history.

(56) References Cited

U.S. PATENT DOCUMENTS 7,722,783 B2 * 5/2010 Haseba et al. ........... 252/299.01

FOREIGN PATENT DOCUMENTS

| JP | 2003-327966 | 11/2003 |
|---|---|---|
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| WO | 98/23561 | 6/1998 |
| WO | 2005/080529 | 9/2005 |
| WO | 2005/090520 | 9/2005 |
| WO | 2006/063662 | 6/2006 |
| WO | 2010/058681 | 5/2010 |
| WO | 2010/134430 | 11/2010 |

OTHER PUBLICATIONS

Kikuchi et al., Polymer-stabilized liquid crystal blue phases, Nature Materials, Sep. 2002, pp. 64-68, vol. 1.
Hisakado et al., Large Electro-optic Kerr Effect in Polymer-stabilized Liquid-Crystalline Blue Phases, Advanced Materials, Jan. 6, 2005, pp. 96-98, vol. 17, No. 1.
Haseba et al, Electro-optic effects of the optically isotropic state induced by the incorporative effects of a polymer network and the chirality of liquid crystal, Journal of the SID, 2006, pp. 551-556, vol. 14/6.

* cited by examiner

*Primary Examiner* — Geraldina Visconti
(74) *Attorney, Agent, or Firm* — Jianq Chyun IP Office

(57) ABSTRACT

A liquid crystal composition is described, which exhibits an optically isotropic liquid crystal phase and contains an achiral component T and a chiral dopant. The achiral component T contains, as its first component, at least one compound selected from compounds represented by formula (1) in an amount of 32 wt % to 85 wt %, (1)

$$R^1\text{-}\underset{O}{\overset{O}{\bigcirc}}\text{-}\underset{L^2}{\overset{L^1}{\bigcirc}}\text{-}Z^1\text{-}\underset{L^4}{\overset{L^3}{\bigcirc}}\text{-}Z^2\text{-}\underset{L^6}{\overset{L^5}{\bigcirc}}\text{-}X^1,$$

wherein $R^1$ is alkyl, for example; $L^1, L^2, L^3, L^4, L^5$ and $L^6$ are each independently hydrogen or fluorine; $Z^1$ and $Z^2$ are each independently a single bond or —$CF_2O$—, with at least one of $Z^1$ and $Z^2$ being —$CF_2O$—; and $X^1$ is halogen, for example.

40 Claims, 1 Drawing Sheet

OPTICALLY ISOTROPIC LIQUID CRYSTAL MEDIUM AND OPTICAL DEVICE

CROSS-REFERENCE TO RELATED APPLICATIONS

This application claims the priority benefit of Japan Application No. 2011-261795, filed on Nov. 30, 2011. The entirety of the above-mentioned patent application is hereby incorporated by reference herein and made a part of this specification.

BACKGROUND OF THE INVENTION

1. Field of the Invention

This invention relates to a liquid crystal medium useful as a material for optical devices, particularly a liquid crystal medium having a wide temperature range of liquid crystal phase, a large dielectric anisotropy, and a large optical anisotropy. The invention also relates to an optical device that utilizes the liquid crystal medium, particularly an optical device that can be used in a wide temperature range and driven at a low voltage and is capable of obtaining a rapid electrooptical response.

2. Description of Related Art

Liquid crystal display (LCD) devices using liquid crystal compositions are widely used for display of clocks, calculators, word processors and so on. These LCD devices utilize the optical anisotropy and the dielectric anisotropy of liquid crystal compounds. The operation modes of LCD devices mainly include phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and so on, which use one or more polarizers for display purposes. Also, many studies have recently been done to the mode where an electric field is applied to an optically isotropic liquid crystal phase to induce electric birefringence (Patent Documents 1-16, Non-patent Documents 1-3).

Moreover, wavelength tuneable filters, wavefront control devices, liquid crystal lenses, aberrational correction devices, aperture control devices, optical head devices and so on that utilize the electric birefringence of a blue phase as one of the optically isotropic liquid crystal phases have been proposed (Patent Documents 10-12).

According to the driving mode, LCD devices can be classified into passive matrix (PM) and active matrix (AM) types. The PM type is further classified into static type, multiplex type and so on, and the AM type is classified into thin film transistor (TFT) type and metal insulator metal (MIM) type, etc.

Each of these LCD devices contains a liquid crystal composition with suitable properties. To improve the characteristics of an LCD device, it is preferred that the liquid crystal composition has suitable properties. General properties necessary for a liquid crystal compound as a component of a liquid crystal composition include:
1) chemical and physical stability,
2) a high clearing point (liquid crystal phase-isotropic phase transition temperature),
3) a low lower-limit temperature of liquid crystal phase (nematic phase, cholesteric phase, smectic phase, and optically isotropic liquid crystal phases like blue phase, etc.),
4) good compatibility with other liquid crystal compounds,
5) a suitable dielectric anisotropy, and
6) a suitable optical anisotropy.

Particularly, in view of lowering the driving voltage, a liquid crystal compound being large in the dielectric anisotropy and the optical anisotropy is preferred for an optically isotropic liquid crystal phase.

When a liquid crystal composition including a liquid crystal compound with chemical and physical stability (the $1^{st}$ property) is used in an LCD device, the voltage holding ratio can be improved.

In addition, a liquid crystal composition including a liquid crystal compound having a high clearing point or a low lower-limit temperature of liquid crystal phase (the $2^{nd}$ and $3^{rd}$ properties) can have a wide temperature range of nematic phase or optically isotropic liquid crystal phase, and therefore can be used in display devices in a wide temperature range. To exhibit better properties that are difficult to exhibit by a single compound, a liquid crystal compound is usually mixed with a number of other liquid crystal compounds to prepare a liquid crystal composition for use. Therefore, a liquid crystal compound used in an LCD device preferably has good compatibility with other liquid crystal compounds (the $4^{th}$ property). Recently, LCD devices with superior properties, especially display performances like contrast, display capacity, response time and so on, are required. In addition, regarding the liquid crystal material used, a liquid crystal composition with a low driving voltage is required. Also, in order to drive at a low voltage an optical device that is driven in an optically isotropic liquid crystal phase, it is preferred to use a liquid crystal compound with large dielectric anisotropy and optical anisotropy.

On the other hand, an optically isotropic liquid crystal composition containing a compound of formula (1) of this invention in an amount of 32 wt % to 85 wt % is good in the driving voltage, response time, contrast, and low-temperature preservation stability, or has a good balance between these physical properties. A composition containing a compound of formula (1) of this invention has been disclosed in Patent Document 15. However, in those Patent Documents, the content of the compound of formula (1) is low, so it is difficult to simultaneously attain low-voltage driving, and good low-temperature preservation stability or high contrast or high-speed response.

PRIOR-ART DOCUMENTS

[Patent Document 1] Japanese Patent Publication No. 2003-327966

[Patent Document 2] International Publication No. 2005/90520

[Patent Document 3] Japanese Patent Publication No. 2005-336477

[Patent Document 4] Japanese Patent Publication No. 2006-89622

[Patent Document 5] Japanese Patent Publication No. 2006-299084

[Patent Document 6] Japanese Patent Publication No. 2006-506477

[Patent Document 7] Japanese Patent Publication No. 2006-506515

[Patent Document 8] International Publication No. 2006/063662

[Patent Document 9] Japanese Patent Publication No. 2006-225655

[Patent Document 10] Japanese Patent Publication No. 2005-157109

[Patent Document 11] International Publication No. 2005/80529

[Patent Document 12] Japanese Patent Publication No. 2006-127707

[Patent Document 13] International Publication No. 1998/023561

[Patent Document 14] International Publication No. 2010/058681

[Patent Document 15] International Publication No. 2010/134430

[Non-patent Document 1] *Nature Materials*, 1, 64, (2002)

[Non-patent Document 2] *Adv. Mater.*, 17, 96, (2005)

[Non-patent Document 3] *Journal of the SID*, 14, 551, (2006)

SUMMARY OF THE INVENTION

Accordingly, an object of the invention is to provide a liquid crystal medium having stability to heat, light and so on, a wide temperature range of liquid crystal phase, a large optical anisotropy, a large dielectric anisotropy, and an optically isotropic liquid crystal phase. Another object is to provide a variety of optical devices including the liquid crystal medium, which can be used in a wide temperature range and have a short response time, a large contrast and a low driving voltage.

This invention provides a liquid crystal medium as a liquid crystal composition or a polymer/liquid crystal composite, a mixture, and an optical device containing the liquid crystal medium as follows.

[1] A liquid crystal composition exhibiting an optically isotropic liquid crystal phase, including an achiral component T and a chiral dopant, wherein the achiral component T contains, as a first component thereof, at least one compound selected from the group consisting of compounds represented by formula (1) in an amount of 32 wt % to 85 wt % relative to the total weight of the achiral component T,

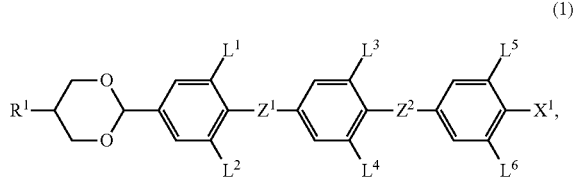

(1)

wherein $R^1$ is hydrogen, or $C_{1-20}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen; $L^1$, $L^2$, $L^3$, $L^4$, $L^5$ and $L^6$ are each independently hydrogen or fluorine; $Z^1$ and $Z^2$ are each independently a single bond or —$CF_2O$—, wherein at least one of $Z^1$ and $Z^2$ is —$CF_2O$—; and $X^1$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen atom may be replaced by fluorine.

[2] The liquid crystal composition of [1], wherein the first component of the achiral component T is at least one compound selected from the group consisting of compounds represented by formulae (1-1) to (1-3),

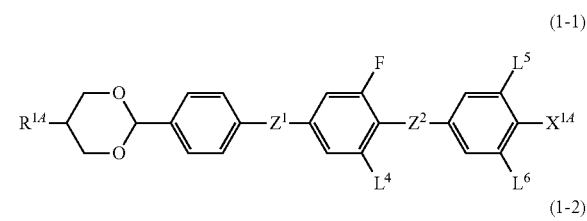

(1-1)

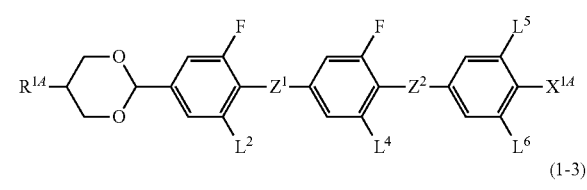

(1-2)

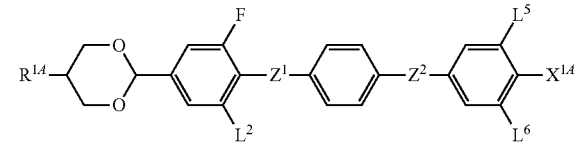

(1-3)

wherein $R^{1A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $L^2$, $L^4$, $L^5$ and $L^6$ are each independently hydrogen or fluorine; $Z^1$ and $Z^2$ are each independently a single bond or —$CF_2O$— with a proviso that at least one of $Z^1$ and $Z^2$ is —$CF_2O$—; and $X^{1A}$ is fluorine, chlorine, —$CF_3$ or —$OCF_3$.

[3] The liquid crystal composition of [1], wherein the first component of the achiral component T is at least one compound selected from the group consisting of compounds represented by formula (I-2) of [2].

[4] The liquid crystal composition of [1], wherein the first component of the achiral component T is at least one compound selected from the group consisting of compounds represented by formulae (1-1-1), (1-1-2), (1-2-1) to (1-2-7), (1-3-1) and (1-3-2),

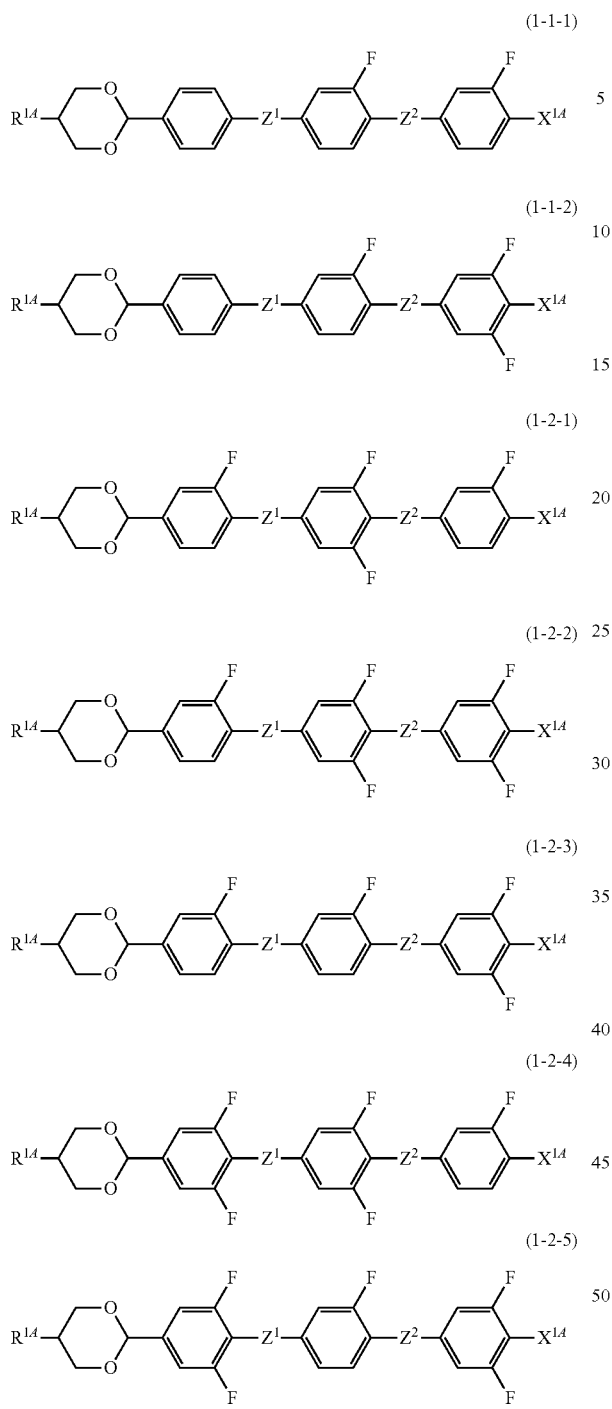
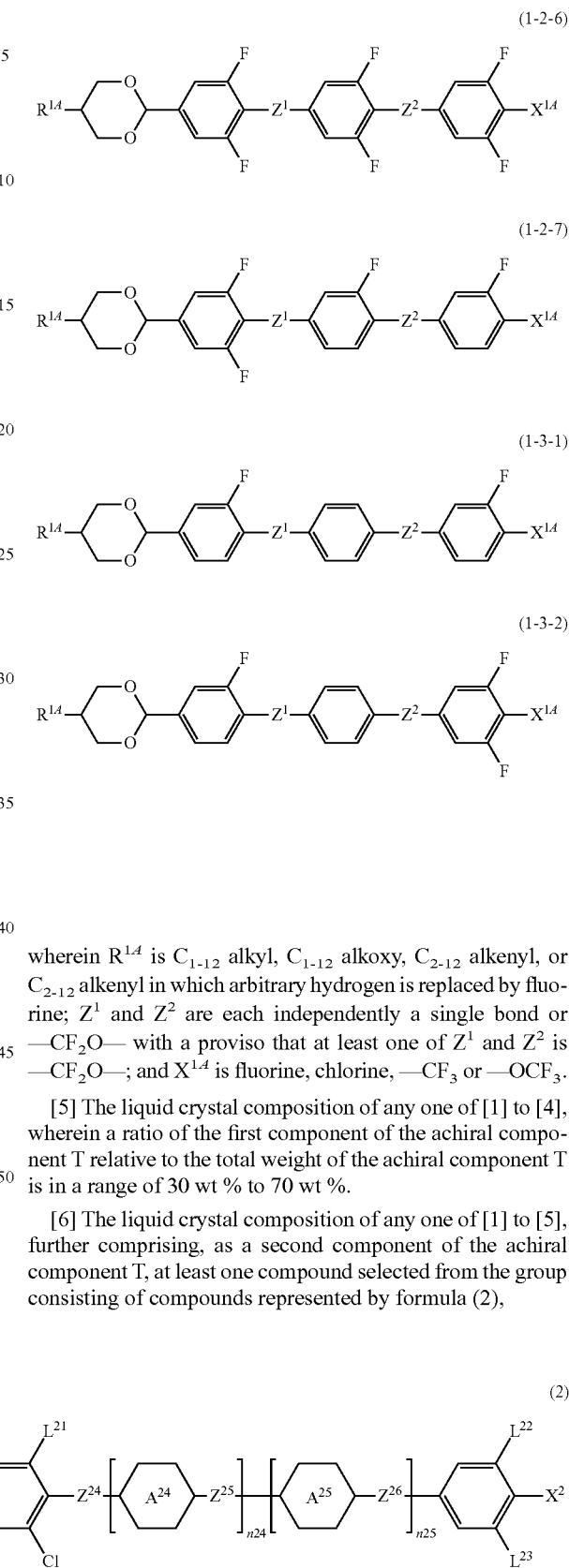

wherein $R^{14}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $Z^1$ and $Z^2$ are each independently a single bond or —$CF_2O$— with a proviso that at least one of $Z^1$ and $Z^2$ is —$CF_2O$—; and $X^{14}$ is fluorine, chlorine, —$CF_3$ or —$OCF_3$.

[5] The liquid crystal composition of any one of [1] to [4], wherein a ratio of the first component of the achiral component T relative to the total weight of the achiral component T is in a range of 30 wt % to 70 wt %.

[6] The liquid crystal composition of any one of [1] to [5], further comprising, as a second component of the achiral component T, at least one compound selected from the group consisting of compounds represented by formula (2), wherein $R^2$ is hydrogen, or $C_{1-20}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen; ring $A^{21}$, ring $A^{22}$, ring $A^{23}$, ring $A^{24}$ and ring $A^{25}$ are each independently 1,4-cyclohexylene, 1,3-dioxane-2,5-diyl, 1,4-phenylene, 1,4-phenylene with one or two hydrogen atoms being replaced by fluorine, 1,4-phenylene with one of two hydrogen atoms being replaced by fluorine and the other of the two hydrogen atoms being replaced by chlorine, $Z^{22}$, $Z^{23}$, $Z^{24}$, $Z^{25}$ and $Z^{26}$ are each pyridine-2,5-diyl, or pyrimidine-2,5-diyl; $Z^{21}$, $Z^{22}$, $Z^{23}$, $Z^{24}$ and $Z^{25}$ are each independently a single bond, or $C_{1-4}$ alkylene in which arbitrary —$CH_2$— may be replaced by —O—, —COO— or —$CF_2O$—; $L^{21}$, $L^{22}$ and $L^{23}$ are each independently hydrogen or fluorine; $X^2$ is fluorine, chlorine, —$CF_3$ or —$OCF_3$; and n21, n22, n23, n24 and n25 are each independently 0 or 1, and 2≤n21+n22+n23+n24+n25≤3.

[7] The liquid crystal composition of claim [6], wherein the second component of the achiral component T is at least one compound selected from the group consisting of compounds represented by formulae (2-1-1-2), (2-1-2-1), (2-1-3-1), (2-1-3-2), (2-1-4-2) and (2-1-4-3),

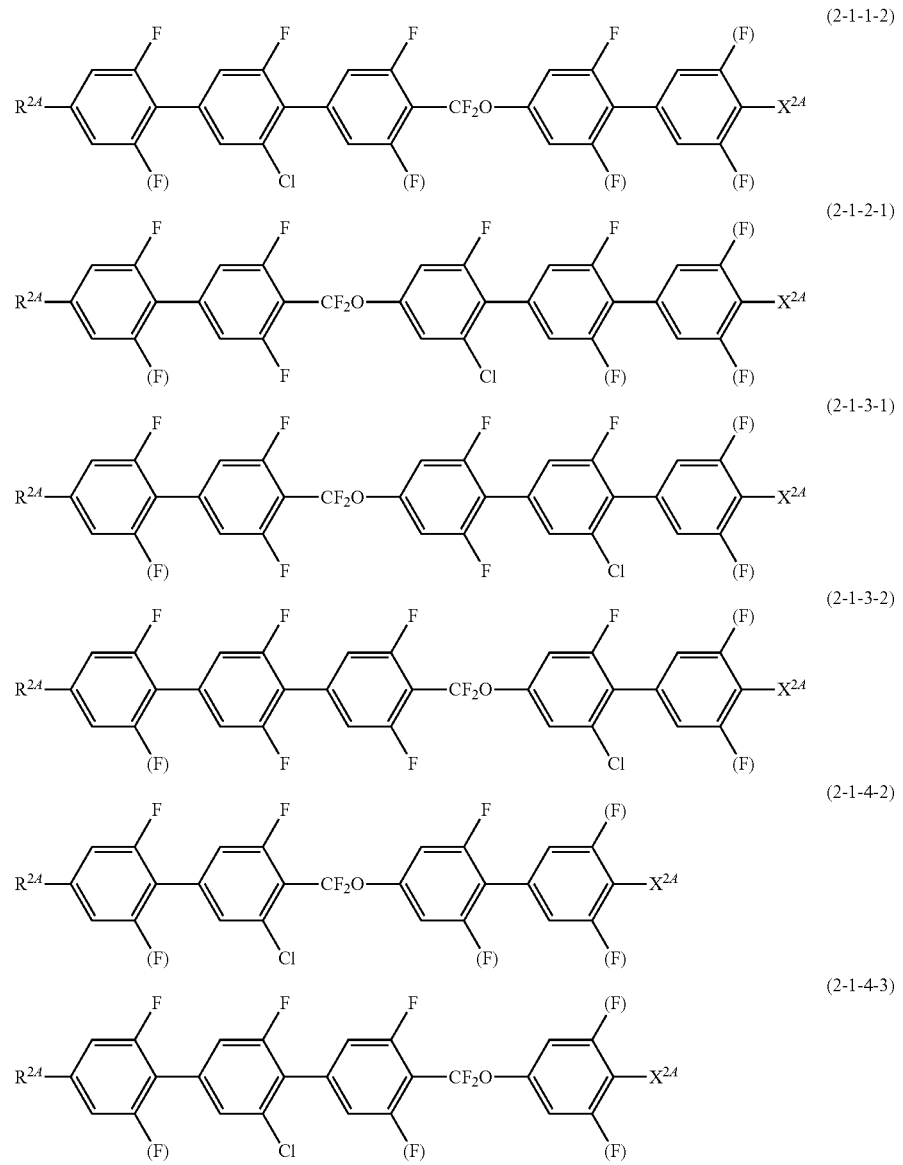

wherein $R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{2A}$ is fluorine, chlorine, —$CF_3$ or —$OCF_3$.

[8] The liquid crystal composition of claim [7], wherein the second component of the achiral component T is at least one compound selected from the group consisting of compounds represented by formula (2-1-1-2).

[9] The liquid crystal composition of [7], wherein the second component of the achiral component T is at least one compound selected from the group consisting of compounds represented by formula (2-1-4-3).

[10] The liquid crystal composition of [7], wherein the second component of the achiral component T is a mixture of at least one compound selected from the group consisting of compounds represented by formula (2-1-1-2) and at least one compound selected from the group consisting of compounds represented by formula (2-1-4-3).

[11] The liquid crystal composition of any one of [6]-[10], wherein a ratio of the second component of the achiral component T relative to the total weight of the achiral component T is in the range of 5 wt % to 70 wt %.

[12] The liquid crystal composition of any one of [1]-[11], further comprising, as a third component of the achiral component T, at least one compound selected from the group consisting of compounds represented by formula (3),

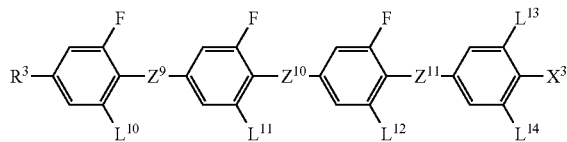

(3)

wherein $R^3$ is hydrogen, or $C_{1-20}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen; $Z^9$, $Z^{10}$ and $Z^{11}$ are each independently a single bond, —COO— or —$CF_2$O—, with a proviso that at least one of $Z^9$, $Z^{10}$ and $Z^{11}$ is —$CF_2$O—; $L^{10}$, $L^{11}$, $L^{12}$, $L^{13}$ and $L^{14}$ are each independently hydrogen or fluorine; and $X^3$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by fluorine.

[13] The liquid crystal composition of [12], wherein the third component of the achiral component T is at least one compound selected from the group consisting of compounds represented by formulae (3-2)-(3-3),

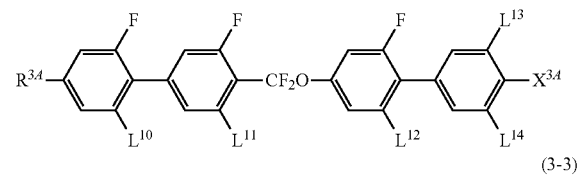

(3-2)

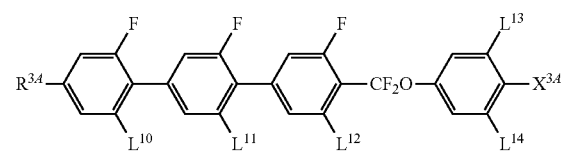

(3-3)

wherein each $R^{3A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{3A}$ is fluorine, chlorine, —$CF_3$ or —$OCF_3$; and $L^{10}$-$L^{14}$ are each independently hydrogen or fluorine.

[14] The liquid crystal composition of [12] or [13], wherein in formula (3), $R^3$ has a straight chain, and in formulae (3-2) and (3-3), $R^{3A}$ has a straight chain.

[15] The liquid crystal composition of [13] or [14], wherein the third component of the achiral component T is at least one compound selected from the group consisting of compounds represented by formula (3-2).

[16] The liquid crystal composition of [13] or [14], wherein the third component of the achiral component T is at least one compound selected from the group consisting of compounds represented by formula (3-3).

[17] The liquid crystal composition of any one of [12]-[16], wherein the ratio of the third component of the achiral component T relative to the total weight of the achiral component T is in the range of 5 wt % to 70 wt %.

[18] The liquid crystal composition of any one of [12]-[17], wherein relative to the total weight of the achiral component T, the ratio of the first component of the achiral component T is in the range of 3 wt % to 70 wt %, the ratio of the second component of the achiral component T is in the range of 10 wt % to 50 wt %, and the ratio of the third component of the achiral component T is in the range of 10 to 50 wt %.

[19] The liquid crystal composition of any one of [1]-[18], further comprising, as a fourth component of the achiral component T, at least one compound selected from the group consisting of compounds represented by formula (4),

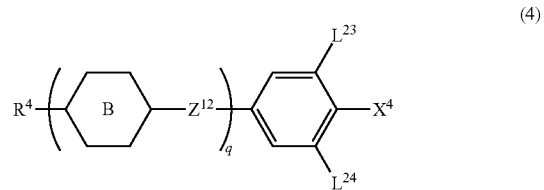

(4)

wherein $R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine; each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene, or pyrimidine-2,5-diyl; each $Z^{12}$ is independently a single bond, ethylene, —COO—, —OCO—, —$CF_2$O— or —$OCF_2$—; $L^{23}$ and $L^{24}$ are each independently hydrogen or fluorine; $X^4$ is fluorine, chlorine, —$CF_3$ or —$OCF_3$; q is 1, 2, 3 or 4; when q is 3 or 4, one $Z^{12}$ is —$CF_2$O— or —$OCF_2$—; and when q is 3, not all of the rings B are fluorine-substituted 1,4-phenylene.

[20] The liquid crystal composition of [19], wherein the fourth component of the achiral component T is at least one compound selected from the group consisting of compounds represented by formulae (4-1)-(4-9),

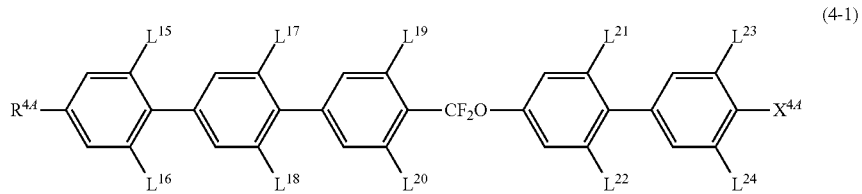
(4-1)
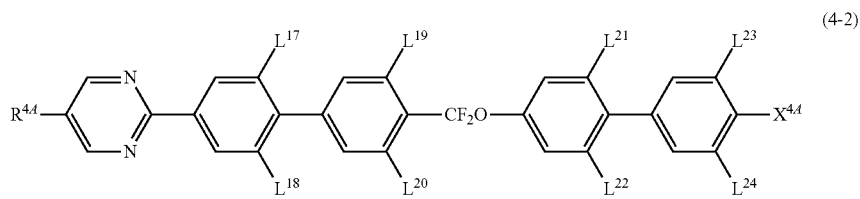
(4-2)
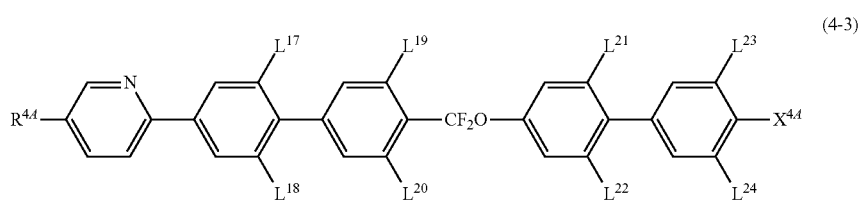
(4-3)
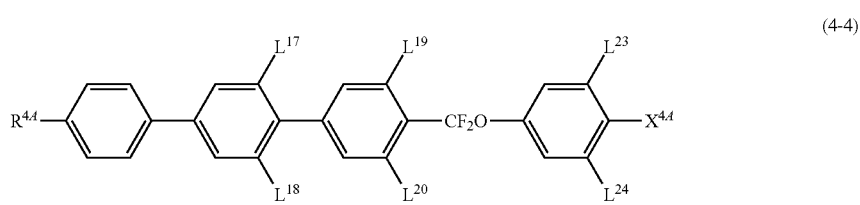
(4-4)
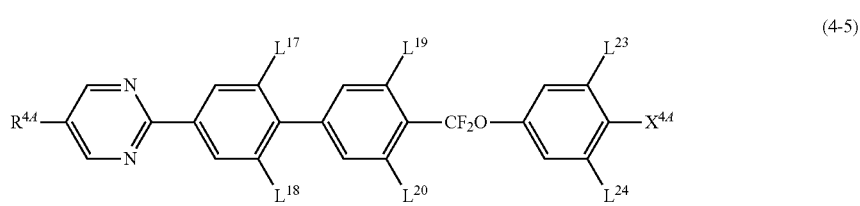
(4-5)
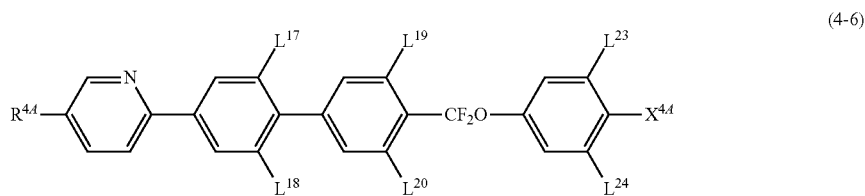
(4-6)
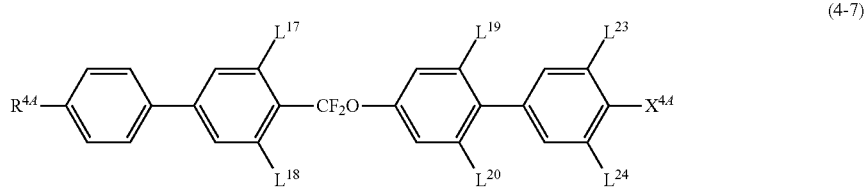
(4-7)
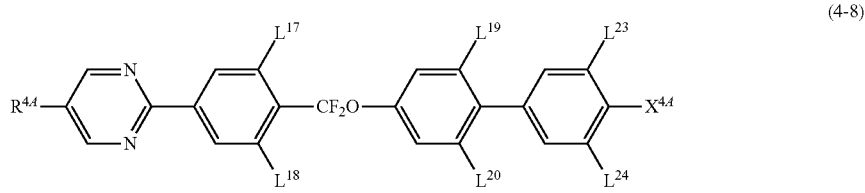
(4-8)

-continued (4-9)

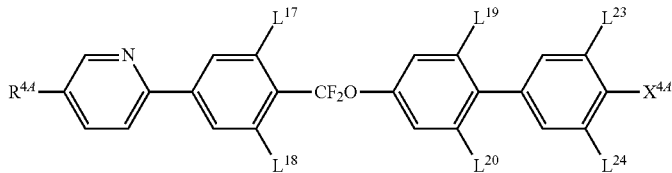

wherein each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{3A}$ is fluorine, chlorine, —$CF_3$ or —$OCF_3$; and $L^{15}$-$L^{24}$ are each independently hydrogen or fluorine.

[21] The liquid crystal composition of any one of [1]-[20], further comprising, as a fifth component of the achiral component T, at least one compound selected from the group consisting of compounds represented by formula (5), (5)

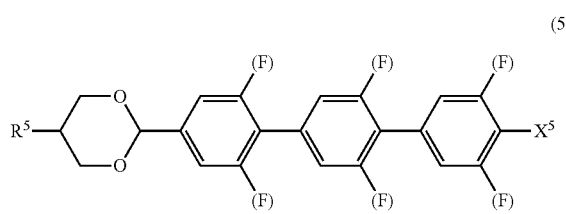

wherein $R^5$ is hydrogen, or $C_1$-20 alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen; each (F) is independently hydrogen or fluorine; and $X^5$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by fluorine.

[22] The liquid crystal composition of [21], wherein the fifth component of the achiral component T is at least one compound selected from the group consisting of compounds represented by formulae (5-1) to (5-3), (5-1)

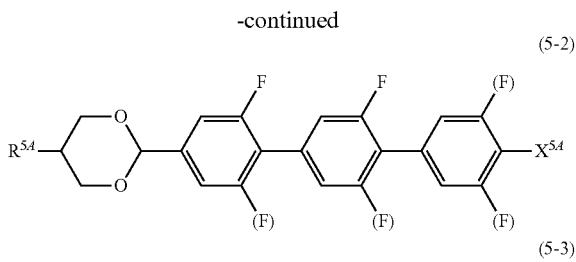

(5-2)

(5-3)

wherein $R^{5A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{5A}$ is fluorine, chlorine, —$CF_3$ or —$OCF_3$.

[23] The liquid crystal composition of [21] or [22], wherein the ratio of the fifth component of the achiral component T relative to the total weight of the achiral component T is in a range of 1 wt % to 20 wt %.

[24] The liquid crystal composition of any one of [1]-[23], further comprising, as a sixth component of the achiral component T, at least one compound selected from the group consisting of compounds represented by formula (6), (6)

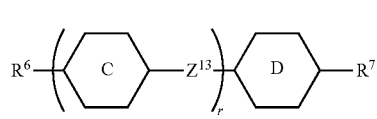

wherein $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine; ring C and ring D are each independently 1,4-cyclohexylene, 1,4-phenylene, 2-fluoro-1,4-phenylene, 3-fluoro-1,4-phenylene, or 2,5-difluoro-1,4-phenylene; each $Z^{13}$ is independently a single bond, ethylene, —COO— or —COO—; and r is 1, 2 or 3.

[25] The liquid crystal composition of [24], wherein the sixth component of the achiral component T is at least one compound selected from the group consisting of compounds represented by formulae (6-1)-(6-13), (6-1)

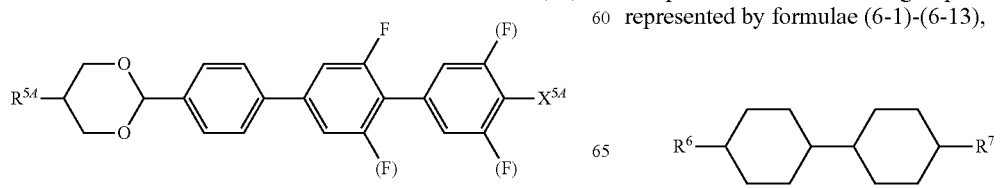

(6-2)
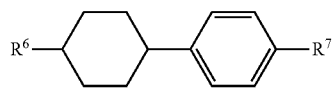

(6-3)
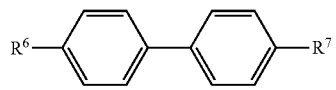

(6-4)
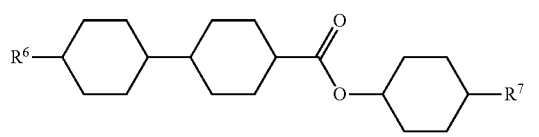

(6-5)
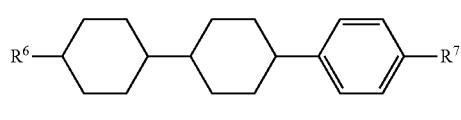

(6-6)

(6-7)
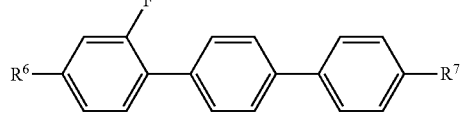

(6-8)
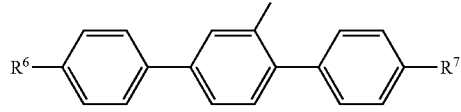

(6-9)
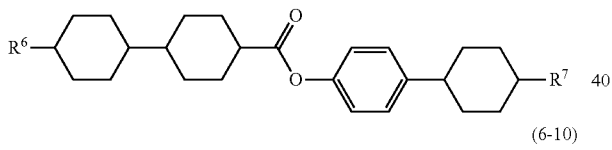

(6-10)
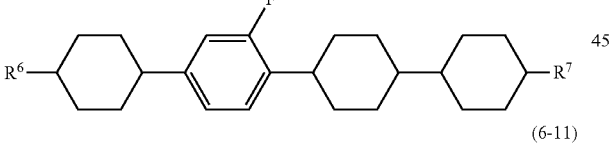

(6-11)
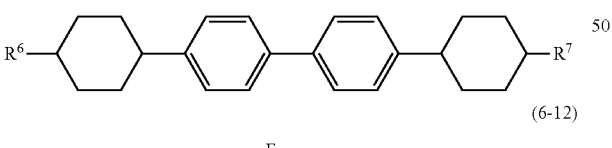

(6-12)
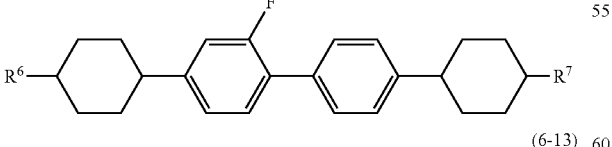

(6-13)
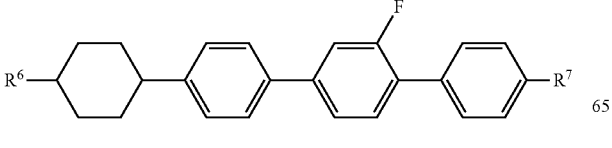

wherein $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine.

[26] The liquid crystal composition of [25], wherein the sixth component of the achiral component T is at least one compound selected from the group consisting of compounds represented by formula (6-3) of [25].

[27] The liquid crystal composition of [25], wherein the sixth component of the achiral component T is at least one compound selected from the group consisting of compounds represented by formula (6-8) of [25].

[28] The liquid crystal composition of [25], wherein the sixth component of the achiral component T is at least one compound selected from the group consisting of compounds represented by formula (6-13) of [25].

[29] The liquid crystal composition of any one of [1]-[28], wherein the chiral dopant is at least one compound selected from the group consisting of compounds represented by formulae (K1)-(K5), (K1)
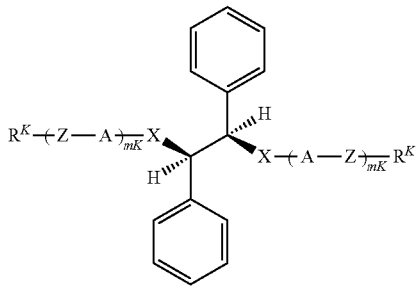

(K2)
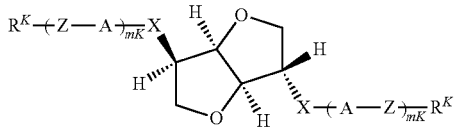

(K3)
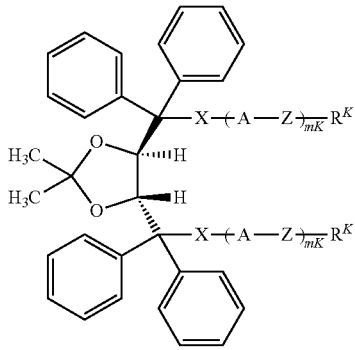

(K4)
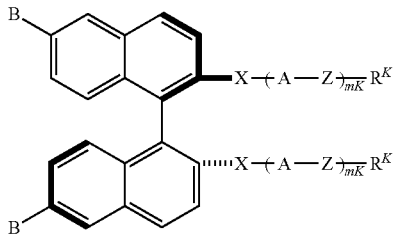

-continued (K5)

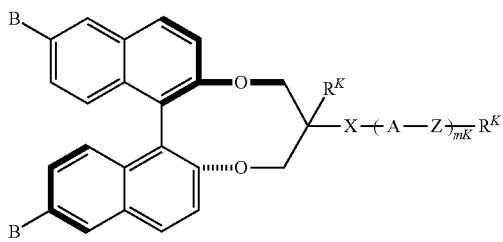

wherein each $R^K$ is independently hydrogen, halogen, —C≡N, —N═C═O, —N═C═S, or $C_{1-20}$ alkyl in which arbitrary —CH$_2$— may be replaced by —O—, —S—, —COO— or —COO—, arbitrary —CH$_2$—CH$_2$— may be replaced by —CH═CH—, —CF═CF— or —C≡C—, and arbitrary hydrogen may be replaced by halogen; each A is independently an aromatic six- to eight-membered ring, a non-aromatic three- to eight-membered ring, or a fused ring of 9 or more carbons, and in these rings arbitrary hydrogen may be replaced by halogen, $C_{1-3}$ alkyl or $C_{1-3}$ haloalkyl, —CH$_2$— may be replaced by —O—, —S— or —NH—, and —CH═ may be replaced by —N═; each B is independently hydrogen, halogen, $C_{1-3}$ alkyl, $C_{1-3}$ haloalkyl, an aromatic six- to eight-membered ring, a non-aromatic three- to eight-membered ring, or a fused ring of 9 or more carbons, and in these rings arbitrary hydrogen may be replaced by halogen, $C_{1-3}$ alkyl or $C_{1-3}$ haloalkyl, —CH$_2$— may be replaced by —O—, —S— or —NH—, and —CH═ may be replaced by —N═; each Z is independently a single bond, or $C_{1-8}$ alkylene in which arbitrary —CH$_2$— may be replaced by —O—, —S—, —COO—, —OCO—, —CSO—, —OCS—, —N═N—, —CH═N— or —N═CH—, arbitrary —CH$_2$—CH$_2$— may be replaced by —CH═CH—, —CF═CF— or —C≡C— and arbitrary hydrogen may be replaced by halogen; X is a single bond, —COO—, —OCO—, —CH$_2$O—, —OCH$_2$—, —CF$_2$O—, —OCF$_2$— or —CH$_2$CH$_2$—; and mK is an integer of 1-4.

[30] The liquid crystal composition of [29], wherein the chiral dopant is at least one compound selected from the group consisting of compounds represented by formulae (K4-1)-(K4-6) and (K5-1)-(K5-3).

(K4-1)

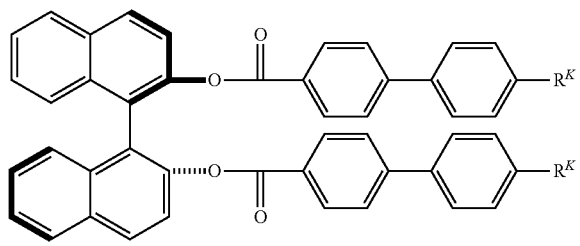

(K4-2)

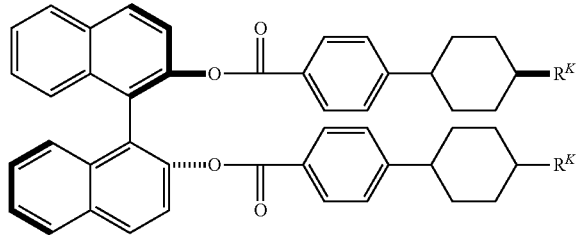

(K4-3)

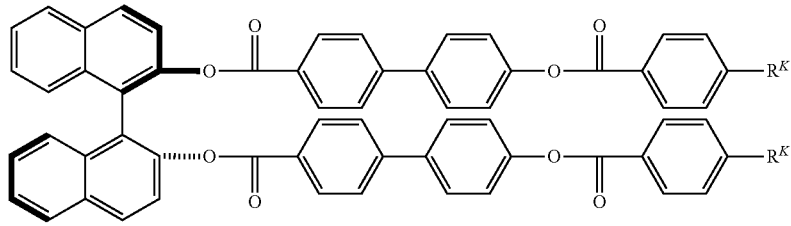

(K4-4)

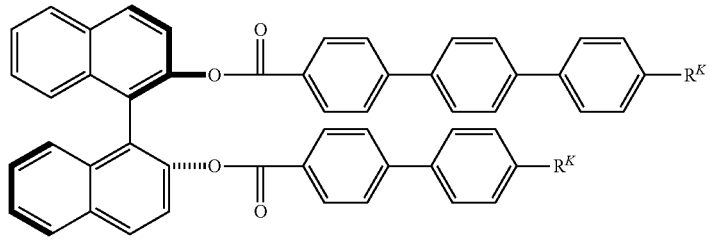

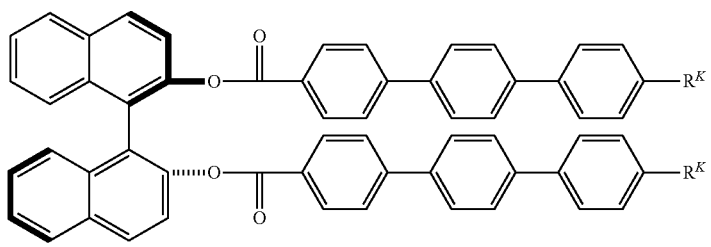

(K4-5)

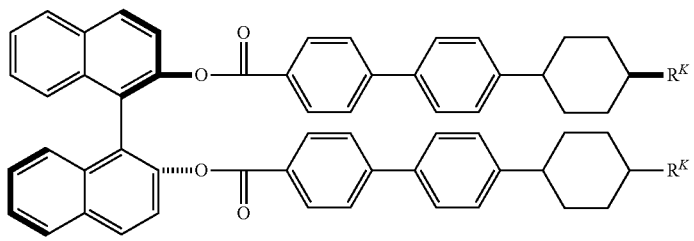

(K4-6)

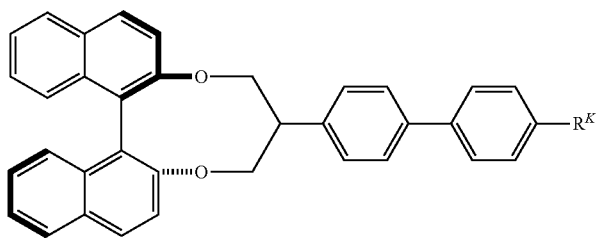

(K5-1)

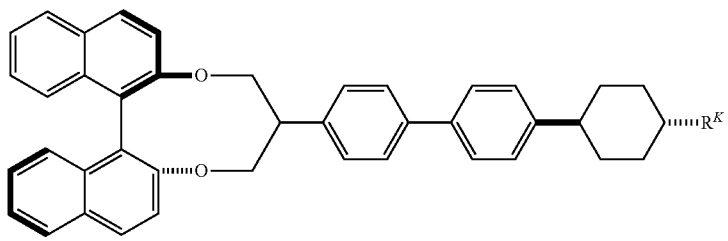

(K5-2)

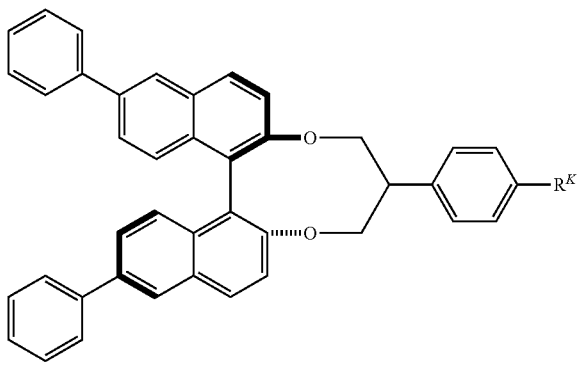

(K5-3)

wherein each $R^K$ is independently $C_{3-10}$ alkyl or $C_{3-10}$ alkoxy, and in the alkyl and the alkoxy, arbitrary —$CH_2$— may be replaced by —CH=CH—, and —O— is not adjacent to —C≡C—.

[31] The liquid crystal composition of any one of [1]-[30], which exhibits a chiral nematic phase at any temperature in a range of 70° C. to −20° C. and has a helical pitch of 700 nm or less at a temperature in at least a part of the range of 70° C. to −20° C.

[32] The liquid crystal composition of any one of [1]-[31], further comprising at least one antioxidant, at least one ultraviolet absorbent, or at least one antioxidant and at least one ultraviolet absorbent.

[33] A mixture, comprising the liquid crystal composition of any one of [1] to [32], and a polymerizable monomer.

[34] A polymer/liquid crystal composite material, being obtained by polymerizing the mixture of [33] and used in a device driven in an optically isotropic liquid crystal phase.

[35] The polymer/liquid crystal composite material of [34], wherein the mixture is polymerized in an isotropic phase or in an optically isotropic liquid crystal phase.

[36] An optical device, comprising: two substrates, electrodes disposed on a surface of one or both of the substrates, a liquid crystal medium disposed between the two substrates, and electric field applying means for applying an electric field to the liquid crystal medium via the electrodes, wherein the liquid crystal medium is the liquid crystal composition of any one of [1]-[32], or the polymer/liquid crystal composite material of [34] or [35].

[37] An optical device, comprising: two substrates with one or both thereof disposed with electrodes thereon and at least one thereof being transparent, a liquid crystal medium disposed between the two substrates, a polarizer disposed on an outer side of the substrates, and electric field applying means for applying an electric field to the liquid crystal medium via the electrodes, wherein the liquid crystal medium is the liquid crystal composition of any one of [1] to [32], or the polymer/liquid crystal composite material of [34] or [35].

[38] The optical device of [36] or [37], wherein on at least one of the two substrates, the electrodes are constructed in a manner such that the electric field is applied in at least two directions.

[39] The optical device of [36] or [37], wherein the two substrates are arranged parallel to each other, and on one or both of the two substrates, the electrodes are constructed in a manner such that the electric field is applied in at least two directions.

[40] The optical device of [36] or [37], wherein the electrodes are disposed in a matrix form to form pixel electrodes, and each pixel is provided with an active device being a thin film transistor (TFT).

In this invention, the term "liquid crystal compound" means a compound with a mesogen but is not limited to a compound having a liquid crystal phase. The "liquid crystal medium" is a generic term of a liquid crystal composition and a polymer/liquid crystal composite. Moreover, the term "optical device" refers to various devices using electrooptical effect to achieve light modulation or optical switching, etc., for example, display devices (LCD devices), light modulation devices used in optical communication systems, optical signal processing or various sensor systems. With respect to light modulation that utilizes a change in the refractive index of an optically isotropic liquid crystal medium due to voltage application, the Kerr effect is known. The Kerr effect is an effect that the electric birefringence $\Delta n(E)$ is proportional to the square of the electric field E, i.e. $\Delta n(E)=K \cdot \lambda \cdot E^2$ (K=Kerr constant, $\lambda$=wavelength), for a material exhibiting the Kerr effect. Herein, the "electric birefringence" is the optical anisotropy induced by applying an electric field to the isotropic liquid crystal medium.

The terms in the specification are defined below. "Liquid crystal compound" is a generic term of compounds having a liquid crystal phase, such as nematic phase or smectic phase etc., and compounds having no liquid crystal phase but being useful as a component of a liquid crystal composition. A chiral dopant is an optically active compound, which is added to give a desired twisted molecular arrangement to the liquid crystal composition. "LCD device" is a generic term of LCD panels and LCD modules. "Liquid crystal compound", "liquid crystal composition" and "LCD device" are often simply called "compound", "composition" and "device", respectively. Further, e.g., the phase-limit temperature of a liquid crystal phase is the phase transition temperature from the liquid crystal phase to the isotropic phase, and often simply called "clearing point" or "upper-limit temperature". The lower-limit temperature of a liquid crystal phase is often simply called "lower-limit temperature". A compound represented by formula (1) is often just called a compound (1). This rule also applies to a compound represented by formula (2), etc. In formulae (2)-(5), the symbols $A^1$, B and C, etc. surrounded by hexagons respectively correspond to ring $A^1$, ring B and ring C, etc. A compound content expressed by a percentage is a weight percentage (wt %) relative to the total weight of the composition. Numerous identical symbols, such as the rings $A^1$, $Y^1$ or B, etc., are included in the same or different formulae, but the groups represented by the same symbol can be identical or different from each other.

"Arbitrary" denotes not only arbitrary position but also arbitrary number, except for the case where the number is zero. The expression "arbitrary A may be replaced by B, C or D" not only means arbitrary A may be replaced by B, arbitrary A may be replaced by C or arbitrary A may be replaced by D, but also means that a plurality of A's may be replaced by at least two of B, C and D. For example, the scope of "alkyl in which arbitrary —$CH_2$— may be replaced by —O— and arbitrary —$CH_2$—$CH_2$— may be replaced by —CH=CH—" includes alkyl, alkenyl, alkoxy, alkoxyalkyl, alkoxyalkenyl and alkenyloxyalkyl, etc. Further, in this invention, two contiguous —$CH_2$— being replaced by —O— to form —O—O— is not preferable, so is the terminal —$CH_2$— of alkyl being replaced by —O—. This invention will be further described below. The terminal groups, rings and linking groups, etc. of the compound of formula (1) will also be illustrated by way of preferred examples.

Effects of the Invention

By containing a compound of formula (1) in a large amount, the liquid crystal composition of this invention is stable to heat and light, etc., exhibits a high upper-limit temperature and a low lower-limit temperature of an optically isotropic liquid crystal phase, and has a low driving voltage, a high contrast and short response time in a device driven in an optically isotropic liquid crystal phase. The polymer/liquid crystal composite material of this invention exhibits an optically isotropic liquid crystal phase having a high upper-limit temperature and a low lower-limit temperature, and has a low driving voltage, a high contrast and a short response time in a device driven in an optically isotropic liquid crystal phase.

The optical device of this invention driven in an optically isotropic liquid crystal phase has a wide temperature range for use, a short response time, a high contrast and a low driving voltage.

Figure 1:
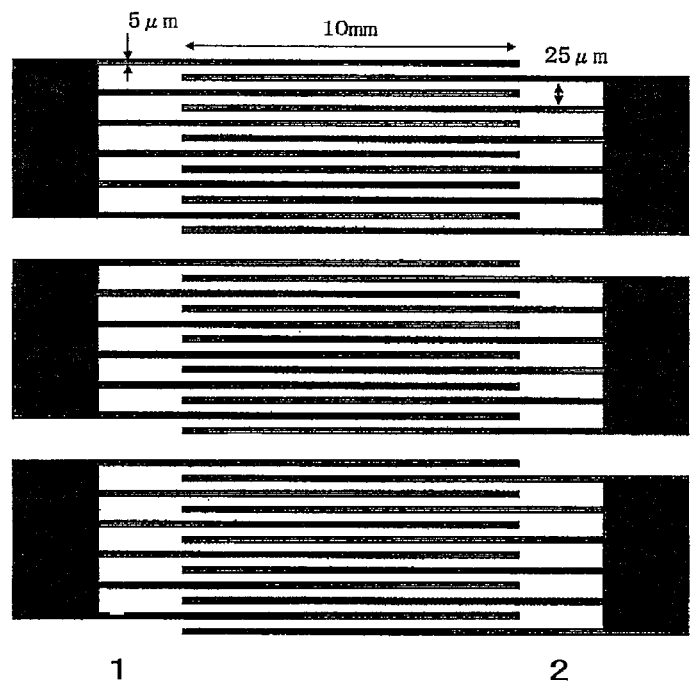
FIG. 1 shows a comb-like electrode substrate used in an embodiment.

DESCRIPTION OF THE EMBODIMENTS 1-1. Compound (1)

The liquid crystal composition exhibiting an optically isotropic liquid crystal phase of this invention includes an achiral component T and a chiral dopant, wherein the achiral component T contains, as a first component thereof, a compound represented by formula (1) in an amount of 32 wt % to 85 wt %. A first aspect of this invention relates to a composition containing the first component and other components not specifically mentioned in this specification. The compound of formula (1) is described first.

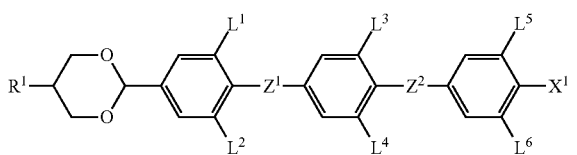

(1)

In formula (1), $R^1$ is hydrogen, or $C_1$-20 alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen. $L^1, L^2, L^3, L^4, L^5$ and $L^6$ are each independently hydrogen or fluorine. $Z^1$ and $Z^2$ are each independently a single bond or —$CF_2O$—, with a proviso that at least one of $Z^1$ and $Z^2$ is —$CF_2O$—. $X^1$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen atom may be replaced by fluorine.

The preferred stereo configuration of —CH=CH— in an alkenyl depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of a liquid crystal phase. This is detailed in *Mol. Cryst. Liq. Cryst.*, 1985, 131, 109 and *Mol. Cryst. Liq. Cryst.*, 1985, 131, 327.

Specific examples of alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

Specific examples of alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

Specific examples of alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of alkenyloxy include —OCH$_2$CH=CH$_2$, —OCH$_2$CH=CHCH$_3$ and —OCH$_2$CH=CHC$_2$H$_5$.

Specific examples of alkynyl include —C≡CH, —C≡CCH$_3$, —CH$_2$C≡CH, —C≡CC$_2$H$_5$, —CH$_2$C≡CC$_2$H$_5$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (1), $X^1$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —COO—, —CH=CH—, —CF=CF— or —C≡C—, arbitrary hydrogen atom may be replaced by fluorine.

Specific examples of alkyl in which arbitrary hydrogen is replaced by fluorine are —CH$_2$F, —CF$_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$ and —CHFCF$_2$CF$_3$.

Specific examples of alkoxy in which arbitrary hydrogen is replaced by fluorine atom are —OCH$_2$F, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$ and —OCHFCF$_2$CF$_3$.

Specific examples of alkenyl in which arbitrary hydrogen is replaced by fluorine are —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of preferred $X^1$ are fluorine, chlorine, —CF$_3$, —CHF$_2$, —OCF$_3$ and —OCHF$_2$. Examples of more preferred $X^1$ are fluorine, chlorine, —CF$_3$ and —OCF$_3$. When $X^1$ is chlorine or fluorine, the compound of formula (1) has a low melting point and a particularly good compatibility with other liquid crystal compounds. When $X^1$ is —CF$_3$, —CHF$_2$, —OCF$_3$ or —OCHF$_2$, a particularly large dielectric anisotropy is shown.

The preferred compounds among the compounds of formula (1) are expressed by formulae (1-1) to (1-3).

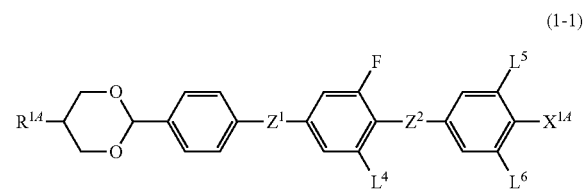

(1-1)

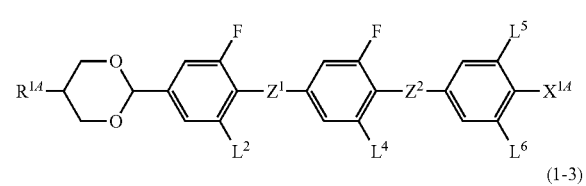

(1-2)

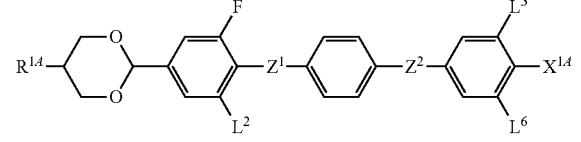

(1-3)

In formulae (1-1) to (1-3), $R^{1A}$ is $C_{1-12}$ alkyl, $C_{1-12}$ alkoxy, $C_{2-12}$ alkenyl, or $C_{2-12}$ alkenyl in which arbitrary hydrogen is replaced by fluorine. $L^2, L^4, L^5$ and $L^6$ are each independently hydrogen or fluorine. $Z^1$ and $Z^2$ are each independently a single bond or —CF$_2$O—, with a proviso that at least one of $Z^1$ and $Z^2$ is —CF$_2$O—. $X^{1A}$ is fluorine, chlorine, —CF$_3$ or —OCF$_3$.

Among the compounds expressed by formulae (1-1) to (1-3), the more preferred compounds are those of formulae (1-1-1), (1-1-2), (1-2-1)-(1-2-7), (1-3-1) and (1-3-2), wherein those of formulae (1-2-1)-(1-2-5) are even more preferred.

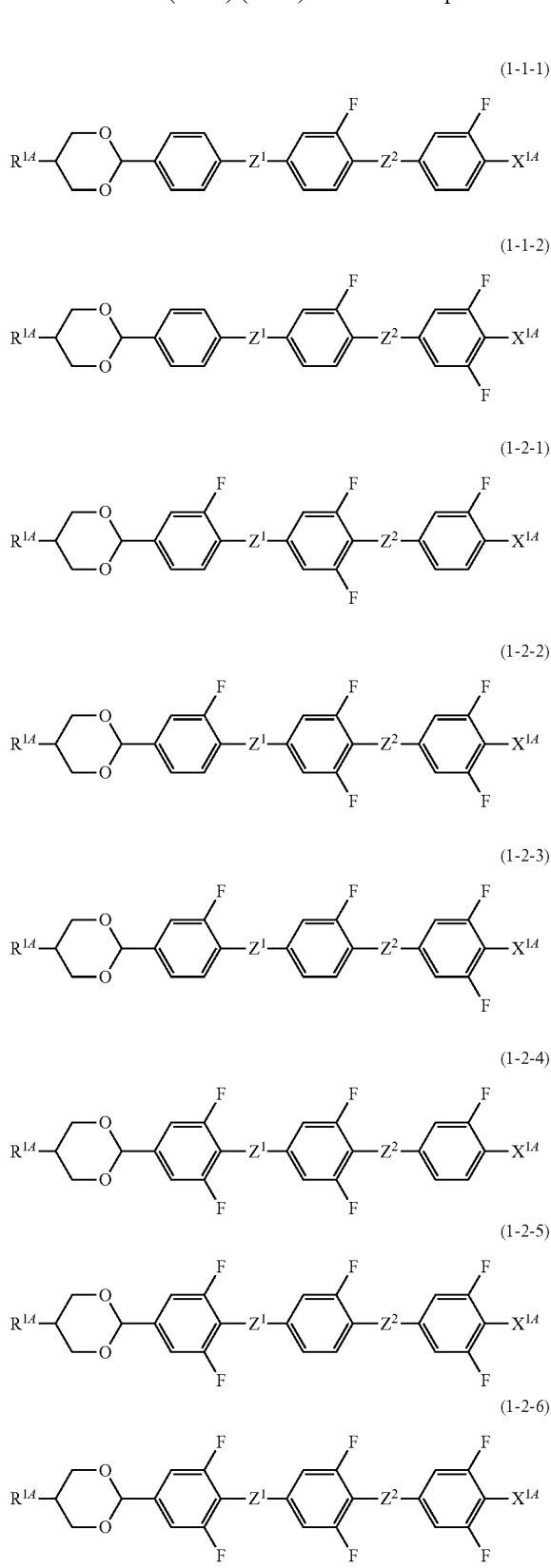

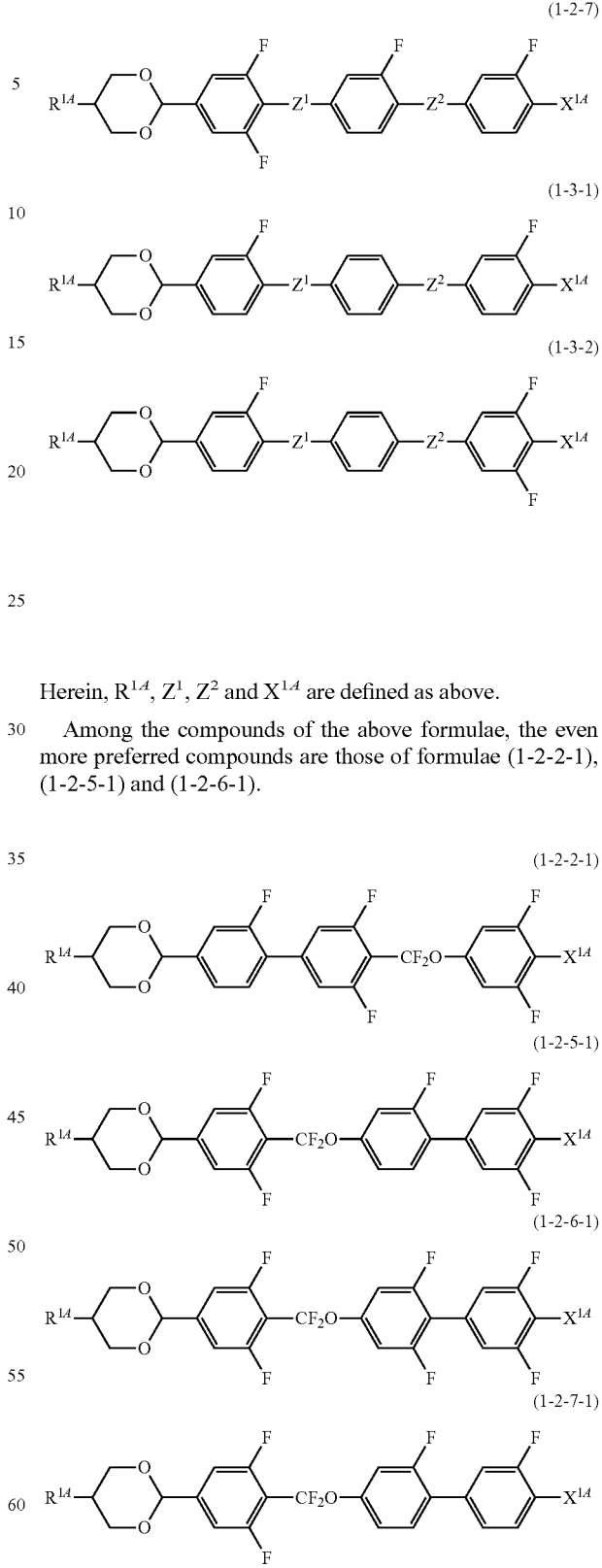

Herein, $R^{1A}$, $Z^1$, $Z^2$ and $X^{1A}$ are defined as above.

Among the compounds of the above formulae, the even more preferred compounds are those of formulae (1-2-2-1), (1-2-5-1) and (1-2-6-1).

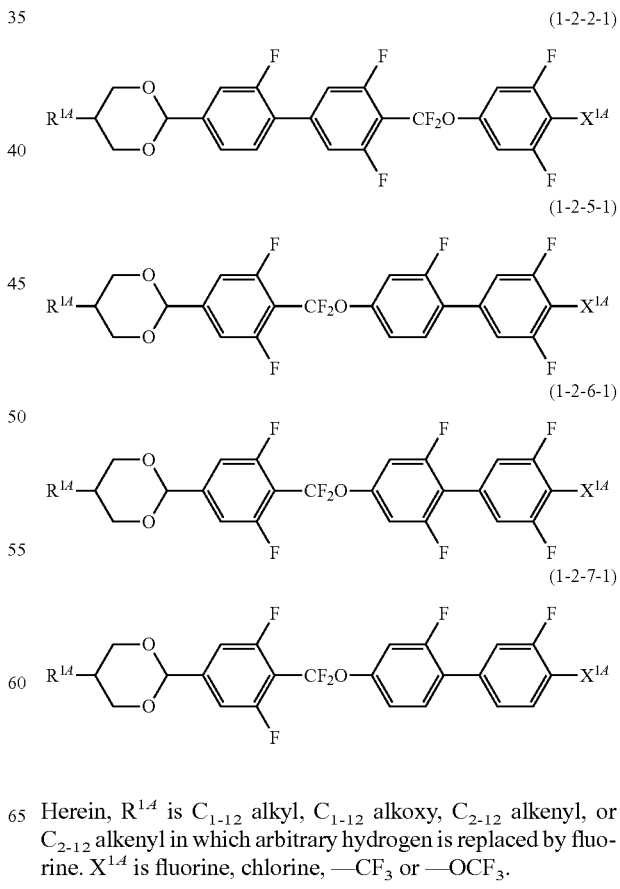

Herein, $R^{1A}$ is $C_{1-12}$ alkyl, $C_{1-12}$ alkoxy, $C_{2-12}$ alkenyl, or $C_{2-12}$ alkenyl in which arbitrary hydrogen is replaced by fluorine. $X^{1A}$ is fluorine, chlorine, —$CF_3$ or —$OCF_3$.

1-2. Properties of Compound (1)

The compound (1) used in this invention is further detailed below. A compound (1) is a liquid crystal compound having a dioxane ring, three benzene rings, and at least one —$CF_2O$— as a linking group. This compound has very stable physical and chemical properties under the conditions where the device is usually used, and, in spite of having a high clearing point, has a relatively good compatibility with other liquid crystal compounds. A composition containing such a compound is stable under the conditions where the device is usually used. Therefore, the composition has a larger temperature range of optically isotropic liquid crystal phase, and thus can be used in a display device in a wide temperature range. Moreover, the compound is useful as a component for lowering the driving voltage of a composition driven in an optically isotropic liquid crystal phase. Moreover, when the composition prepared from the compound (1) and the chiral dopant exhibits a blue phase, a uniform blue phase without co-existence of N* phase and isotropic phase is easily formed. That is, the compound (1) is a compound easily exhibiting a uniform blue phase. Moreover, a very large dielectric anisotropy is exhibited.

When the right terminal group $X^1$ is fluorine, chlorine, —$SF_5$, —$CF_3$, —$OCF_3$ or —CH=CH—$CF_3$, the dielectric anisotropy is large. When $X^1$ is fluorine, —$CF_3$ or —$OCF_3$, the compound is chemically stable.

1-3. Synthesis of Compound (1)

The synthesis of the compound (1) is described below. A compound (1) can be synthesized by a suitable combination of organic synthesis methods. The methods for introducing target terminal groups, rings and linking groups in the starting compound are described in, for example, *Organic Syntheses* (John Wiley & Sons, Inc.), *Organic Reactions* (John Wiley & Sons, Inc.), *Comprehensive Organic Synthesis* (Pergamon Press), and *New Lecture on Experimental Chemistry* (Maruzen).

For example, it is possible to use the method of Japanese Patent No. 2959526 to synthesize a compound of formula (1) of this invention.

Because the compound of formula (1) has a high clearing point, a large dielectric anisotropy and a large optical anisotropy, the amount thereof relative to the total weight of the component T is suitably from 32 wt % to 85 wt %, preferably from 40 wt % to 80 wt %, more preferably from 40 wt % to 75 wt %, and particularly preferably from 50 wt % to 75 wt %. When the amount is in this range, the driving voltage is low, the contrast is large, the response time is short, and the low-temperature compatibility is good.

The compound (1) used in this invention may include one compound, or include two or more compounds.

2-1. Compound (2)

The 2$^{nd}$ aspect of this invention is a liquid crystal composition that contains the first component and, as a second component of the achiral component T, at least one compound selected from the group consisting of compounds expressed by formula (2), which is described as follow.

Herein, $R^2$ is hydrogen, or $C_{1-20}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen. The rings $A^{21}$, $A^{22}$, $A^{23}$, $A^{24}$ and $A^{25}$ are each independently 1,4-cyclohexylene, 1,3-dioxane-2,5-diyl, 1,4-phenylene, 1,4-phenylene with one or two hydrogen atoms being replaced by fluorine, 1,4-phenylene with one of two hydrogen atoms being replaced by fluorine and the other of the two hydrogen atoms being replaced by chlorine, pyridine-2,5-diyl, or pyrimidine-2,5-diyl. $Z^{21}$, $Z^{22}$, $Z^{23}$, $Z^{24}$, $Z^{25}$ and $Z^{26}$ are each independently a single bond, or $C_{1-4}$ alkylene in which arbitrary —$CH_2$— may be replaced by —O—, —COO— or —$CF_2O$—. $L^{21}$, $L^{22}$ and $L^{23}$ are each independently hydrogen or fluorine. $X^2$ is fluorine, chlorine, —$CF_3$ or —$OCF_3$. In addition, n21, n22, n23, n24 and n25 are each independently 0 or 1, and 2≤n21+n22+n23+n24+n25≤3.

$R^2$ is preferably $C_{1-12}$ alkyl, $C_{1-12}$ alkoxy, $C_{2-12}$ alkenyl, or $C_{2-12}$ alkenyl in which arbitrary hydrogen is replaced by fluorine.

The ring $A^{21}$, $A^{22}$, $A^{23}$, $A^{24}$ or $A^{25}$ is preferably 1,4-phenylene, or 1,4-phenylene with one or two hydrogen atoms being replaced by fluorine, in consideration of the stability of the compound or the dielectric anisotropy.

$Z^{22}$, $Z^{23}$, $Z^{24}$, $Z^{25}$ and $Z^{26}$ are each independently a single bond, or $C_{1-4}$ alkylene in which arbitrary —$CH_2$— may be replaced by —O—, —COO— or —$CF_2O$—. It is preferred that $Z^{21}$, $Z^{22}$, $Z^{23}$, $Z^{24}$, $Z^{25}$ and $Z^{26}$ and $Z^{26}$ are all single bonds or at least one of them is —COO— or —$CF_2O$—. In cases where the compatibility with other liquid crystal compounds is considered important, it is preferred that at least one of them is —$CF_2O$—. It is particularly preferred that n24=1 and $Z^{25}$ is —$CF_2O$—.

$X^2$ is fluorine, chlorine, —$CF_3$, —$CHF_2$, —$CH_2F$, —$OCF_3$, —$OCHF_2$, —$OCH_2F$, —$OCF_2CFHCF_3$ or —CH=$CHCF_3$, wherein fluorine, chlorine, —$CF_3$ and —$OCF_3$ are more preferred.

Among the compounds of formula (2), the more preferred compounds are those expressed by formula (2-1).

(2)

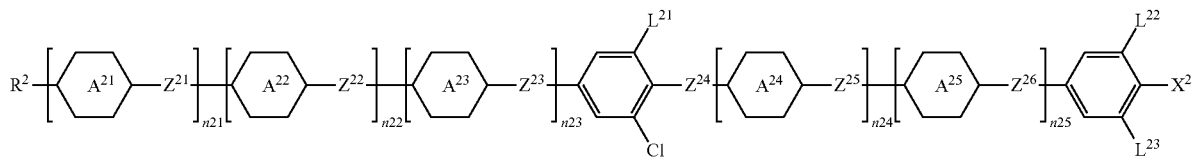

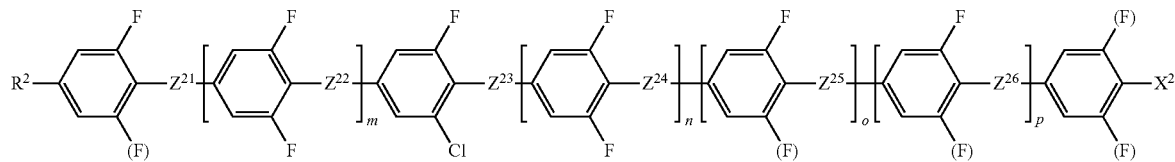

(2-1)

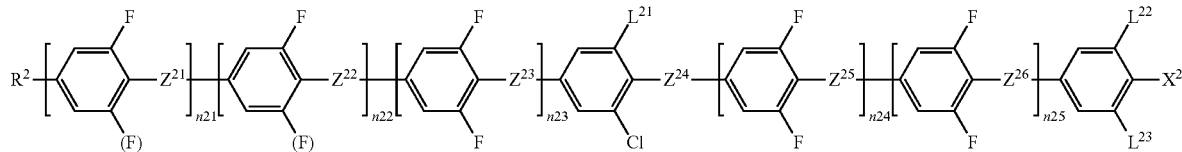

(2)

In formula (2-1), $R^2$, $Z^{21}$-$Z^{26}$ and $X^2$ are defined as in the case of formula (2), and each (F) independently represents hydrogen or fluorine. $R^2$ is preferably $C_{1-12}$ alkyl, $C_{1-12}$ alkoxy, $C_{2-12}$ alkenyl, or $C_{2-12}$ alkenyl in which arbitrary hydrogen is replaced by fluorine. $X^2$ is preferably fluorine, chlorine, —$CF_3$ or —$OCF_3$.

The preferred stereo configuration of —CH=CH— in an alkenyl depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of a liquid crystal phase. This is detailed in *Mol. Cryst. Liq. Cryst.*, 1985, 131, 109 and *Mol. Cryst. Liq. Cryst.*, 1985, 131, 327.

$Z^{21}$, $Z^{22}$, $Z^{23}$, $Z^{24}$, $Z^{25}$ and $Z^{26}$ are each independently a single bond or —$CF_2O$—. In cases where the compatibility with other liquid crystal compounds is considered important, it is preferred that at least one of them is —$CF_2O$—. It is particularly preferred that n24=1 and $Z^{25}$ is —$CF_2O$—.

Among the compounds of formula (2-1), those expressed by formulae (2-1-1) to (2-1-5) are preferred.

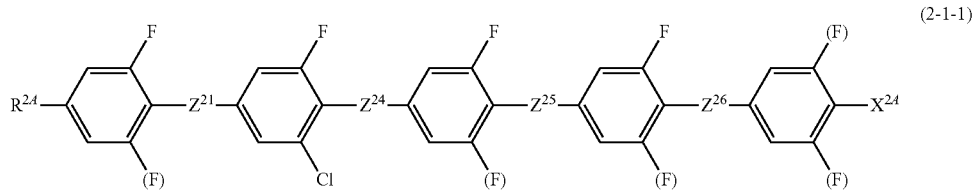

(2-1-1)

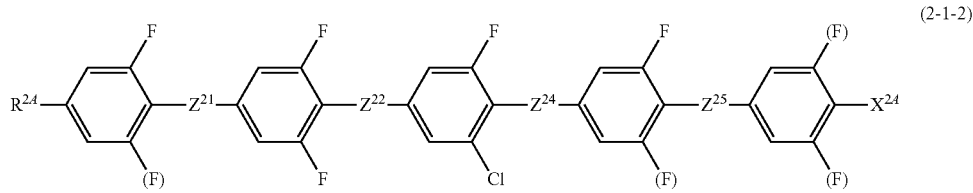

(2-1-2)

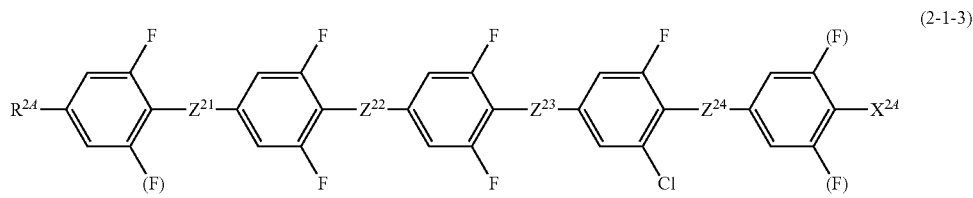

(2-1-3)

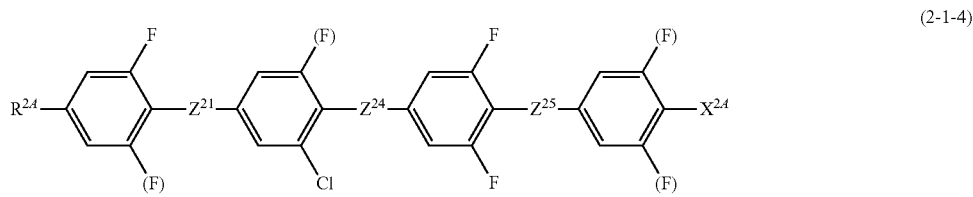

(2-1-4)

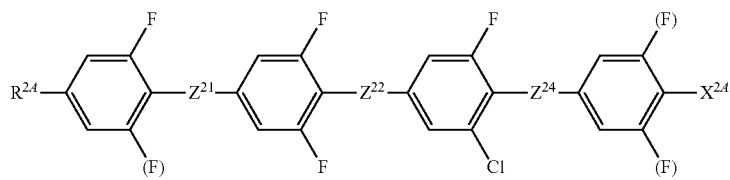

Herein, $Z^{21}$-$Z^{26}$ are defined as above.

$R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine. Each (F) is independently hydrogen or fluorine. $X^{2A}$ is fluorine, chlorine, —$CF_3$ or —$OCF_3$.

Among the compounds of formulae (2-1-1) to (2-1-5), the more preferred compounds are those expressed by formulae (2-1-1-1) to (2-1-1-3), (2-1-2-1) to (2-1-2-3), (2-1-3-1) to (2-1-3-3), (2-1-4-1) to (2-1-4-3) and (2-1-5-1) to (2-1-5-3), where those expressed by formulae (2-1-1-1), (2-1-1-2), (2-1-2-1), (2-1-2-2), (2-1-3-1), (2-1-3-2), (2-1-4-2), (2-1-4-3) and (2-1-5-3) are even more preferred.

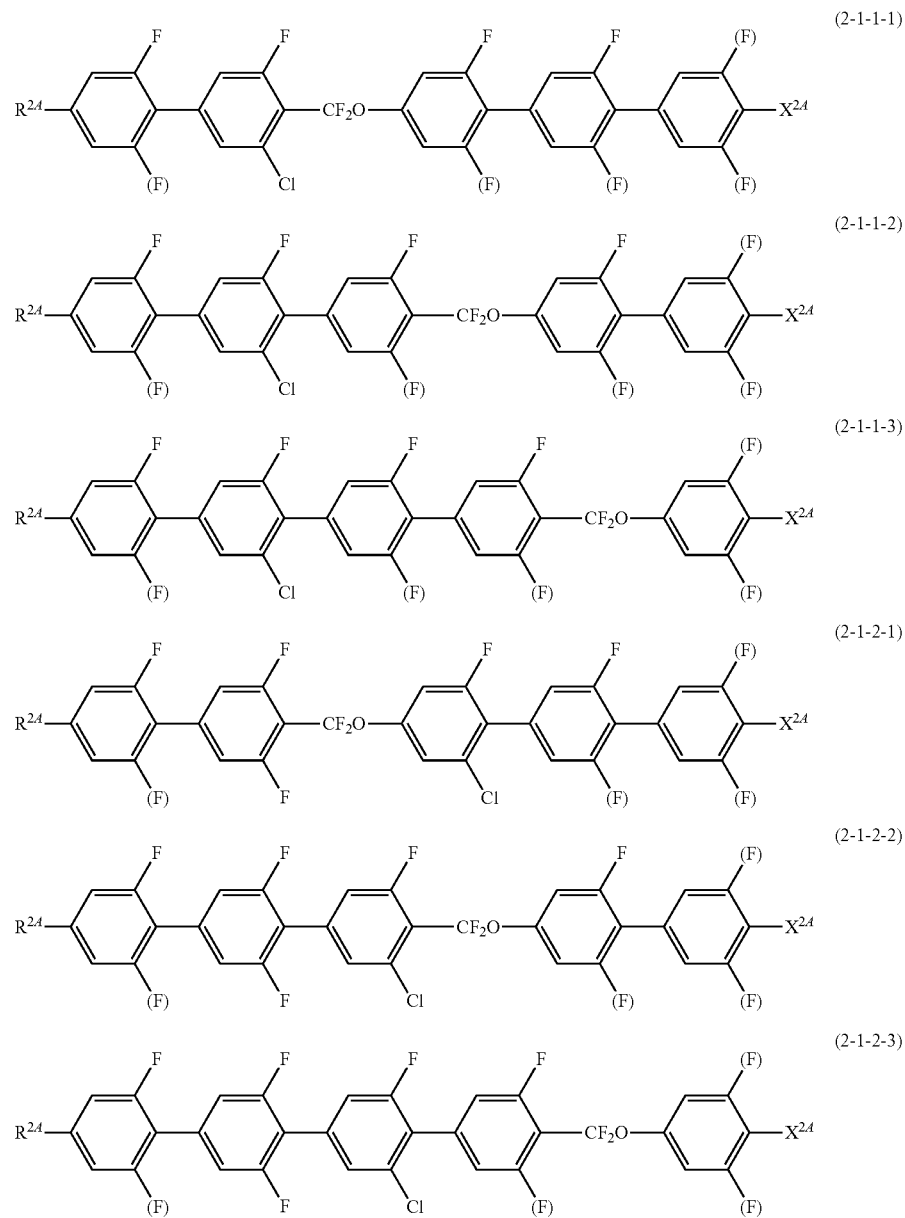

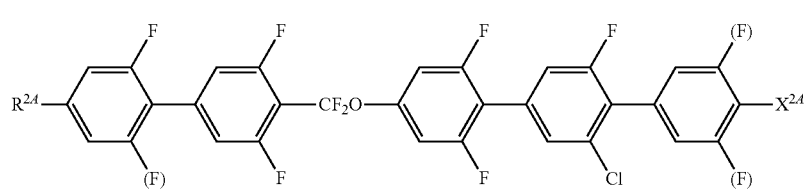
(2-1-3-1)
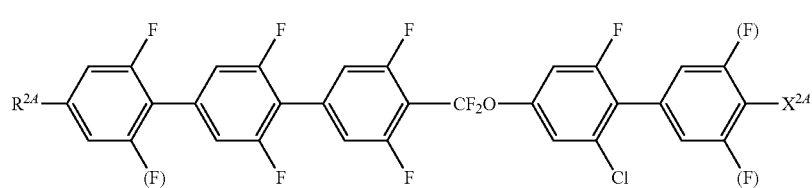
(2-1-3-2)
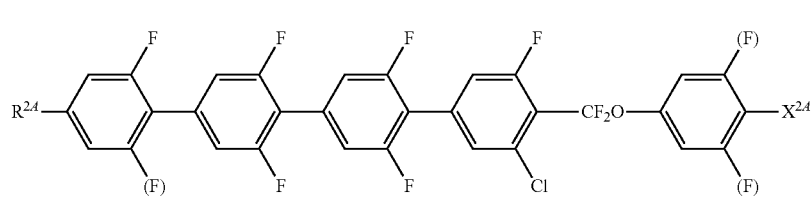
(2-1-3-3)
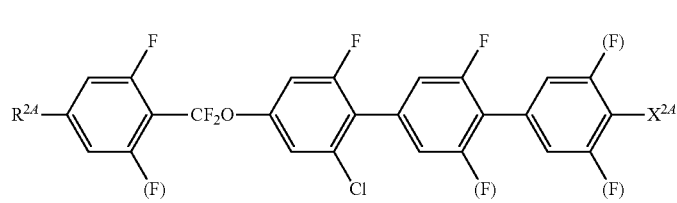
(2-1-4-1)
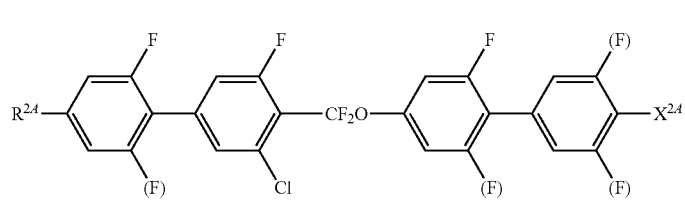
(2-1-4-2)
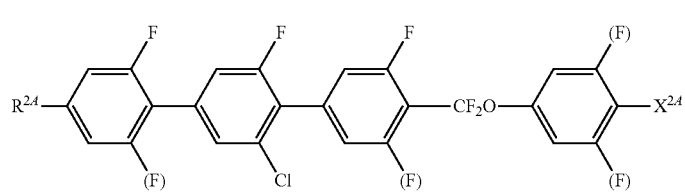
(2-1-4-3)
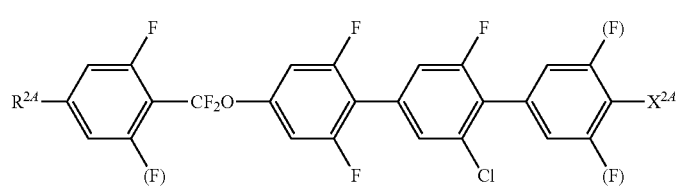
(2-1-5-1)
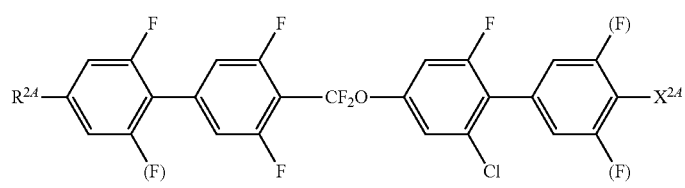
(2-1-5-2)

(2-1-5-3)

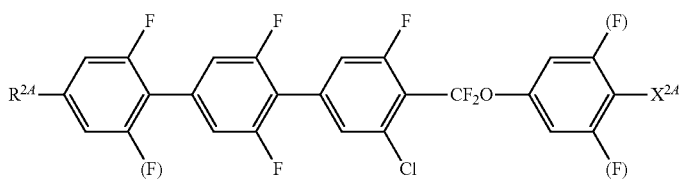

In these formulae, $R^{2A}$, (F) and $X^{2A}$ are defined as in the case of the above formulae (2-1-1) to (2-1-5).

2-2. Properties of Compound (2-1)

The compound (2-1) used in this invention is further detailed below. A compound (2-1) is a liquid crystal compound having a chlorobenzene ring. This compound has very stable physical and chemical properties under the conditions where the device is usually used, and has good compatibility with other liquid crystal compounds. Further, a smectic phase is difficult to exhibit. A composition containing such a compound is stable under the conditions where the device is usually used. Hence, the composition has a larger temperature range of a cholesteric phase, and thus can be used in a display device in a wide temperature range. Moreover, since the compound has large dielectric anisotropy and optical anisotropy, it is useful as a component for lowering the driving voltage of a composition driven in a cholesteric phase and for raising the reflectivity.

For the compound (2-1), by suitably selecting the combination of n21, n22, n23, n24 and n25, the left terminal group $R^2$, the groups on the most right benzene ring and their substitution positions [(F) and $X^2$], or the species of the linking groups $Z^{21}$-$Z^{26}$, the physical properties such as clearing point, optical anisotropy and dielectric anisotropy, etc., can be adjusted arbitrarily. The respective effects of the combination of n21, n22, n23, n24 and n25, the left terminal group $R^2$, the right terminal group $X^2$, the species of the linking groups $Z^{21}$-$Z^{26}$, and the species of (F) to the physical properties of the compound (2-1) are described below.

In general, a compound with n21+n22+n23+n24+n25=2 has a high clearing point, and a compound with n21+n22+n23+n24+n25=1 has a low melting point.

When $R^2$ is alkenyl, the preferred stereo configuration depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of liquid crystal phase. This is detailed in Mol. Cryst. Liq. Cryst., 1985, 131, 109 and Mol. Cryst. Liq. Cryst., 1985, 131, 327.

Because the linking groups $Z^{21}$-$Z^{26}$ are single bonds or —CF$_2$O—, the compound is relatively stable chemically, and degradation is relatively difficult to occur. Moreover, when the linking groups are single bonds, the viscosity is low. When the linking groups are —CF$_2$O—, the dielectric anisotropy is large.

When the right terminal group $X^2$ is fluorine, chlorine, —CF$_3$, —OCF$_3$ or —CH=CH—CF$_3$, the dielectric anisotropy is large. When $X^2$ is fluorine, —OCF$_3$ or —CF$_3$, the compound is chemically stable.

When (F) is hydrogen, the melting point is low. When (F) is fluorine, the dielectric anisotropy is large.

As mentioned above, by properly selecting the species of the ring structures, the terminal groups and the linking groups, etc., a compound with target physical properties can be obtained.

Because the compound expressed by formula (2) has good compatibility, a large dielectric anisotropy and a large optical anisotropy, the amount thereof relative to the total weight of the achiral component T is suitably from 0.5 wt % to 70 wt %, preferably from 5 wt % to 60 wt %, and more preferably from 10 wt % to 50 wt %.

The compound (2) used in this invention may include one compound, or two or more compounds.

3-1. Compound (3)

The 3$^{rd}$ aspect of this invention is a liquid crystal composition that contains the first component and, as a third component of the achiral component T, at least one compound selected from the group consisting of compounds expressed by formula (3). In addition to the third component and the first component, the second component may also be contained.

The compound expressed by formula (3) is described below.

(3)

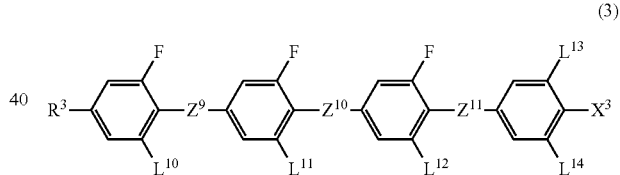

In formula (3), $R^3$ is hydrogen, or $C_{1\text{-}20}$ alkyl in which arbitrary —CH$_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —CH$_2$— is replaced by —O—, —S—, —COO—, —OCO—, —CH=CH—, —CF=CF— or —C≡C—, arbitrary hydrogen may be replaced by halogen. $Z^9$, $Z^{10}$ and $Z^{11}$ are each independently a single bond, —COO— or —CF$_2$O—, with a proviso that at least one of $Z^9$, $Z^{10}$ and $Z^{11}$ is —CF$_2$O—. $L^{10}$, $L^{11}$, $L^{12}$, $L^{13}$ and $L^{14}$ are each independently hydrogen or fluorine. $X^3$ is hydrogen, halogen, —SF$_5$, or $C_{1\text{-}10}$ alkyl in which arbitrary —CH$_2$— may be replaced by —O—, —S—, —COO—, —OCO—, —CH=CH—, —CF=CF— or —C≡C—, with a proviso that —O— is not adjacent to —CH=CH— and —CO— is not adjacent to —CH=CH—, and in the alkyl and the alkyl in which arbitrary —CH$_2$— is replaced by —O—, —S—, —COO—, —OCO—, —CH=CH—, —CF=CF— or —C≡C—, arbitrary hydrogen may be replaced by fluorine.

The preferred stereo configuration of —CH=CH— in an alkenyl depends on the position of the double bond. A trans-configuration is preferred for an alkenyl having a double bond at an odd position, such as —CH═CHCH$_3$, —CH═CHC$_2$H$_5$, —CH═CHC$_3$H$_7$, —CH═CHC$_4$H$_9$, —C$_2$H$_4$CH═CHCH$_3$ and —C$_2$H$_4$CH═CHC$_2$H$_5$. A cis-configuration is preferred for alkenyl having a double bond at an even position, such as —CH$_2$CH═CHCH$_3$, —CH$_2$CH═CHC$_2$H$_5$ and —CH$_2$CH═CHC$_3$H$_7$. An alkenyl compound having a preferred stereo configuration has a high upper-limit temperature or a wide temperature range of liquid crystal phase. This is detailed in *Mol. Cryst. Liq. Cryst.*, 1985, 131, 109 and *Mol. Cryst. Liq. Cryst.*, 1985, 131, 327.

Specific examples of alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

Specific examples of alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

Specific examples of alkenyl include —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$—CH═CH$_2$, —CH═CHC$_3$H$_7$, —CH$_2$CH═CHC$_2$H$_5$, —(CH$_2$)$_2$—CH═CHCH$_3$ and —(CH$_2$)$_3$—CH═CH$_2$.

Specific examples of alkenyloxy include —OCH$_2$CH═CH$_2$, —OCH$_2$CH═CHCH$_3$ and —OCH$_2$CH═CHC$_2$H$_5$.

Specific examples of alkynyl include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (3), $Z^9$, $Z^{10}$ and are each independently a single bond, —COO— or —CF$_2$O—, with a proviso that at least one of them is —CF$_2$O—.

Preferred examples of $Z^9$, $Z^{10}$ and $Z^{11}$ are a single bond and —CF$_2$O—.

In formula (3), $L^{10}$, $L^{11}$, $L^{12}$, $L^{13}$ and $L^{14}$ are each independently hydrogen or fluorine. When $Z^{10}$ is —COO— or —CF$_2$O—, $L^{11}$, $L^{13}$ and $L^{14}$ are preferably fluorine. When $Z^{11}$ is —COO— or —CF$_2$O—, $L^{12}$, $L^{13}$ and $L^{14}$ are preferably fluorine.

In formula (3), $X^3$ is hydrogen, halogen, —SF$_5$, or C$_{1-10}$ alkyl in which arbitrary —CH$_2$— may be replaced by —O—, —S—, —COO—, —OCO—, —CH═CH—, —CF═CF— or —C≡C— and in the alkyl and the alkyl in which arbitrary —CH$_2$— is replaced by —O—, —S—, —COO—, —COO—, —CH═CH—, —CF═CF— or —C≡C—, arbitrary hydrogen may be replaced by fluorine.

Specific examples of alkyl in which arbitrary hydrogen is replaced by fluorine are —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F and —(CF$_2$)$_5$—F.

Specific examples of alkoxy in which arbitrary hydrogen is replaced by fluorine are —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F and —O—(CF$_2$)$_5$—F.

Specific examples of alkenyl in which arbitrary hydrogen is replaced by fluorine are —CH═CHF, —CH═CF$_2$, —CF═CHF, —CH═CHCH$_2$F, —CH═CHCF$_3$, —(CH$_2$)$_2$—CH═CF$_2$, —CH$_2$CH═CHCF$_3$, —CH═CHCF$_3$ and —CH═CHCF$_2$CF$_3$.

Examples of preferred $X^1$ are fluorine, chlorine, —CF$_3$, —CHF$_2$, —OCF$_3$ and —OCHF$_2$. Examples of more preferred $X^1$ are fluorine, chlorine, —CF$_3$ and —OCF$_3$.

Among the compounds of formula (3), the preferred compounds are those expressed by formulae (3-1) to (3-3), where those expressed by formulae (3-2) to (3-3) are more preferred.

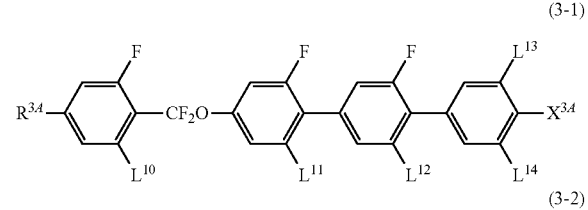

(3-1)

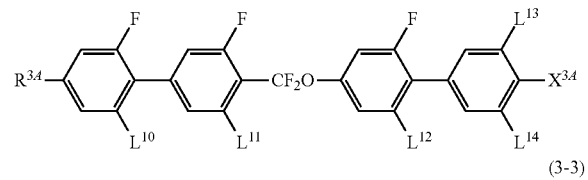

(3-2)

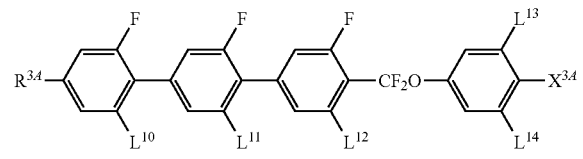

(3-3)

In these formulae, each $R^{3A}$ is independently C$_{1-12}$ alkyl, C$_{1-12}$ alkoxy, C$_{2-12}$ alkenyl, or C$_{2-12}$ alkenyl in which arbitrary hydrogen is replaced by fluorine. $X^{3A}$ is fluorine, chlorine, —CF$_3$ or —OCF$_3$. $L^{10}$-$L^{14}$ are each independently hydrogen or fluorine.

3-2. Properties of Compound (3)

The compound (3) used in this invention is further detailed below. A compound (3) is a liquid crystal compound having four benzene rings, and at least one —CF$_2$O— as a linking group. This compound has very stable physical and chemical properties under the conditions where the device is usually used, and has a good compatibility with other liquid crystal compounds. A composition containing such a compound is stable under the conditions where the device is usually used. Therefore, the composition can have a larger temperature range of cholesteric phase, and thus can be used in a display device in a wide temperature range. Moreover, for the compound has large dielectric anisotropy and optical anisotropy, it is useful as a component for lowering the driving voltage of a composition driven in a cholesteric phase and for raising the reflectivity.

For the compound (3), by suitably selecting the species of the left terminal group $R^3$, the groups ($L^{10}$-$L^{14}$ and $X^3$) on the benzene rings and the linking groups $Z^9$-$Z^{11}$, the physical properties such as clearing point, optical anisotropy and dielectric anisotropy, etc., can be adjusted arbitrarily. The effects of the species of the left terminal group $R^3$, the groups ($L^{10}$-$L^{14}$ and $X^3$) on the benzene rings, and the linking groups $Z^9$-$Z^{11}$ to the physical properties of the compound (3) are described below.

When $R^3$ is alkenyl, the preferred stereo configuration of —CH═CH— in the alkenyl depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of liquid crystal phase. This is detailed in *Mol. Cryst. Liq. Cryst.,* 1985, 131, 109 and *Mol. Cryst. Liq. Cryst.,* 1985, 131, 327.

When $Z^9$, $Z^{10}$ and $Z^{11}$ are single bonds or —CF$_2$O—, the viscosity is low. When $Z^9$, $Z^{10}$ and $Z^{11}$ are —CF$_2$O—, the dielectric anisotropy is large. When $Z^9$, $Z^{10}$ and $Z^{11}$ are single bonds or —CF$_2$O—, the compound is chemically stable relatively, and is not easily degraded.

When $X^3$ is fluorine, chlorine, —SF$_5$, —CF$_3$, —CHF$_2$, —CH$_2$F, —OCF$_3$, —OCHF$_2$ or —OCH$_2$F, the dielectric anisotropy is large. When $X^3$ is fluorine, —OCF$_3$ or —CF$_3$, the compound is chemically stable.

When the number of fluorine in $L^{10}$ to $L^{14}$ is more, the dielectric anisotropy is larger. When $L^{10}$ is hydrogen, the compatibility with other liquid crystal compounds is good. When $L^{13}$ and $L^{14}$ are simultaneously fluorine, the dielectric anisotropy is particularly large.

As mentioned above, by properly selecting the species of the terminal groups and the linking groups, etc., a compound with target physical properties can be obtained.

3-3. Specific Examples of Compound (3)

Preferred examples of the compound (3) are those expressed by formulae (3-1) to (3-3). More preferred examples are those expressed by formulae (3-2A) to (3-2H) and (3-3A) to (3-3D). Even more preferred examples are those expressed by formulae (3-2A) to (3-2D), (3-3A) and (3-3B). Particularly preferred examples are those expressed by formulae (3-2A), (3-2C) and (3-3A).

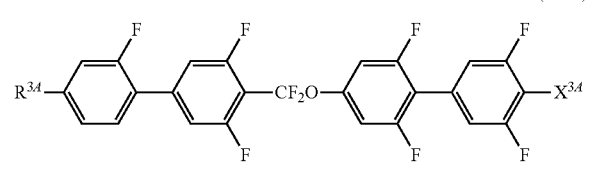
(3-2A)

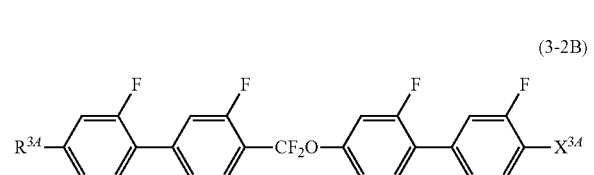
(3-2B)

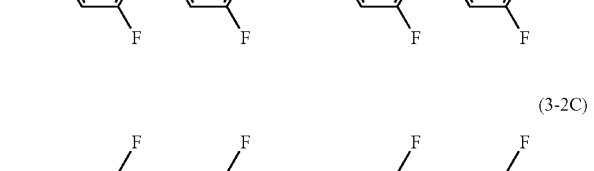
(3-2C)

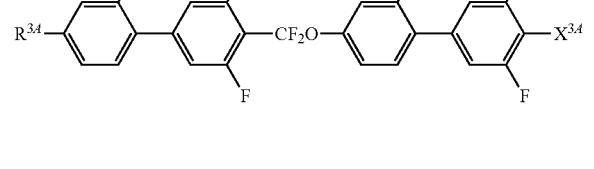
(3-2D)

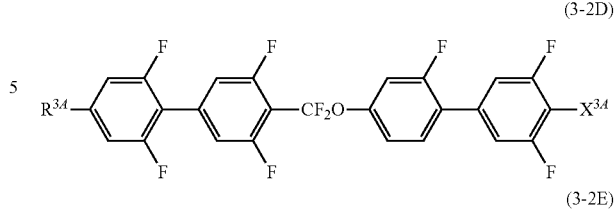
(3-2E)

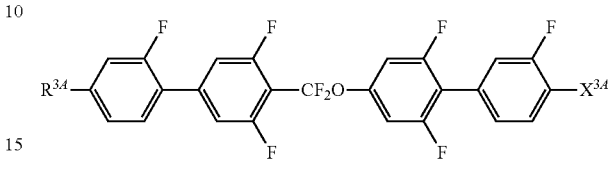
(3-2F)

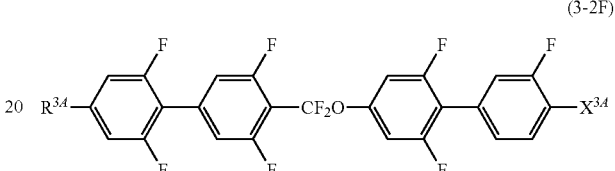
(3-2G)

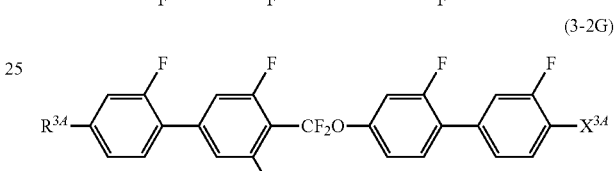
(3-2H)

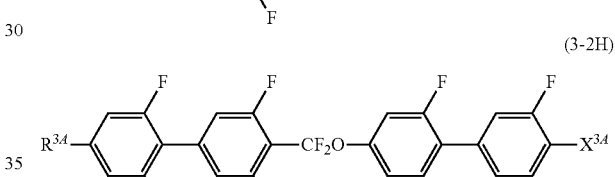
(3-3A)

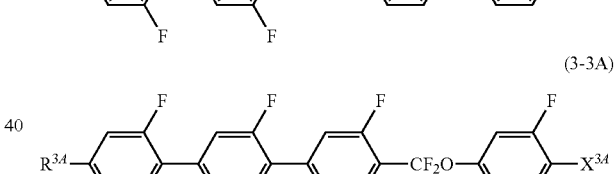
(3-3B)

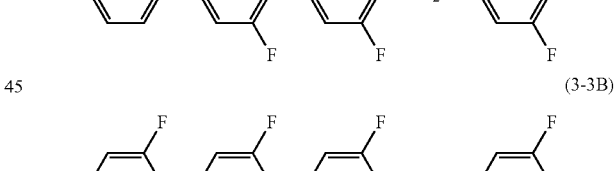
(3-3C)

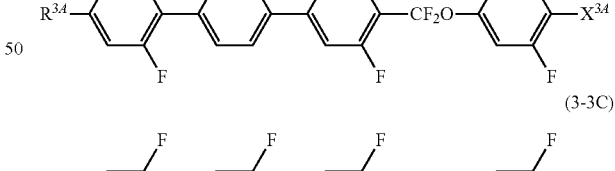
(3-3D)

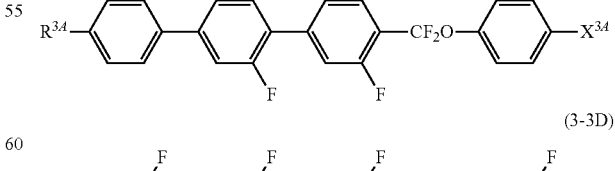

In these formulae, each $R^{3,4}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine. $X^{3,4}$ is fluorine, chlorine, —$CF_3$ or —$OCF_3$.

Because the compound of formula (3) has a relatively higher clearing point, a large dielectric anisotropy and a large optical anisotropy, the amount thereof relative to the total weight of the achiral component T is suitably from 0.5 wt % to 70 wt %, preferably from 5 wt % to 60 wt %, and more preferably from 10 wt % to 50 wt %.

The compound (3) used in this invention may include a single compound, or two or more compounds.

4. Compound (4)

The $4^{th}$ aspect of this invention is a liquid crystal composition that contains the first component, and additional components that include a component A selected from compounds expressed by the above formulae (2) and (3) and, as the fourth component of the achiral component T, at least one compound selected from the group consisting of compounds expressed by formula (4).

The compound expressed by formula (4) is described below.

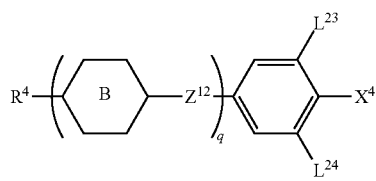

(4)

In formula (4), $R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine. Each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene, or pyrimidine-2,5-diyl. Each $Z^{12}$ is independently a single bond, ethylene, —COO—, —OCO—, —$CF_2O$— or —$OCF_2$—. $L^{23}$ and $L^{24}$ are each independently hydrogen or fluorine. $X^4$ is fluorine, chlorine, —$CF_3$ or —$OCF_3$. In addition, q is 1, 2, 3 or 4. When q is 3 or 4, one $Z^{12}$ is —$CF_2O$— or —$OCF_2$—. When q is 3, not all of the rings B are fluorine-substituted 1,4-phenylene.

The fourth component of the achiral component T is suitably for preparing a composition having a large dielectric anisotropy or a low-temperature compatibility. The amount of the fourth component relative to the total weight of the component T is preferably from about 5 wt % to about 40 wt % to enhance the low-temperature compatibility. The ratio is more preferably in the range of about 5 wt % to about 30 wt %, and particularly preferably in the range of about 5 wt % to about 20 wt %.

The compound (4) used in this invention may include a single compound, or two or more compounds.

$R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine. To enhance the stability to UV light or the stability to heat, $R^4$ is preferably $C_{1-12}$ alkyl. To lower the viscosity, $R^4$ is preferably $C_{2-12}$ alkenyl.

The alkyl is preferably methyl, ethyl, propyl, butyl, pentyl, hexyl, heptyl or octyl. In order to lower the viscosity, the alkyl is more preferably ethyl, propyl, butyl, pentyl or heptyl.

The alkoxy is preferably methoxy, ethoxy, propoxy, butoxy, pentyloxy, hexyloxy, or heptyloxy. In order to lower the viscosity, the alkoxy is more preferably methoxy or ethoxy.

The alkenyl is preferably vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. In order to lower the viscosity, the alkenyl is more preferably vinyl, 1-propenyl, 3-butenyl or 3-pentenyl. The preferred stereo configuration of the —CH=CH— in these alkenyl groups depends on the position of the double bond. In order to lower the viscosity, a trans-configuration is preferred for alkenyls such as 1-propenyl, 1-butenyl, 1-pentenyl, 1-hexenyl, 3-pentenyl and 3-hexenyl. A cis-configuration is preferred for alkenyls such as 2-butenyl, 2-pentenyl and 2-hexenyl. Among these alkenyls, the straight ones are preferred than the branched ones.

The alkenyl in which arbitrary hydrogen is replaced by fluorine is preferably 2,2-difluorovinyl, 3,3-difluoro-2-propenyl, 4,4-difluoro-3-butenyl, 5,5-difluoro-4-pentenyl or 6,6-difluoro-5-hexenyl, for example. In order to lower the viscosity, 2,2-difluorovinyl or 4,4-difluoro-3-butenyl is more preferred.

The scope of the alkyl does not include cyclic alkyl groups. The scope of the alkoxy does not include cyclic alkoxy groups. The scope of the alkenyl does not include cyclic alkenyl groups. The scope of the alkenyl in which arbitrary hydrogen is replaced by fluorine does not include cyclic alkenyl groups in which arbitrary hydrogen is replaced by fluorine.

Each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene, or pyrimidine-2,5-diyl. When q is equal to or larger than 2, arbitrary two of the rings B may be the same or different. In order to increase the optical anisotropy, the ring B is preferably 1,4-phenylene or 3-fluoro-1,4-phenylene. In order to lower the viscosity, the ring B is preferably 1,4-cyclohexylene.

Each $Z^{12}$ is independently a single bond, ethylene, —COO—, —OCO—, —$CF_2O$— or —$OCF_2$—. However, when q is 3 or 4, one $Z^{12}$ is —$CF_2O$—. When q is equal to or larger than 2, among the $Z^{12}$ groups, arbitrary two $Z^{12}$ may be the same or may be different. To lower the viscosity, $Z^{12}$ is preferably a single bond. To increase the dielectric anisotropy and improve the compatibility, $Z^{12}$ is preferably —$CF_2O$—.

$L^{23}$ and $L^{24}$ are each independently hydrogen or fluorine. To increase the dielectric anisotropy, it is preferred that $L^{23}$ and $L^{24}$ are both fluorine. To raise the clearing point, it is preferred that $L^{23}$ and $L^{24}$ are both hydrogen. $X^4$ is fluorine, chlorine, —$CF_3$ or —$OCF_3$. To increase the dielectric anisotropy, —$CF_3$ is preferred. To improve the compatibility, fluorine and —$OCF_3$ are preferred. To increase the optical anisotropy, chlorine is preferred.

Among the compounds of formula (4), those of formulae (4-1) to (4-9) are preferred.

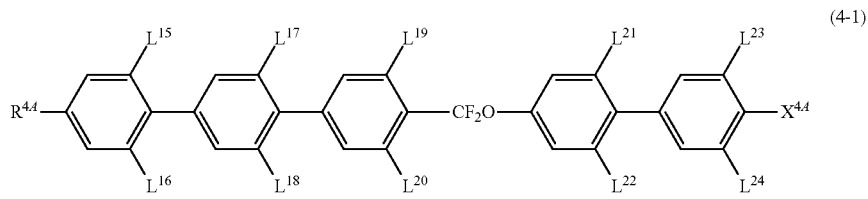
(4-1)
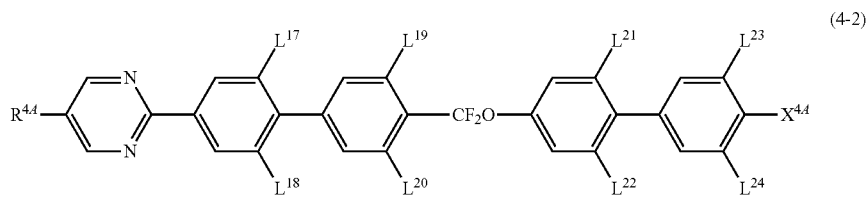
(4-2)
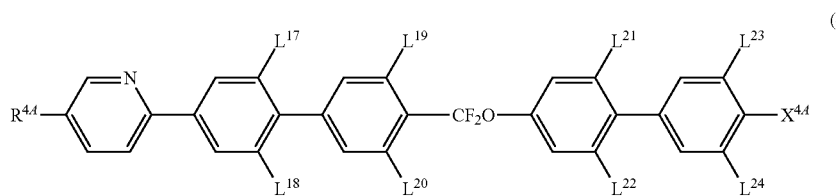
(4-3)
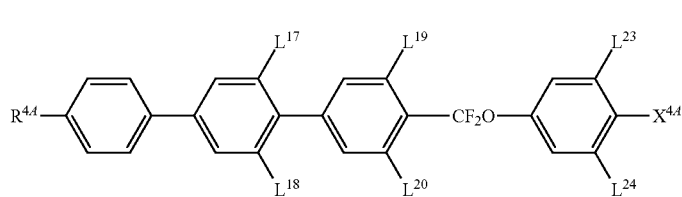
(4-4)
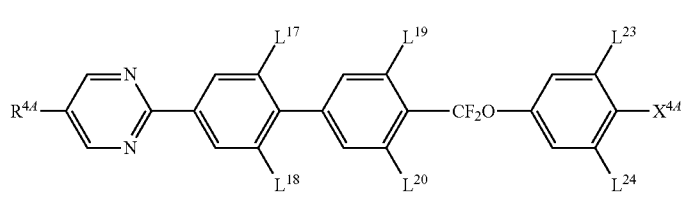
(4-5)
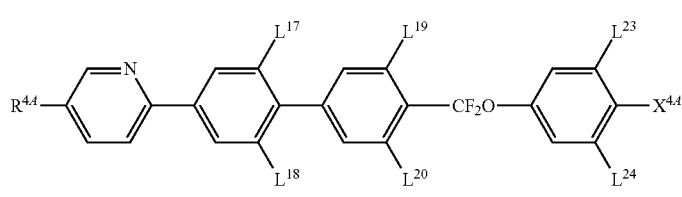
(4-6)
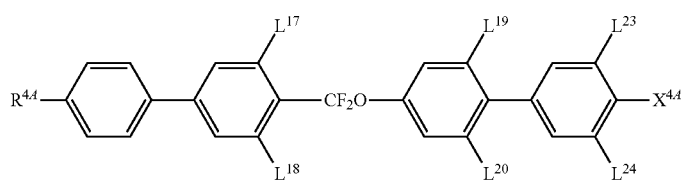
(4-7)
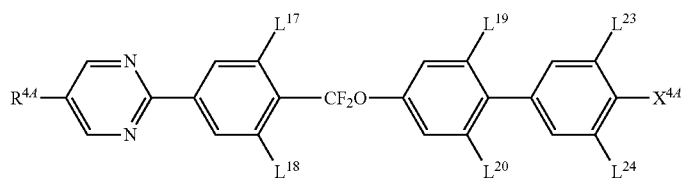
(4-8)

-continued (4-9)

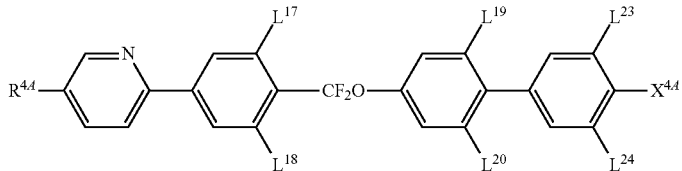

In the above formulae (4-1)-(4-9), each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine. $X^{4A}$ is fluorine, chlorine, —$CF_3$ or —$OCF_3$. $L^{15}$ to $L^{24}$ are each independently hydrogen or fluorine. The compounds of formula (4-1) to (4-3) have high clearing points, and have good compatibility for having five rings. The compounds of formula (4-4) to (4-6) have high clearing points and large $\Delta n$ values. The compounds of formula (4-7) to (4-9) have good compatibility. Moreover, when the number of fluorine atoms in $L^{15}$ to $L^{24}$ is larger, the dielectric anisotropy is larger.

5. Compound (5)

The $5^{th}$ aspect of this invention is a liquid crystal composition that contains the first component, additional components that include a component A including at least one compound selected from compounds expressed by the above formulae (2) and (3) and, as the fifth component of the achiral component T, at least one compound selected from the group consisting of compounds expressed by formula (5), and a chiral dopant. The achiral component T may also include the fourth component. The compound expressed by formula (5) is described below.

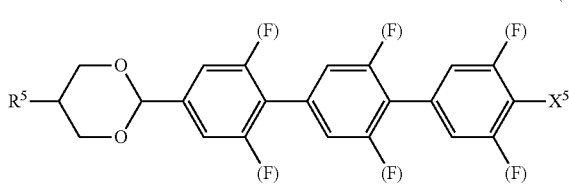

(5)

In formula (5), $R^5$ is hydrogen, or $C_{1-20}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by halogen. Each (F) is independently hydrogen or fluorine. $X^5$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen may be replaced by fluorine.

The preferred stereo configuration of —CH=CH— in the alkenyl depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of liquid crystal phase. This is detailed in *Mol. Cryst. Liq. Cryst.*, 1985, 131, 109 and *Mol. Cryst. Liq. Cryst.*, 1985, 131, 327.

Specific examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

Specific examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of the alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

Specific examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH_CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of the alkenyloxy include —OCH$_2$CH=CH$_2$, —OCH$_2$CH=CHCH$_3$ and —OCH$_2$CH=CHC$_2$H$_5$.

Specific examples of the alkynyl include —C≡CH, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (5), $X^5$ is hydrogen, halogen, —$SF_5$, or $C_{1-10}$ alkyl in which arbitrary —$CH_2$— may be replaced by —O—, —S—, —COO—, —OCO—, —CH=CH—, —CF=CF— or —C≡C— and in the alkyl and the alkyl in which arbitrary —$CH_2$— is replaced by —O—, —S—, —COO—, —COO—, —CH=CH—, —CF=CF— or —C≡C—, arbitrary hydrogen may be replaced by fluorine.

Specific examples of the alkyl in which arbitrary hydrogen is replaced by fluorine are —CH$_2$F, —CF$_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$ and —CHFCF$_2$CF$_3$.

Specific examples of the alkoxy in which arbitrary hydrogen is replaced by fluorine atom are —OCH$_2$F, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$ and —OCHFCF$_2$CF$_3$.

Specific examples of the alkenyl in which arbitrary hydrogen is replaced by fluorine are —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of preferred $X^5$ are fluorine, chlorine, —CF$_3$, —CHF$_2$, —OCF$_3$ and —OCHF$_2$. Examples of more preferred $X^5$ are fluorine, chlorine, —CF$_3$ and —OCF$_3$. When $X^5$ is chlorine or fluorine, the melting point is low, and the compatibility with other liquid crystal compounds is particularly good. When $X^5$ is —$CF_3$, —$CHF_2$, —$OCF_3$ or —$OCHF_2$, the compound exhibits a particularly large dielectric anisotropy.

Among the compounds of formula (5), those of formulae (5-1) to (5-4) are preferred.

(5-1)
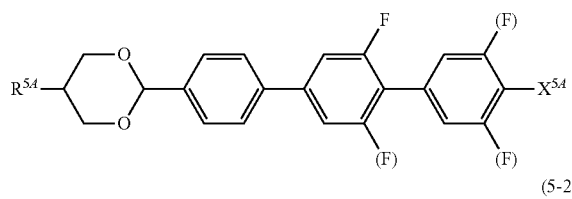

(5-2)
(5-3)
(5-4)
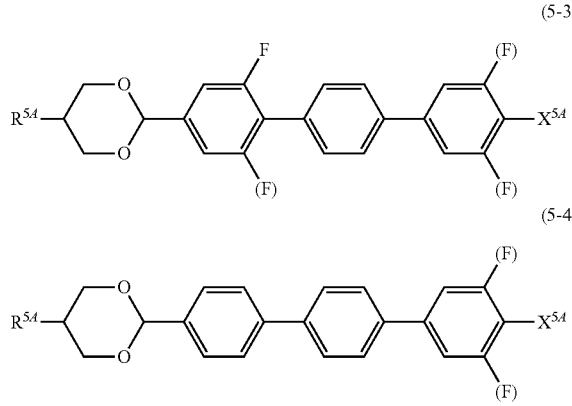

(F)
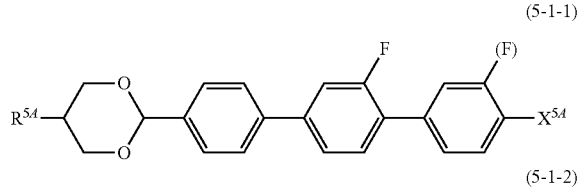

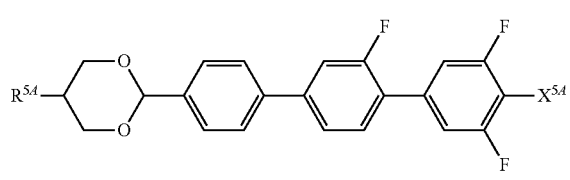

In formulae (5-1) to (5-4), each $R^{5A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine. Each (F) is independently hydrogen or fluorine. $X^{5A}$ is fluorine, chlorine, —$CF_3$ or —$OCF_3$.

Among the compounds expressed by formulae (5-1) to (5-4), those of formulae (5-1) to (5-3) are more preferred, and those of formulae (5-1-1), (5-1-2), (5-2-1) to (5-2-4), (5-3-1) and (5-3-2) are even more preferred, wherein those of formulae (5-2-1), (5-2-2) and (5-3-2) are more preferred.

(5-1-1)
(5-1-2)
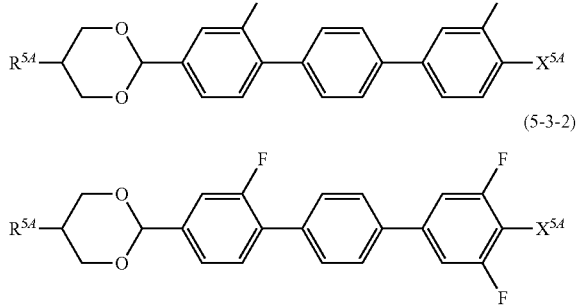

-continued (5-2-1)
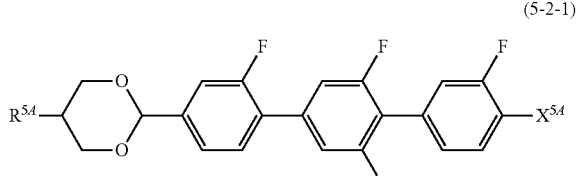

(5-2-2)
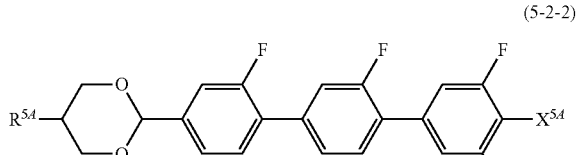

(5-2-3)
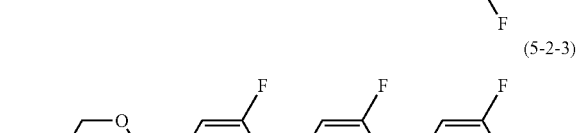

(5-2-4)
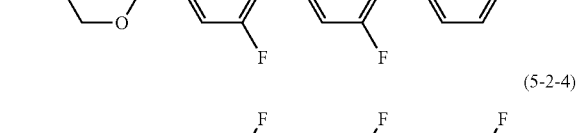

(5-3-1)
(5-3-2)
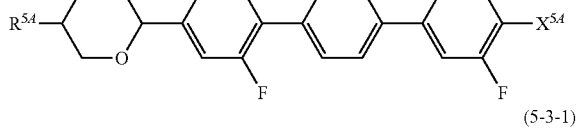

Herein, $R^{5A}$ and $X^{5A}$ are defined as above.

The fifth component of the achiral component T is suitable for preparing a composition having a large dielectric anisotropy. Relative to the total weight of the achiral component T, the amount of the fifth component is preferably equal to or more than about 1.0 wt % for raising the clearing point, and is preferably equal to or less than about 50 wt % for lowering the lower-limit temperature of the liquid crystal phase. The ratio is more preferably from about 1 wt % to about 25 wt %, and particularly preferably from about 1 wt % to about 15 wt %.

The compound (5) used in this invention may include a single compound or two or more compounds.

5-1. Properties of Compound (5)

The compound (5) used in this invention is further detailed below. A compound (5) is a liquid crystal compound having a dioxane ring and three benzene rings. This compound has very stable physical and chemical properties under the conditions where the device is usually used, and also has a relatively good compatibility with other liquid crystal compounds in spite of a high clearing point. A composition containing such a compound is stable under the conditions where the device is usually used. Therefore, the composition can have a larger temperature range of optically isotropic liquid crystal phase, and thus can be used in a display device in a wide temperature range. Moreover, the compound is useful as a component for lowering the driving voltage of a composition driven in an optically isotropic liquid crystal phase. Moreover, when the composition prepared from the compound (5) and the chiral dopant exhibits a blue phase, a uniform blue phase without the co-existence of N* phase and isotropic phase is easily formed. That is, the compound (5) easily exhibits a uniform blue phase.

When the right terminal group $X^5$ is fluorine, chlorine, —$SF_5$, —$CF_3$, —$OCF_3$ or —CH═CH—$CF_3$, the dielectric anisotropy is large. When $X^5$ is fluorine, —$CF_3$ or —$OCF_3$, the compound is chemically stable.

5-2. Synthesis of Compound (5)

The synthesis of the compound (5) is described below. A compound (5) can be synthesized by a suitable combination of organic synthesis methods. The methods for introducing target terminal groups, rings and linking groups in the starting compound are described in, for example, *Organic Syntheses* (John Wiley & Sons, Inc.), *Organic Reactions* (John Wiley & Sons, Inc.), *Comprehensive Organic Synthesis* (Pergamon Press), and New Lecture on Experimental Chemistry (Maruzen).

For example, it is possible to use the method of Japanese Patent No. 2959526 to synthesize a compound of formula (5) of this invention.

The fifth component of the achiral component easily exhibits a blue phase, and has an effect of raising the clearing point.

6. Compound (6)

The $6^{th}$ aspect of this invention is a liquid crystal composition that contains the first component, and, as a sixth component of the achiral component T, at least one compound selected from compounds expressed by formula (6). In addition to the sixth and the first compounds, the second to the fifth components may also be contained.

The compound expressed by formula (6) is described below.

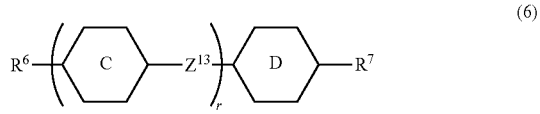

(6)

In formula (6), $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine. The ring C and the ring D are each independently 1,4-cyclohexylene, 1,4-phenylene, 2-fluoro-1,4-phenylene, 3-fluoro-1,4-phenylene, or 2,5-difluoro-1,4-phenylene. Each $Z^{13}$ is independently a single bond, ethylene, —COO— or —COO—, and r is 1, 2 or 3.

The sixth component of the achiral component T has a small absolute value of dielectric anisotropy, and is a nearly neutral compound. The compounds with r=1 in formula (6) mainly has an effect of adjusting the viscosity or adjusting the optical anisotropy. The compounds with r=2 or r=3 in formula (6) has an effect of broadening the temperature range of the optically isotropic liquid crystal phase, such as an effect of raising the clearing point, or has an effect of adjusting the optical anisotropy.

Because increasing the content of the compound of formula (6) raises the driving voltage of the liquid crystal composition and lowers the viscosity, the content is desired to be low in consideration of the driving voltage, if only the requirement on the viscosity of the liquid crystal composition is met. The amount of the sixth component of the achiral component T relative to the total weight of the achiral component T is from 1 wt % to 40 wt % and preferably from 1 wt % to 20 wt %.

The compound (6) used in this invention may include a single compound or two or more compounds.

$R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine. In order to lower the viscosity, $R^6$ and $R^7$ are preferably $C_{2-12}$ alkenyl. In order to enhance the stability to UV light or heat, $R^6$ and $R^7$ are preferably $C_{1-12}$ alkyl.

The alkyl is preferably methyl, ethyl, propyl, butyl, pentyl, hexyl, heptyl or octyl. In order to lower the viscosity, the alkyl is more preferably ethyl, propyl, butyl, pentyl or heptyl.

The alkoxy is preferably methoxy, ethoxy, propoxy, butoxy, pentyloxy, hexyloxy, or heptyloxy. In order to lower the viscosity, the alkoxy is more preferably methoxy or ethoxy.

The preferred stereo configuration of —CH═CH— in the alkenyl depends on the position of the double bond. A trans-configuration is preferred for an alkenyl having a double bond at an odd position, such as —CH═CHCH$_3$, —CH═CHC$_2$H$_5$, —CH═CHC$_3$H$_7$, —CH═CHC$_4$H$_9$, —C$_2$H$_4$CH═CHCH$_3$ and —C$_2$H$_4$CH═CHC$_2$H$_5$. A cis-configuration is preferred for alkenyl having a double bond at an even position, such as —CH$_2$CH═CHCH$_3$, —CH$_2$CH═CHC$_2$H$_5$ and —CH$_2$CH═CHC$_3$H$_7$. An alkenyl compound having a preferred stereo configuration has a high upper-limit temperature or a wide temperature range of a liquid crystal phase. This is detailed in *Mol. Cryst. Liq. Cryst.*, 1985, 131, 109 and *Mol. Cryst. Liq. Cryst.*, 1985, 131, 327.

The alkenyl in which arbitrary hydrogen is replaced by fluorine is preferably 2,2-difluorovinyl, 3,3-difluoro-2-propenyl, 4,4-difluoro-3-butenyl, 5,5-difluoro-4-pentenyl or 6,6-difluoro-5-hexenyl, for example. In order to lower the viscosity, 2,2-difluorovinyl or 4,4-difluoro-3-butenyl is more preferred.

The ring C and the ring D are each independently 1,4-cyclohexylene, 1,4-phenylene, 2-fluoro-1,4-phenylene, 3-fluoro-1,4-phenylene, or 2,5-difluoro-1,4-phenylene. When r is equal to or larger than 2, arbitrary two of the rings C may be the same, or may be different. In order to increase the optical anisotropy, the ring C and the ring D are preferably 1,4-phenylene or 3-fluoro-1,4-phenylene. In order to lower the viscosity, the ring C and the ring D are preferably 1,4-cyclohexylene.

Each $Z^{13}$ is independently a single bond, ethylene, —COO— or —OCO—. When r is equal to or larger than 2, arbitrary two of the groups $Z^{13}$ may be the same, or may be different. In order to lower the viscosity, $Z^{13}$ is preferably a single bond.

Among the compounds of formula (6), those of formulae (6-1) to (6-13) are preferred.

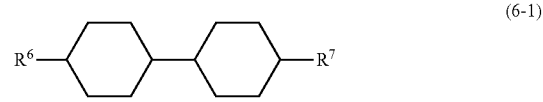

(6-1)

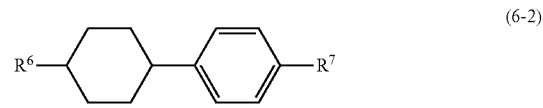

(6-2)

-continued

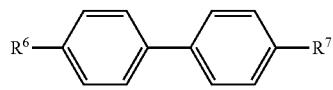 (6-3)

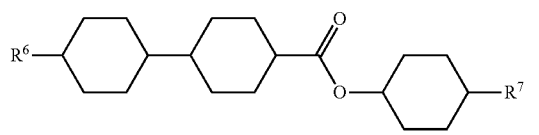 (6-4)

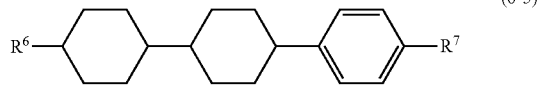 (6-5)

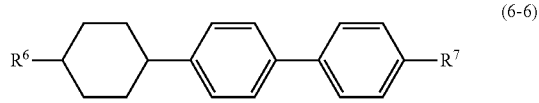 (6-6)

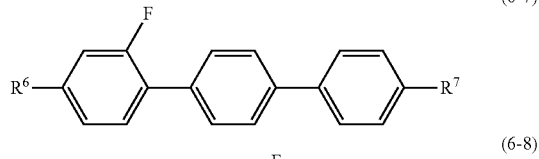 (6-7)

(6-8)

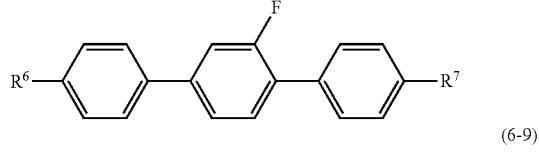 (6-9)

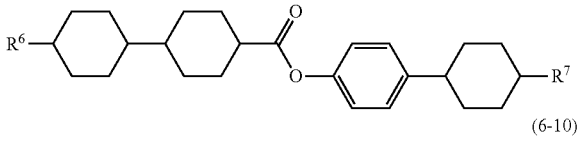 (6-10)

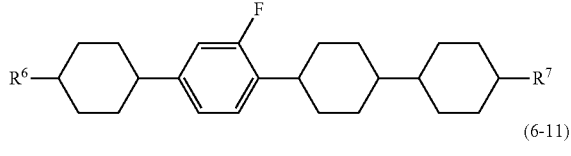 (6-11)

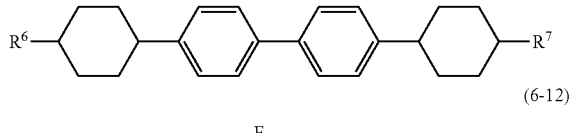 (6-12)

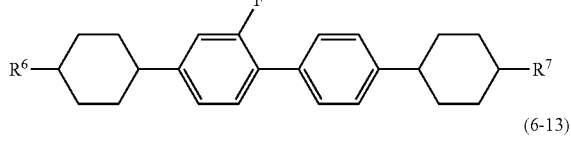 (6-13)

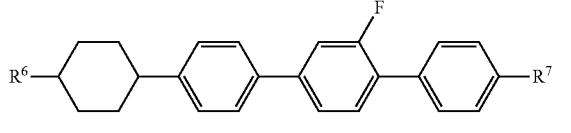

In the above formulae (6-1) to (6-13), $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine. The compounds of formulae (6-1) to (6-3) have low viscosities, those of formulae (6-4)-(6-8) have high clearing points, and those of formulae (6-9) to (6-13) have very high clearing points.

The liquid crystal composition of this invention is prepared as usual with a well known method, such as a method of dissolving the required components at a high temperature, and so on.

7. Composition Having Optically Isotropic Liquid Crystal Phase 7.1 Components of Composition Having Optically Isotropic Liquid Crystal Phase The $7^{th}$ aspect of this invention is a liquid crystal composition that includes an achiral component T and a chiral dopant and can be used in an optical device driven in an optically isotropic liquid crystal phase. The achiral component T includes the first component of formula (1), and a component A as an additional component selected from the compounds of formula (2) and (3). If required, the achiral component T may include, in addition to the component A, at least one compound selected from the group consisting of the fourth component of the achiral component T expressed by formula (4), the fifth component expressed by formula (5), and the sixth component expressed by formula (6). The liquid crystal composition of this invention is a composition that exhibits an optically isotropic liquid crystal phase. The achiral component T and the chiral dopant of this invention preferably include compounds that are selected from the compounds not having radical polymerizable groups.

The amount of the compound of formula (1) relative to the total weight of the achiral component T is suitably from 30 wt % to 85 wt %. The amount of the compound of formula (2) relative to the total weight of the achiral component T is suitably from 0.5 wt % to 70 wt %. The amount of the compound of formula (3) relative to the total weight of the achiral component T is suitably from 0.5 wt % to 70 wt %. The amount of the fourth component of formula (4) relative to the total weight of the achiral component T is suitably from 5 wt % to 40 wt %. The amount of the fifth component of formula (5) relative to the total weight of the achiral component T is suitably from 1 wt % to 50 wt %. The amount of the sixth component of formula (6) relative to the total weight of the achiral component T is preferably from 0 wt % to 40 wt %.

The amount of the chiral dopant relative to the total weight of the liquid crystal composition is from 1 wt % to 40 wt %.

7.2 Chiral Dopant

The chiral dopant contained in the optically isotropic liquid crystal composition is an optically active compound, and is preferably a compound having a large helical twisting power. With a compound having a large helical twisting power, the addition amount required for obtaining a desired pitch can be reduced, so that the driving voltage is prevented from being raised, which is advantageous in practice. Specifically, the compounds of formulae (K1)-(K5) are preferred.

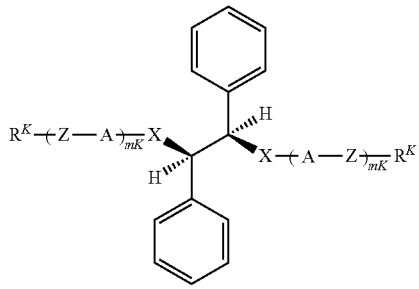 (K1)

(K2) 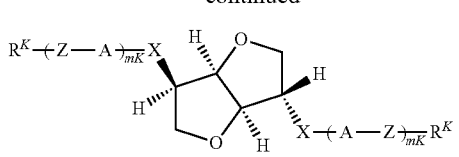

(K3) 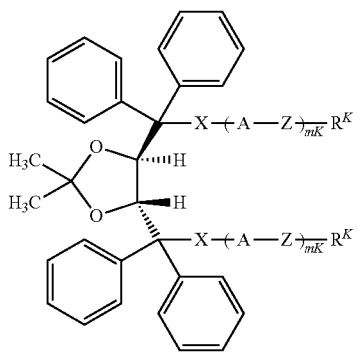

(K4) 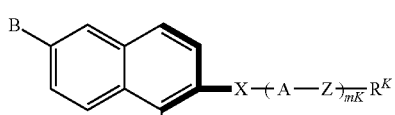

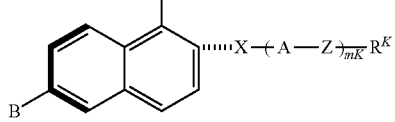

(K5) 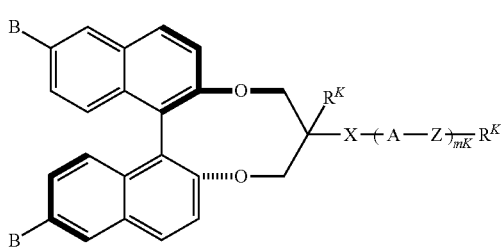

In formulae (K1)-(K5), each $R^K$ is independently hydrogen, halogen, —C≡N, —N=C=O, —N—C=S, or $C_{1-20}$ alkyl in which arbitrary —CH$_2$— may be replaced by —O—, —S—, —COO— or —COO—, arbitrary —CH$_2$—CH$_2$— may be replaced by —CH=CH—, —CF=CF— or —C≡C—, and arbitrary hydrogen may be replaced by halogen. Each A is independently an aromatic six- to eight-membered ring, a non-aromatic three- to eight-membered ring, or a fused ring of 9 or more carbons, wherein in these rings, arbitrary hydrogen may be replaced by halogen, $C_{1-3}$ alkyl or $C_{1-3}$ haloalkyl, —CH$_2$— may be replaced by —O—, —S— or —NH—, and —CH= may be replaced by —N=. Each B is independently hydrogen, halogen, $C_{1-3}$ alkyl, $C_{1-3}$ haloalkyl, an aromatic six- to eight-membered ring, a non-aromatic three- to eight-membered ring, or a fused ring of 9 or more carbons, wherein in these rings, arbitrary hydrogen may be replaced by halogen, $C_{1-3}$ alkyl or $C_{1-3}$ haloalkyl, —CH$_2$— may be replaced by —O—, —S— or —NH—, and —CH= may be replaced by —N=. Each Z is independently a single bond, or $C_{1-8}$ alkylene in which arbitrary —CH$_2$— may be replaced by —O—, —S—, —COO—, —OCO—, —CSO—, —OCS—, —N=N—, —CH=N— or —N=CH—, arbitrary —CH$_2$—CH$_2$— may be replaced by —CH=CH—, —CF=CF— or —C≡C— and arbitrary hydrogen may be replaced by halogen. X is a single bond, —COO—, —OCO—, —CH$_2$O—, —OCH$_2$—, —CF$_2$O—, —OCF$_2$— or —CH$_2$CH$_2$—, and mK is an integer of 1-4.

Among the compounds of formulae (K1) to (K5), as a chiral dopant added in the liquid crystal composition, the compounds of formulae (K2-1) to (K2-8) in the scope of formula (K2), the compounds of formulae (K4-1) to (K4-6) in the scope of formula (K4) and the compounds of formulae (K5-1) to (K5-3) in the scope of formula (K5) are preferred, and those of formulae (K4-1) to (K4-6) and (K5-1) to (K5-3) more preferred.

(K2-1) 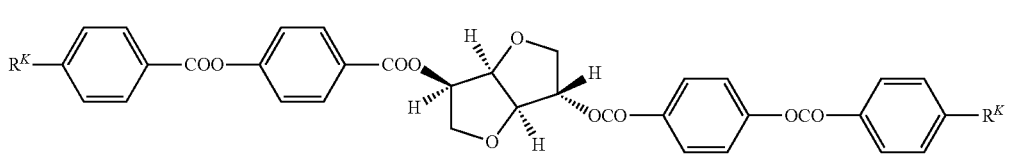

(K2-2) 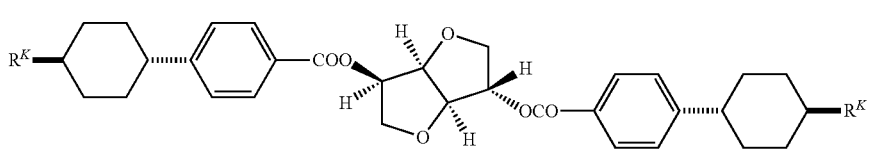

(K2-3) 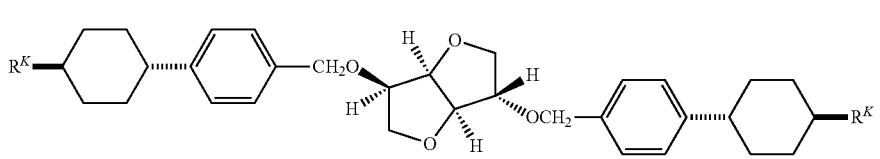

-continued
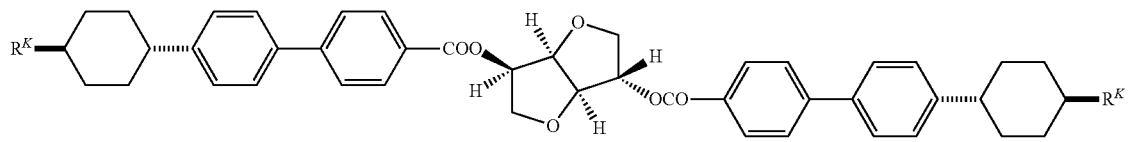
(K2-4)
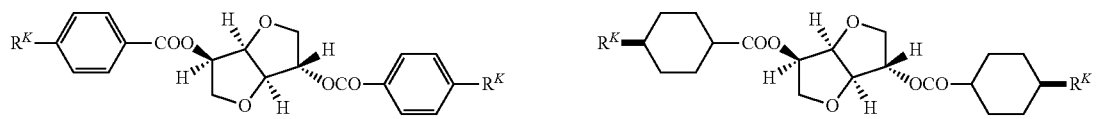
(K2-5) (K2-6)
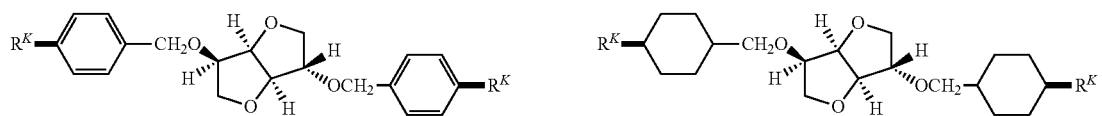
(K2-7) (K2-8)
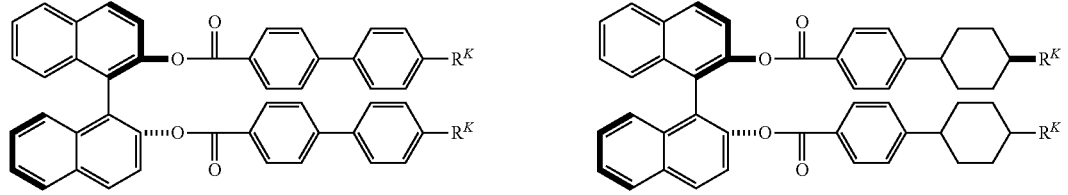
(K4-1) (K4-2)
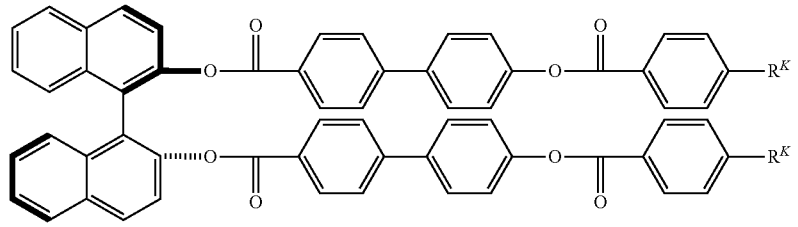
(K4-3)
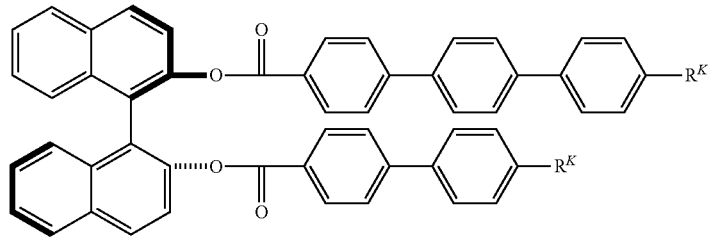
(K4-4)
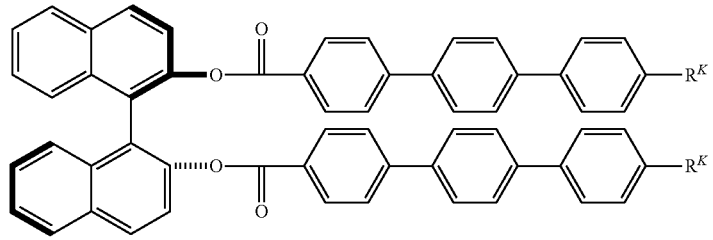
(K4-5)

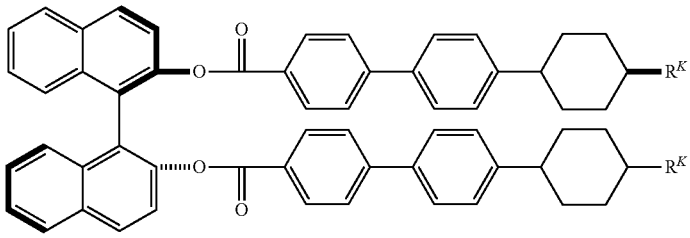
(K4-6)

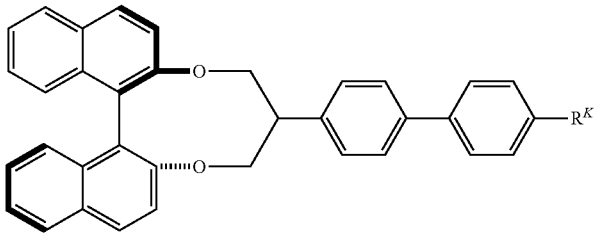
(K5-1)

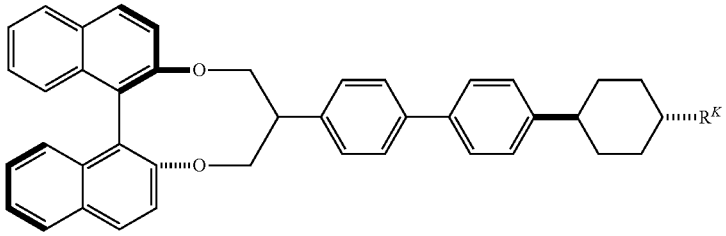
(K5-2)

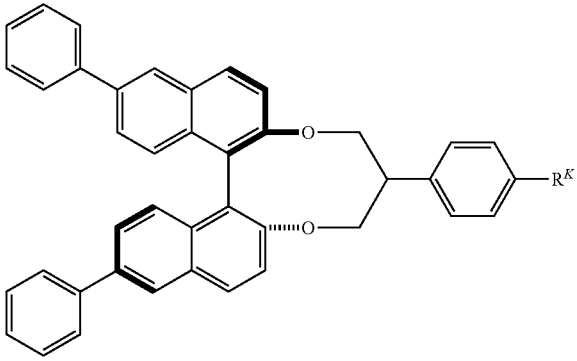
(K5-3)

In these formulae, each $R^K$ is independently $C_{3-10}$ alkyl or $C_{3-10}$ alkoxy, wherein in the alkyl and the alkoxy, arbitrary —$CH_2$— may be replaced by —CH=CH—.

The chiral dopant contained in the liquid crystal composition may include a single compound, or include two or more compounds.

Relative to the total weight of the liquid crystal composition, the amount of the chiral dopant is preferably from 1 wt % to 40 wt %, more preferably from 3 wt % to 25 wt %, and even more preferably from 3 wt % to 10 wt %. A liquid crystal composition containing the chiral dopant in an amount within such ranges easily exhibits an optically isotropic liquid crystal phase, and is therefore preferred.

7.3 Optically Isotropic Liquid Crystal Phase

That a liquid crystal composition has optical isotropy means that the composition exhibits optical isotropy because of macroscopically isotropic arrangement of the liquid crystal molecules but has microscopic liquid crystal order. The pitch corresponding to the microscopic liquid crystal order of the liquid crystal composition (often referred to as "pitch", hereinafter)" is preferably 700 nm or less, more preferably 500 nm or less, and even more preferably 350 nm or less.

Herein, the so-called "non-liquid crystal isotropic phase" refers to a commonly defined isotropic phase, i.e., a disorder phase, or a phase that still exhibits isotropy due to fluctuation even when a region with a non-zero local order parameter is generated. For example, an isotropic phase formed at the high temperature side of a nematic phase is equivalent to the non-liquid crystal isotropic phase in this specification. The chiral liquid crystal in this specification also has a similar definition. Moreover, the term "optically isotropic liquid crystal phase" in this specification means a liquid crystal phase that exhibits optical isotropy without fluctuation, an example of which is a phase exhibiting a platelet structure, i.e., a blue phase in narrow sense.

The optically isotropic liquid crystal composition of this invention has an optically isotropic liquid crystal phase. However, the typical platelet structure in a blue phase is not observed under a polarizing microscope. Therefore, in this specification, a phase exhibiting the platelet structure is designated as a blue phase, and an optically isotropic liquid crystal phase including a blue phase is designated as an optically isotropic liquid crystal phase. That is, the blue phase is included in the optically isotropic liquid crystal phase.

Generally, the blue phases can be divided into three types, blue phase I, blue phase II and blue phase III, which are all optically active and isotropic. In a blue phase I or II, two or more colors of diffracted light produced by Bragg reflection from different lattice planes are observed. The blue phase is generally observed between the isotropic phase and the chiral nematic phase.

That the optically isotropic liquid crystal phase does not exhibit two or more colors of diffracted light means that a platelet structure observed in a blue phase I or II is not observed and the phase substantially exhibits a single color in the entire plane. For an optically isotropic liquid crystal phase not exhibiting two or more colors of diffracted light, brightness/darkness of the color is not necessarily even in plane.

An optically isotropic liquid crystal phase not exhibiting two or more colors of diffracted light has a merit of inhibiting the intensity of the reflected light caused by Bragg reflection, or shifting toward the short wavelength side.

Further, when a liquid crystal material reflecting visible light is used in a display device, sometimes a color variation problem may occur. However, for a liquid crystal not exhibiting two or more colors of diffracted light, the reflection of visible light may be eliminated due to the pitch larger than that in a blue phase in narrow sense (a phase exhibiting the platelet structure), as a result of reflection wavelength shift toward the short wavelength side.

The optically isotropic liquid crystal composition of this invention may be obtained by adding a chiral dopant to a composition having a nematic phase, wherein the chiral dopant is preferably added in a concentration such that the pitch is 700 nm or less. Moreover, the composition having a nematic phase contains a compound of formula (1) and other necessary components. Furthermore, the optically isotropic liquid crystal composition of this invention may alternatively be obtained by adding a chiral dopant to a composition having a chiral nematic phase but no optically isotropic liquid crystal phase. The composition having a chiral nematic phase but no optically isotropic liquid phase contains a compound of formula (1), an optically active compound, and other necessary components, wherein the optically active compound is preferably added in a concentration such that the pitch is 700 nm or more to exhibit an optically isotropic liquid crystal phase. The optically active compounds to be added may be the above compounds with a large helical twisting power, that is, the compounds of formulae (K1) to (K5), and more preferably those of formulae (K2-1) to (K2-8), (K4-1) to (K4-6) and (K5-1) to (K5-3). Moreover, the optically active compound being added may not have a large helical twisting power. Such an optically active compound is, for example, one added in a liquid crystal composition for use of a device driven in a nematic phase (in TN mode or STN mode, etc.).

Examples of the compound without a large helical twisting power are the following optically active compound (Op-1) to (Op-13).

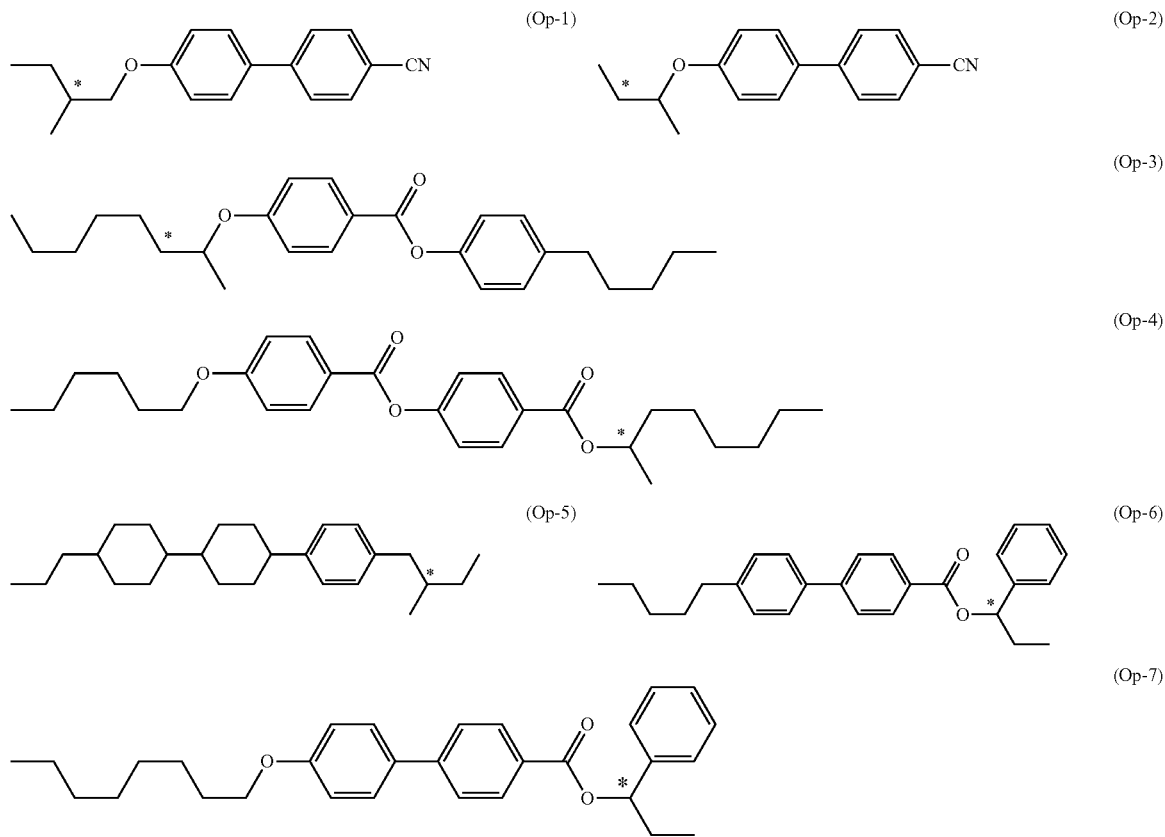

-continued

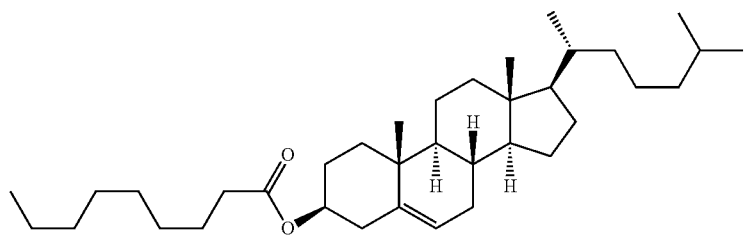
(Op-8)

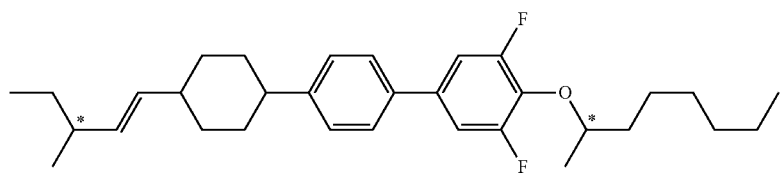
(Op-9)

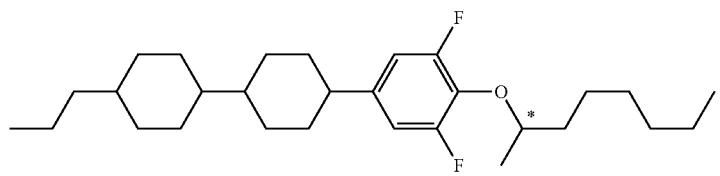
(Op-10)

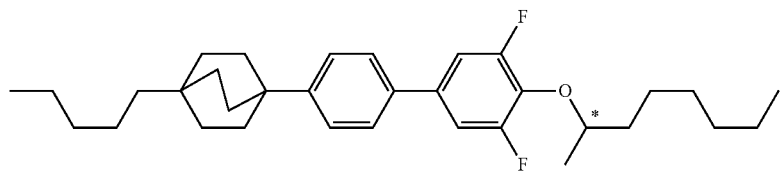
(Op-11)

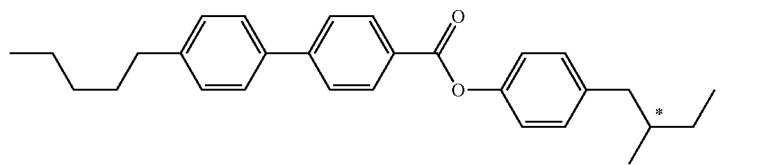
(Op-12)

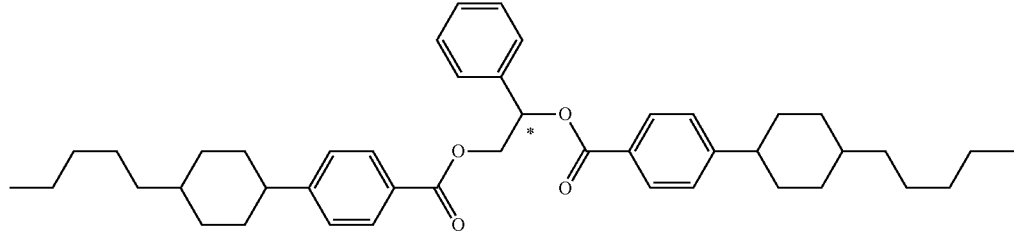
(Op-13)

Moreover, the temperature range of the optically isotropic liquid crystal composition of this invention can be broadened by adding a chiral dopant to a liquid crystal composition having a wide temperature range for the co-existence of a nematic phase or a chiral nematic phase and an isotropic phase for exhibiting an optically isotropic liquid crystal phase. For example, a composition exhibiting an optically isotropic liquid crystal phase in a wide temperature range can be prepared as follows. A liquid crystal compound having a high clearing point is mixed with a liquid crystal compound having a low clearing point to prepare a liquid crystal composition with a wide temperature range for the co-existence of a nematic phase and an isotropic phase. Then, a chiral dopant is added to the liquid crystal composition.

For a liquid crystal composition with a wide co-existence temperature range of a nematic or chiral nematic phase and an isotropic phase, the difference between the upper-limit temperature and the lower-limit temperature of the co-existence is preferably from 3° C. to 150° C., and more preferably from 5° C. to 150° C. Moreover, the liquid crystal composition preferably has a difference of 3° C. to 150° C. between the upper-limit temperature and the lower-limit temperature of the co-existence of the nematic phase and the isotropic phase.

When an electric field is applied to the liquid crystal medium of this invention in an optically isotropic liquid crystal phase, an electric-birefringence occurs but the Kerr effect does not necessarily occur. Because the electric-birefringence of an optically isotropic liquid crystal phase increases with the pitch, the electric-birefringence can be increased by adjusting the species and content of the chiral dopant to increase the pitch, as long as other optical properties, such as transmittance and diffraction wavelength etc., could be satisfied.

7-4. Other Components

Other compounds, such as a polymer material, may be further added into the optically isotropic liquid crystal composition of this invention, so long as they do not affect the properties of the composition. In addition to the polymer material, the liquid crystal composition of this invention may also contain, for example, a dichroic dye or a photochromic compound. Examples of the dichroic dye include merocyanine dyes, styryl dyes, azo dyes, azomethine dyes, azoxy dyes, quinophthalone dyes, anthraquinone dyes, tetrazine dyes and so on.

8. Optically Isotropic Polymer/Liquid Crystal Composite Material

The $8^{th}$ aspect of this invention is a composite material of a polymer and a liquid crystal composition containing a compound of formula (1) and a chiral dopant, which exhibits optical isotropy. The polymer/liquid crystal composite material can be used in an optical device driven in an optically isotropic liquid crystal phase, which may include the liquid crystal composition (CLC) according to any of items [1]-[32] and a polymer.

The term "polymer/liquid crystal composite material" of this invention has no particular limitation, as long as it is a composite containing both a liquid crystal material and a polymeric compound, wherein the polymer may be partially or entirely not dissolved in the liquid crystal material so that the polymer is separated from the liquid crystal material. Further, in this specification, a nematic phase refers to one in narrow sense but does not include a chiral nematic phase, unless specifically indicated.

The optically isotropic polymer/liquid crystal composite material according to a preferred aspect of this invention can exhibit an optically isotropic liquid crystal phase in a wide temperature range. Moreover, the polymer/liquid crystal composite material according to a preferred aspect of this invention has very high response speed. Based on such effects, the polymer/liquid crystal composite material according to a preferred aspect of this invention is useful in an optical device such as a display device.

8-2 Polymer

Though the composite material of this invention can be produced by mixing an optically isotropic liquid crystal composition with a pre-polymerized polymer, it is preferably produced by mixing a low molecular weight monomer, macromonomer or oligomer, etc. (generally referred to as "monomer", hereinafter) as a raw material of the polymer with the liquid crystal composition CLC and then polymerizing the mixture. In this specification, the mixture containing the monomer and the liquid crystal composition is referred to as "polymerizable monomer/liquid crystal mixture", which may optionally contain a polymerization initiator, a curing agent, a catalyst, a stabilizer, a dichroic dye or a photochromic compound, etc., without compromising the effects of this invention. For example, if required, the polymerizable monomer/liquid crystal mixture of this invention may contain 0.1-20 weight parts of a polymerization initiator, relative to 100 weight parts of the polymerizable monomer. The "polymerizable monomer/liquid crystal mixture" has to be a liquid crystal medium when being polymerized in the blue phase, but is not necessarily a liquid medium when being polymerized in the isotropic phase.

The polymerization temperature is preferably such that the polymer/liquid crystal composite material exhibits high transparency and isotropy, and more preferably such that the mixture of the monomer and the liquid crystal material exhibits an isotropic phase or a blue phase, while the polymerization is carried out in the isotropic phase or optically isotropic liquid crystal phase. That is, the polymerization temperature is preferably set such that after the polymerization, the polymer/liquid crystal composite material substantially does not scatter light of wavelength greater than that of visible light and exhibit optical isotropy.

For example, a low molecular weight monomer, macromonomer or oligomer can be used as a raw material of the polymer constituting the composite material of this invention. In this specification, the raw-material monomer of the polymer covers low molecular weight monomers, macromonomers and oligomers, etc. Furthermore, the obtained polymer preferably has a three-dimensional cross-linked structure, and hence the raw-material monomer of the polymer is preferably a multi-functional monomer having two or more polymerizable functional groups. The polymerizable functional groups have no particular limitation; examples thereof include acryloyl, methacryloyl, glycidyl, epoxy, oxetanyl, vinyl and so on. In view of the polymerization rate, acryloyl and methacryloyl are preferred. It is preferred that the raw material monomers of the polymer contain 10 wt % or more of a monomer having two or more polymerizable functional groups, since the obtained composite material of this invention can easily exhibit high transparency and isotropy.

Moreover, in order to obtain a suitable composite material, the polymer preferably has mesogen moieties, and a part or all of the raw material monomers of the polymer used can have a mesogen moiety.

8-2-1. Mono- and Di-Functional Monomers Having a Mesogen Moiety

The mono- and di-functional monomers having a mesogen moiety has no particular limitation in structure, and can be, for example, the compounds of formula (M1) or (M2) below.

(M1)

(M2)

(M3-1)

(M3-2)

(M3-3)

(M3-4)

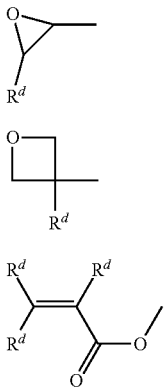

In formula (M1), each $R^a$ is independently hydrogen, halogen, —C≡N, —N═C═O, —N═C═S, or $C_{1-20}$ alkyl in which arbitrary —$CH_2$— may be replaced by —O—, —S—, —CO—, —COO— or —COO—, arbitrary —$CH_2$—$CH_2$— may be replaced by —CH═CH—, —CF═CF— or —C≡C— and arbitrary hydrogen atom may be replaced by halogen or —C≡N. Each $R^b$ is independently a polymerizable functional group of one of formulae (M3-1) to (M3-7).

$R^a$ is preferably hydrogen, halogen, —C≡N, —$CF_3$, —$CF_2H$, —$CFH_2$, —$OCF_3$, —$OCF_2H$, $C_{1-20}$ alkyl, $C_{1-19}$ alkoxy, $C_{2-21}$ alkenyl or $C_{2-21}$ alkynyl, and is particularly preferably —C≡N, $C_{1-20}$ alkyl or $C_{1-19}$ alkoxy.

In formula (M2), each $R^b$ is independently a polymerizable functional group of one of formulae (M3-1) to (M3-7).

In formulae (M3-1) to (M3-7), each $R^d$ is independently hydrogen, halogen, or $C_{1-5}$ alkyl in which arbitrary hydrogen may be replaced by halogen. $R^d$ is preferably hydrogen, halogen or methyl, and is particularly preferably hydrogen, fluorine or methyl.

Moreover, the compounds of formulae (M3-2), (M3-3), (M3-4) and (M3-7) are preferably polymerized with free radicals. The compounds of formulae (M3-1), (M3-5) and (M3-6) are preferably polymerized with cations. The above polymerizations are all active polymerization, and are initiated as a small amount of free radical or cationic active species is generated in the reaction system. To accelerate generation of the active species, a polymerization initiator can be used. The active species can be generated by light or heat.

In formulae (M1) and (M2), each $A^M$ is independently an aromatic or non-aromatic five-membered ring, six-membered ring or fused ring of 9 or more carbons, in which —$CH_2$— may be replaced by —O—, —S—, —NH— or —$NCH_3$—, —CH═ may be replaced by —N═, and hydrogen may be replaced by halogen, $C_{1-5}$ alkyl or $C_{1-5}$ haloalkyl. Specific examples of preferred $A^M$ are 1,4-cyclohexylene, 1,4-cyclohexenylene, 1,4-phenylene, naphthalene-2,6-diyl, tetrahydronaphthalene-2,6-diyl, fluorene-2,7-diyl and bicyclo[2.2.2]octan-1,4-diyl. In these rings, arbitrary —$CH_2$— may be replaced by —O—, arbitrary —CH═ may be replaced by —N═, and arbitrary hydrogen may be replaced by halogen, $C_{1-5}$ alkyl or $C_{1-5}$ haloalkyl.

In consideration of the stability of the compound, —$CH_2$—O—$CH_2$—O— with two oxygen atoms not adjacent to one another is preferred to —$CH_2$—O—O—$CH_2$— with two oxygen atoms adjacent to one another. This also applies to the case of sulfur.

Among these rings, 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxan-2,5-diyl, pyridine-2,5-diyl and pyrimidin-2,5-diyl are particularly preferred for $A^M$. Furthermore, the stereo configuration of 1,4-cyclohexylene and 1,3-dioxan-2,5-diyl above is in the trans-form superior to in the cis-form.

Because 2-fluoro-1,4-phenylene and 3-fluoro-1,4-phenylene are identical in the structure, the latter is not exemplified. This also applies to the case of the relationship between 2,5-difluoro-1,4-phenylene and 3,6-difluoro-1,4-phenylene, etc.

In formulae (M1) and (M2), each Y is independently a single bond, or $C_{1-20}$ alkylene in which arbitrary —$CH_2$— may be replaced by —O— or —S—, and arbitrary —$CH_2$—$CH_2$— may be replaced by —CH═CH—, —COO— or —COO—. Y is preferably a single bond, —$(CH_2)_{m2}$—, —$O(CH_2)_{m2}$— or —$(CH_2)_{m2}O$—, wherein m2 is an integer of 1 to 20. Y is particularly preferably a single bond, —$(CH_2)_{m2}$—, —$O(CH_2)_{m2}$— or —$(CH_2)_{m2}O$—, wherein m2 is an integer of 1 to 10. In consideration of the stability of the compound, —Y—$R^a$ and —Y—$R^b$ preferably include no —O—O—, —O—S—, —S—O— or —S—S—.

In formulae (M1) and (M2), each $Z^M$ is independently a single bond, —$(CH_2)_{m3}$—, —$O(CH_2)_{m3}$—, —$(CH_2)_{m3}O$—, —$O(CH_2)_{m3}O$—, —CH═CH—, —C≡C—, —COO—, —OCO—, —$(CF_2)_2$—, —$(CH_2)_2$—COO—, —OCO—$(CH_2)_2$—, —CH═CH—COO—, —OCO—CH═CH—, —C≡C—COO—, —OCO—C≡C—, —CH═CH—$(CH_2)_2$—, —$(CH_2)_2$—CH═CH—, —CF═CF—, —C≡C—CH═CH—, —CH═CH—C≡C—, —$OCF_2$—$(CH_2)_2$—, —$(CH_2)_2$—$CF_2O$—, —$OCF_2$— or —$CF_2O$—, wherein m3 is an integer of 1-20.

$Z^M$ is preferably a single bond, —$(CH_2)_{m3}$—, —$O(CH_2)_{m3}$—, —$(CH_2)_{m3}O$—, —CH═CH—, —C≡C—, —COO—, —OCO—, —$(CH_2)_2$—COO—, —OCO—$(CH_2)_2$—, —CH═CH—COO—, —OCO—CH═CH—, —$OCF_2$— or —$CF_2O$—.

In formulae (M1) and (M2), m1 is an integer of 1-6, preferably an integer of 1-3. When m1 is 1, they are bicyclic compounds with two rings such as six-membered rings. When m1 is 2 or 3, they are tricyclic or tetracyclic compounds. For example, when m1 is 1, the two $A^M$'s can be identical or different. Moreover, when m1 is 2, the three $A^M$'s (or two $Z^M$'s) can be identical or different. When m1 is from 3 to 6, it is also the case. This also applies to respective cases of $R^a$, $R^b$, $R^d$, $Z^M$, $A^M$ and Y.

Even when the compound (M1) of formula (M1) or the compound (M2) of formula (M2) contains an isotope, such as $^2H$ (deuterium) and $^{13}C$, in an amount higher than the natural abundance, it is useful due to the identical properties thereof.

More preferred examples of the compounds (M1) and (M2) are compounds (M1-1) to (M1-41) and (M2-1) to (M2-27) of formulae (M1-1) to (M1-41) and (M2-1) to (M2-27). In these compounds, $R^a$, $R^b$, $R^d$, $Z^M$, $A^M$, Y and p are defined as in the cases of formulae (M1) and (M2) in the above aspects of this invention.

The following partial structures of the compounds (M1-1) to (M1-41) and (M2-1) to (M2-27) are described now. The partial structure (a1) represents 1,4-phenylene in which arbitrary hydrogen is replaced by fluorine. The partial structure (a2) represents 1,4-phenylene in which arbitrary hydrogen may be replaced by fluorine. The partial structure (a3) represents 1,4-phenylene in which arbitrary hydrogen may be replaced by fluorine or methyl. The partial structure (a4) represents fluorenylene in which the hydrogen at position 9 may be replaced by methyl.

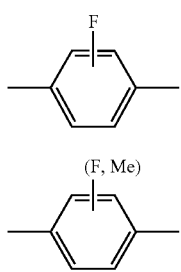 (a1)
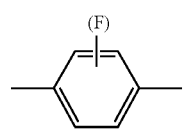 (a2)
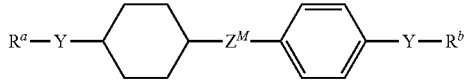 (a3)
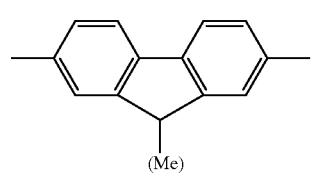 (a4)
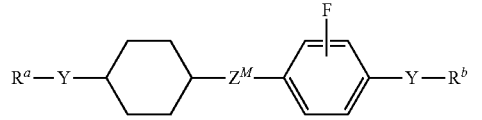 (M1-1) (M1-2)
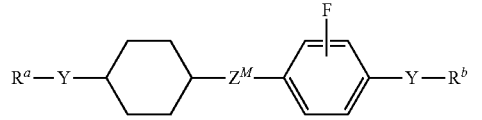 (M1-3) (M1-4)
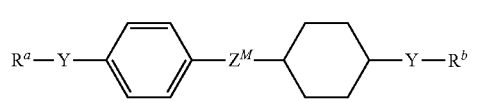 (M1-5) (M1-6)
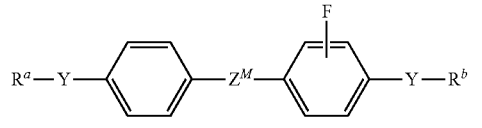 (M1-7) (M1-8)
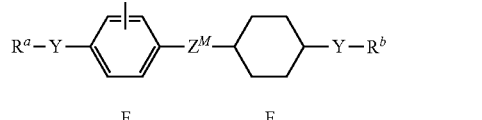 (M1-9) (M1-10)
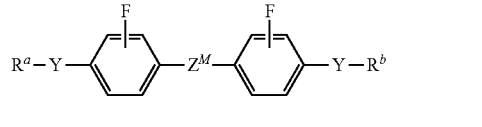 (M1-11) (M1-12)
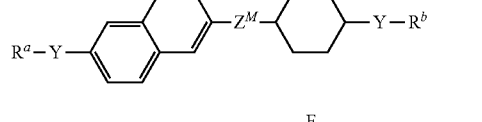 (M1-13) (M1-14)
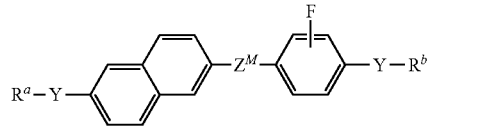 (M1-15) (M1-16)
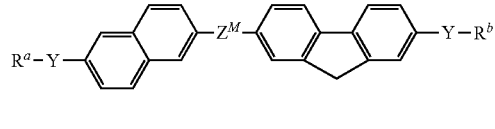 (M1-17) (M1-18)
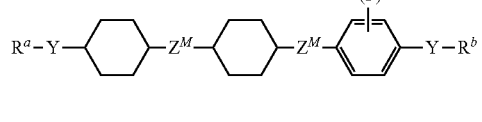 (M1-19) (M1-20)
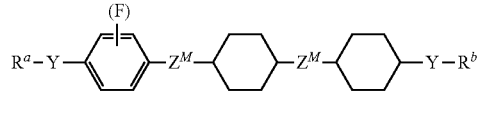

(M1-21) 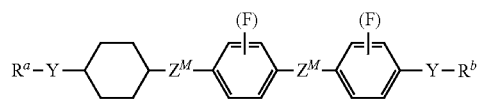
(M1-22) 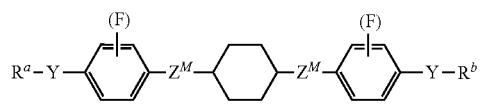
(M1-23) 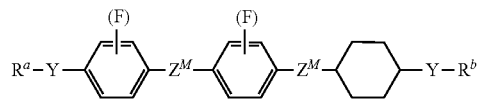
(M1-24) 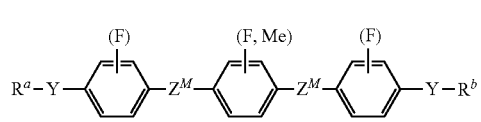
(M1-25) 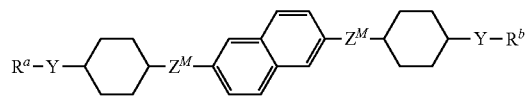
(M1-26) 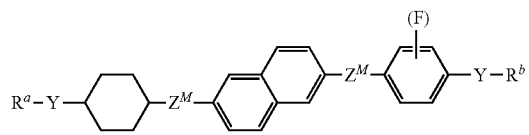
(M1-27) 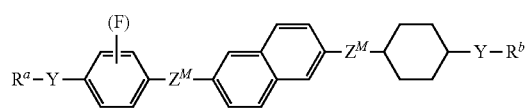
(M1-28) 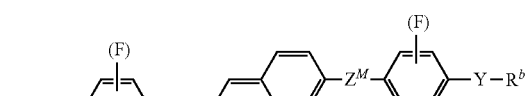
(M1-29) 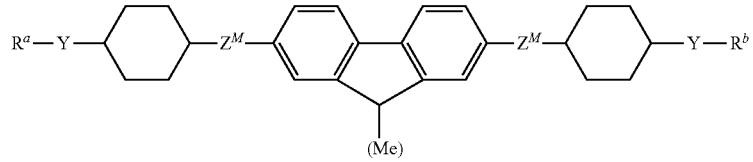
(M1-30) 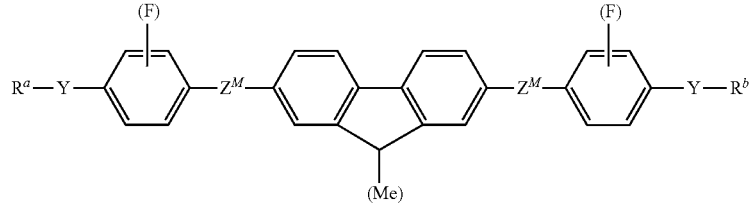
(M1-31) 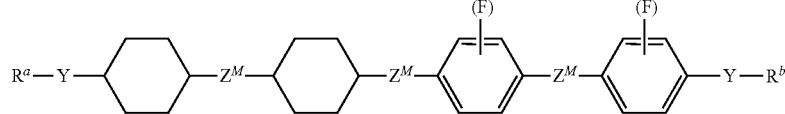
(M1-32) 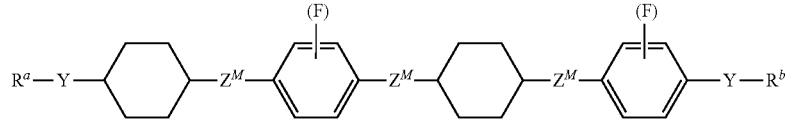
(M1-33) 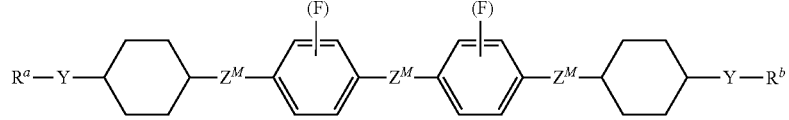
(M1-34) 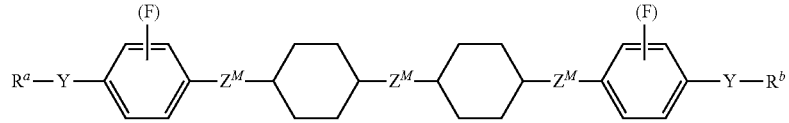
(M1-35) 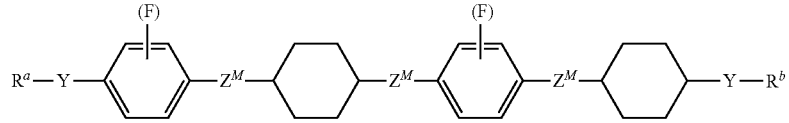

-continued
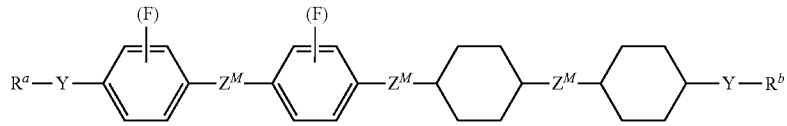
(M1-36)
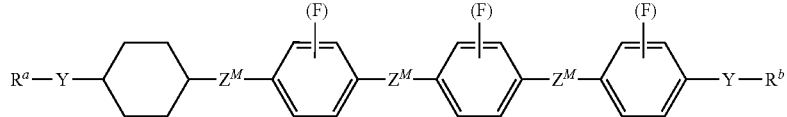
(M1-37)
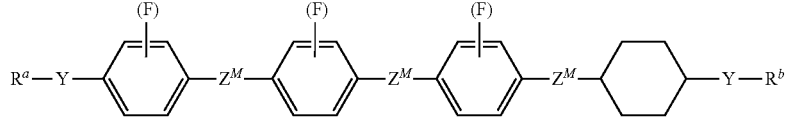
(M1-38)
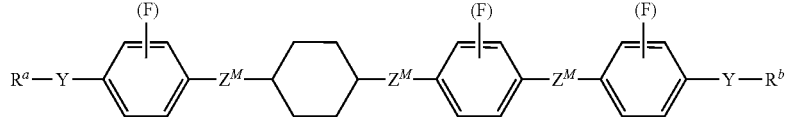
(M1-39)
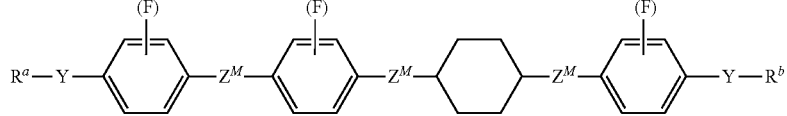
(M1-40)
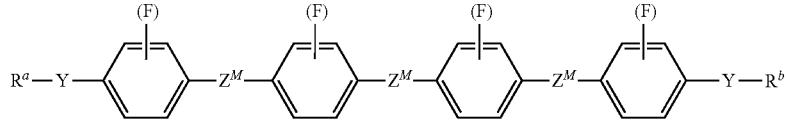
(M1-41)
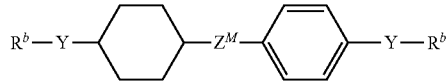
(M2-1)
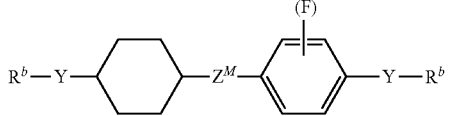
(M2-2)
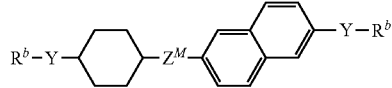
(M2-3)
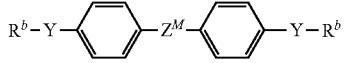
(M2-4)
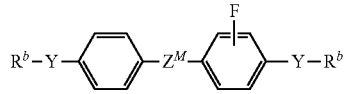
(M2-5)
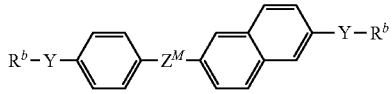
(M2-6)
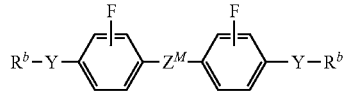
(M2-7)
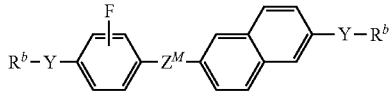
(M2-8)
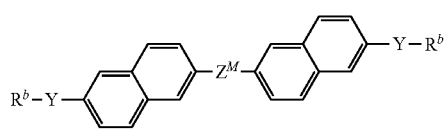
(M2-9)
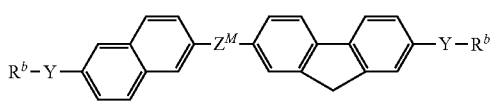
(M2-10)
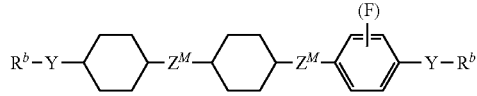
(M2-11)
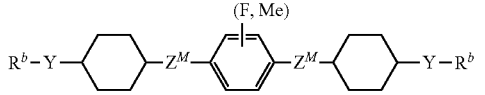
(M2-12)

(M2-13) 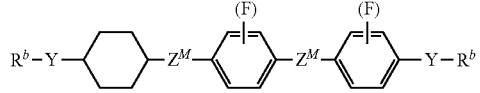
(M2-14) 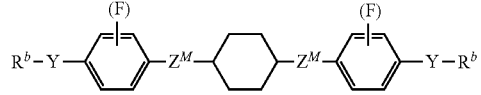
(M2-15) 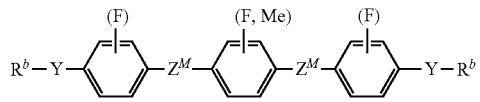
(M2-16) 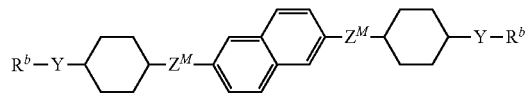
(M2-17)
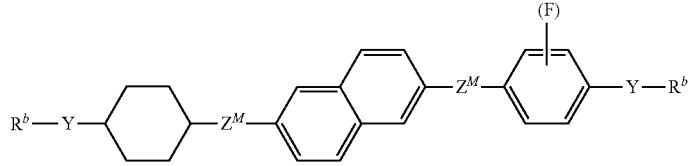
(M2-18)
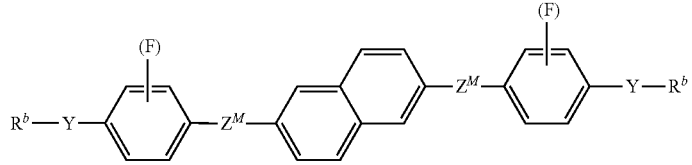
(M2-19)
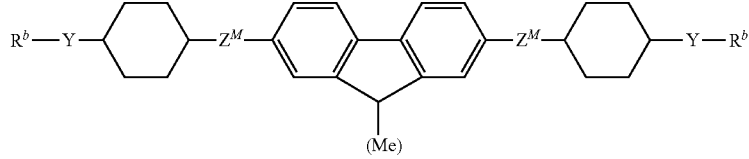
(M2-20)
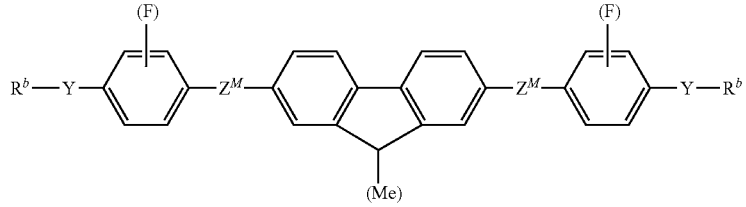
(M2-21)
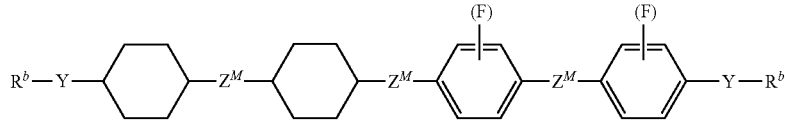
(M2-22)
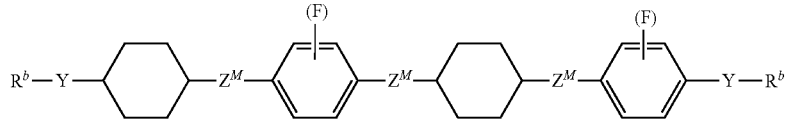
(M2-23)
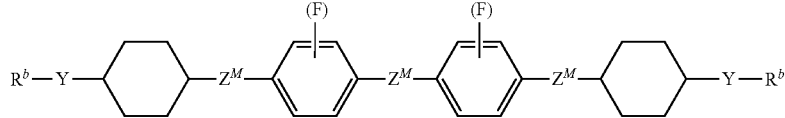
(M2-24)
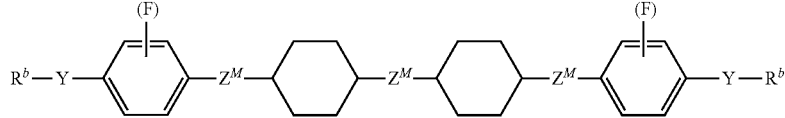

-continued

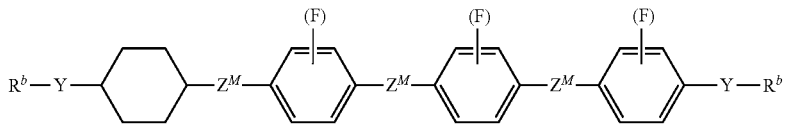
(M2-25)

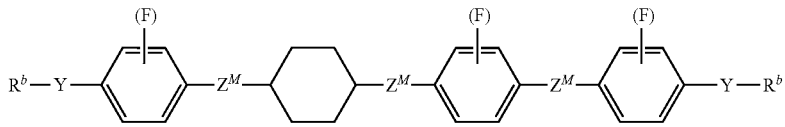
(M2-26)

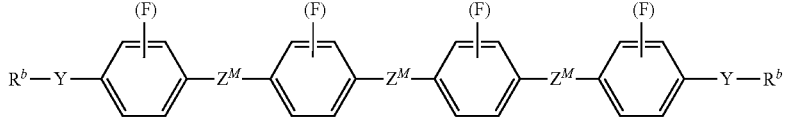
(M2-27)

A monomer having no aforementioned mesogen moiety, and a polymerizable compound having a mesogen moiety other than the monomers (M1) and (M2) can be used, if required.

In order to optimize the optical isotropy of the polymer/liquid crystal composite material of this invention, a monomer having a mesogen moiety and three or more polymerizable functional groups can be used. Such a monomer may be a well-known compound, for example, one of formulae (M4-1) to (M4-3), and more specifically a compound described in Japanese Patent Publication Nos. 2000-327632, 2004-182949 and 2004-59772. In formulae (M4-1)-(M4-3), $R^b$, Za, Y and (F) are defined as above.

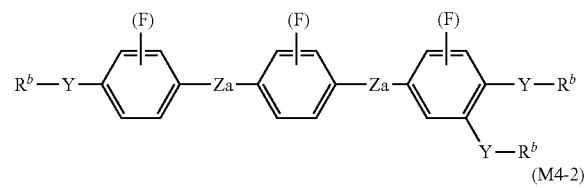
(M4-1)

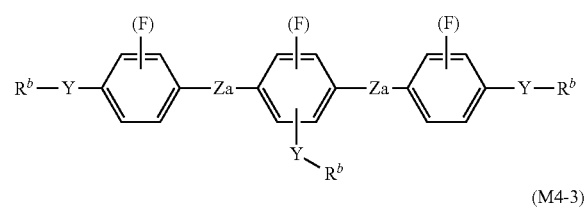
(M4-2)

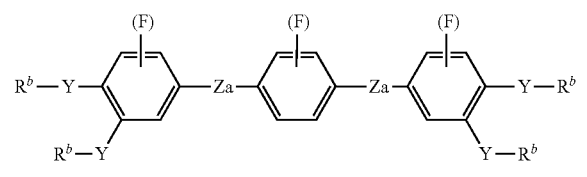
(M4-3)

8-2-2. Monomer Having No Mesogen Moiety and Having Polymerizable Functional Groups Examples of the monomer having no mesogen moiety and having polymerizable groups are straight and branched acrylates of 1-30 carbon atoms, straight and branched diacrylates of 1-30 carbon atoms, and monomers having three or more polymerizable groups. Examples of the monomers having three or more polymerizable groups are, but not limited to, glycerol.propoxylate (1PO/OH) triacrylate, pentaerythritol.propoxylate.triacrylate, pentaerythritol.triacrylate, trimethylolpropane.ethoxylate.triacrylate, trimethylolpropane.propoxylate, triacrylate, trimethylolpropane.triacrylate, di(trimethylolpropane)tetraacrylate, pentaerythrit.tetraacrylate, di(pentaerythritol)pentaacrylate, di(pentaerythritol) hexaacrylate and trimethylolpropane.triacrylate.

8-2-3. Polymerization Initiator

The polymerization reaction for producing the polymer constituting the composite material of this invention is not particularly limited, and may be, e.g., photo-radical polymerization, thermo-radical polymerization or photo-cationic polymerization, etc.

The polymerization initiators useful for photo-radical polymerization are, for example, DAROCUR™ 1173 and 4265 (both are trade names, from BASF Japan Ltd.) and IRGACURE™ 184, 369, 500, 651, 784, 819, 907, 1300, 1700, 1800, 1850 and 2959 (all are trade names, from BASF Japan Ltd.).

Preferred examples of the initiators causing radical polymerization with heat and being useful in thermo-radical polymerization are: benzoyl peroxide, diisopropyl peroxydicarbonate, t-butyl peroxy2-ethylhexanoate, t-butyl peroxypivalate, t-butyl peroxydiisobutyrate, lauroyl peroxide, dimethyl 2,2'-azobisisobutyrate (MAIB), di-t-butyl peroxide (DTBPO), azobisisobutyronitrile (AIBN) and azobiscyclohexanecarbonitrile (ACN), etc.

Examples of polymerization initiators useful in photo-cationic polymerization are diaryliodonium salt (referred to as "DAS", hereinafter) and triarylsulfonium salt (referred to as "TAS", hereinafter), etc.

Examples of DAS are diphenyliodonium tetrafluoroborate, diphenyliodonium hexafluorophosphonate, diphenyliodonium hexafluoro arsenate, diphenyliodonium trifluoromethanesulfonate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, and 4-methoxyphenylphenyliodonium p-toluenesulfonate.

DAS can be sensitized by adding a photosensitizer, such as thioxanthone, phenothiazine, chlorothioxanthone, xanthone, anthracene, diphenyl anthracene or rubrene, etc.

Examples of TAS are triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoro acetate, triphenylsulfonium p-toluenesulfonate, triphenylsulfonium tetrakis(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoro acetate, and 4-methoxyphenyldiphenylsulfonium p-toluenesulfonate, etc.

Specific examples of the photo-cationic polymerization initiator are Cyracure™ UVI-6990, UVI-6974 and UVI-6992 (all are trade names, from UCC Corporation), ADEKA OPTOMER™ SP-150, SP-152, SP-170 and SP-172 (all are trade names, from ADEKA Corporation), Rhodorsil Photoinitiator™ 2074 (trade name, from Rhodia Japan Corporation), IRGACURE™ 250 (trade name, from BASF Japan Ltd.) and UV-9380C (trade name, from GE/Toshiba Silicone Co. Ltd.), etc.

8-2-4. Curing Agents and Others

In preparing the polymer constituting the composite material of this invention, in addition to the monomers and polymerization initiator mentioned above, other suitable component(s), for example, curing agent, catalyst and/or stabilizer may also be added.

The well-known latent curing agents commonly used for epoxy resins can be used. Examples of the latent curing agents for epoxy resins are amine curing agents, Novolac curing agents, imidazole curing agents and anhydride curing agents, etc. Examples of amine curing agents are aliphatic polyamines such as diethylenetriamine, triethylenetetraamine, tetraethylenepentaamine, m-xylenediamine, trimethyl hexanediamine, 2-methyl-pentanediamine and diethylaminopropylamine; alicyclic polyamines such as isophorone diamine, 1,3-diaminomethylcyclohexane, bis(4-aminocyclohexyl)methane, norbornenediamine, 1,2-diaminocyclohexane and Laromin; and aromatic polyamines such as diaminodiphenylmethane, diaminodiphenylethane and m-phenylenediamine.

Examples of the Novolac curing agents are phenol/Novolac resin, bisphenol/Novolac resin, etc. Examples of the imidazole curing agents are 2-methylimidazole, 2-ethylhexylimidazole, 2-phenylimidazole and 1-cyanoethyl-2-phenylimidazolium trimellitate, etc.

Examples of the anhydride curing agents are tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride, and benzophenonetetracarboxylic dianhydride, etc.

Furthermore, a curing promoter may also be used to facilitate the curing reaction of a polymerizable compound with glycidyl, epoxy or oxetanyl and the curing agent. Examples of the curing promoter are tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organophosphorus compounds such as triphenylphosphine; quaternary phosphosium salts such as tetraphenylphosphosium bromide; diazobicyclo alkenes such as 1,8-diazobicyclo-[5.4.0]undecene-7 or an organic acid salt thereof; quaternary ammonium salts such as tetraethylammonium bromide, and tetrabutylammonium bromide; boron compounds such as boron trifluoride and triphenyl borate, etc. These curing promoters can be used alone, or in a combination of two or more.

Moreover, a stabilizer is preferably added to prevent unwanted polymerization, for example, during storage. The stabilizer can be any compound well known to a person of ordinary skill in the art; representative examples thereof are 4-ethoxyphenol, hydroquinone and butylated hydroxytoluene (BHT), etc.

8-3. Content of Liquid Crystal Composition, etc.

The content of the liquid crystal composition in the polymer/liquid crystal composite material of this invention is preferably as high as possible, so long as it is within a range in which the composite material can exhibit an optically isotropic liquid crystal phase. This is because the electric-birefringence of the composite material of this invention is greater when the content of the liquid crystal composition is higher.

In the polymer/liquid crystal composite material of this invention, the content of the liquid crystal composition is preferably 60-99 wt %, more preferably 60-95 wt % and particularly preferably 65-95 wt %, relative to the composite material. The content of the polymer is preferably 1-40 wt %, more preferably 5-40 wt % and particularly preferably 5-35 wt %, relative to the composite material.

8-4. Other Components

The polymer/liquid crystal composite material of this invention may also contain, for example, a dichroic dye and a photochromic compound, without compromising the effects of this invention.

This invention is further described with reference to the examples, but is not limited thereto. Furthermore, "%" denotes "wt %", unless specifically indicated.

9. Optical Device

The $9^{th}$ aspect of this invention is an optical device, which contains the liquid crystal composition or the polymer/liquid crystal composite material (both referred to as "liquid crystal medium" hereinafter) and is driven in an optically isotropic liquid crystal phase.

The liquid crystal medium is optically isotropic in absence of an electric field but exhibits an optical anisotropy in presence of an electric field, so that optical modulation can be achieved with an electric field.

The structure of the liquid crystal display device is, for example, shown in FIG. 1, in which the electrodes on the comb-like electrode substrate are arranged such that parts of the electrode 1 extending from the left side and parts of the electrode 2 extending from the right side are alternatively arranged. When there is a potential difference between the electrodes 1 and 2, the comb-like electrode substrate is provided with an electric field in two directions (upward and downward), as shown in FIG. 1.

EXAMPLES

An obtained compound was characterized with the proton nuclear magnetic resonance ($^1$H-NMR) spectrum and the gas chromatogram obtained from the gas chromatography (GC) analysis. The analysis methods are firstly described below.

$^1$H-NMR analysis: $^1$H-NMR analysis was carried out using DRX-500 (made by Bruker BioSpin). In the measurement, a sample prepared in an example was dissolved in a deuterated solvent capable of dissolving the sample, such as $CDCl_3$, and was then measured with the NMR apparatus of 500 MHz at room temperature in 24 times of accumulation. In the resulting NMR spectrum, "s" denotes singlet, "d" denotes doublet, "t" denotes triplet, "q" denotes quartet and "m" denotes multiplet. Tetramethylsilane (TMS) was used as the standard of zero chemical shift (δ).

GC analysis: GC analysis was carried out using a GC apparatus Model GC-14B (made by Shimadzu Corporation). The column being used was the capillary column CBP1-M25-025 (length=25 m, inner diameter=0.22 mm, film thickness=0.25 μm) made by Shimadzu Corporation, wherein the stationary liquid phase was dimethylpolysiloxane (without polarity). The carrier gas was helium, in a flow rate adjusted to 1 ml/min. The sample evaporation chamber was set at 300° C., and the detector (flame ionization detector, FID) was set at 300° C.

A sample was dissolved in toluene to give a solution of 1 wt %, and then 1 μl of the solution was injected into the sample evaporation chamber.

The recorder used was Chromatopac Model C-R6A made by Shimadzu Corporation, or an equivalent thereof. The resulting gas chromatogram showed peak retention times and peak areas corresponding to the component compounds.

The solvent for diluting the sample was, for example, chloroform or hexane, etc. The column used was, for example, capillary column DB-1 (length=30 m, inner diameter=0.32 mm, film thickness=0.25 μm) made by Agilent Technologies Inc., HP-1 (length=30 m, inner diameter=0.32 mm, film thickness=0.25 μm) made by Agilent Technologies Inc., Rtx-1 (length=30 m, inner diameter=0.32 mm, film thickness=0.25 μm) made by Restek Corporation, or BP-1 (length=30 m, inner diameter=0.32 mm, film thickness=0.25 μm) made by SGE International Pty. Ltd.

The area ratios of the peaks in the gas chromatogram correspond to the ratios of the component compounds. Generally, the weight percentages of the component compounds in the analyzed sample are not completely identical to the area percentages of the peaks. In this invention, however, when the above columns are used, the correction coefficient is substantially equal to one, and therefore the weight percentages of the component compounds in the analyzed sample are substantially equivalent to the area percentages of the peaks. This is because there is no significant difference among the correction coefficients of the component compounds. In order to more accurately calculate the ratios of the liquid crystal compounds in the liquid crystal composition with GC, the internal standard method for GC can be used, wherein GC measurements were simultaneously performed on an accurately weighed specified amount of a liquid crystal compound component (detected component) and a liquid crystal compound as standard (standard), and a relative intensity was calculated in advance as a peak area ratio of the detected component to the standard. If a correction was done using the relative intensity expressed as peak area ratio of each component to the standard, the ratios of the liquid crystal compounds in the liquid crystal composition can be more accurately calculated with GC analysis.

Samples for Determining Characteristic Values of Liquid Crystal Compounds

Upon measuring the characteristic values, there are two methods, i.e., taking a pure compound as a sample, and mixing a compound in a mother liquid crystal to form a sample.

When a sample prepared by mixing a compound with a mother liquid crystal is measured, the following method is used for the measurement. Firstly, 15 wt % of the obtained liquid crystal compound was mixed with 85 wt % of the mother liquid crystal to prepare a sample, and then the characteristic value of the compound is calculated from the measured value with the extrapolation method according to the equation below.

[Extrapolated Value]=(100×[measured value of the sample]−[wt % of the mother liquid crystal]× [measured value of the mother liquid crystal])/ [wt % of the liquid crystal compound]

While a smectic phase or crystal might be separated at the above ratio of the liquid crystal compound to the mother liquid crystal at 25° C., the ratio of the liquid crystal compound and the mother liquid crystal was changed to 10 wt %:90 wt %, 5 wt %:95 wt % and 1 wt %:99 wt % in order. The composition without separation of a smectic phase or crystal at 25° C. was measured for a characteristic value, and the characteristic value of the liquid crystal compound is calculated by extrapolation based on the above equation.

There are numerous mother liquid crystals that can be used for the measurement. For example, the composition of the mother liquid crystal A is as follows (wt %).

Mother Liquid Crystal A:

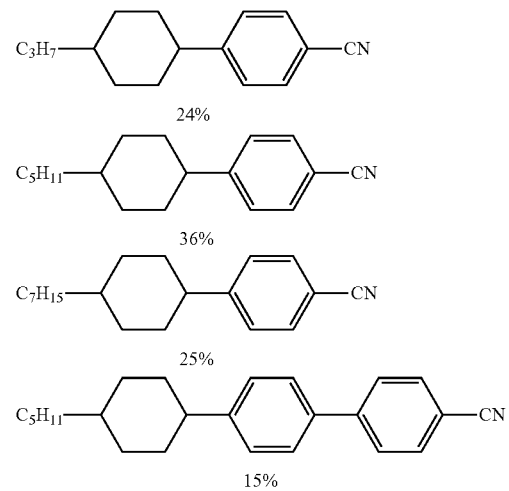

Method for Measuring Characteristic Values of Liquid Crystal Compounds

The measurement of the characteristic values was carried out with the methods below. These methods are mainly those described in EIAJ•ED-2521A of the Standard of Electric Industries Association of Japan, or modifications of the same. Moreover, the TN device used in the measurement was not equipped with TFT.

With respect to the determined values, in case that the liquid crystal compound itself is used as a sample, the obtained values are recorded as experiment data. In case that a mixture of the liquid crystal compound and a mother liquid crystal is a sample, the extrapolated values obtained with extrapolation are recorded as experiment data.

The phase structure and the phase transition temperature (° C.) were measured using the methods (1) and (2) below.

(1) A compound was placed on a hot plate (Hot Stage FP-52 by Mettler, Corp.) in a melting point measuring apparatus equipped with a polarizing microscope, and the phase behaviour and its change were observed by the polarizing microscope while the sample is heated at a rate of 3° C./min, to determine the type of the liquid crystal phase.

(2) A scanning calorimetry DSC-7 system or Diamond DSC system (made by Perkin Elmer Corp.) is used, in a heating or cooling rate of 3° C./min, and the on-set temperature of the endothermic or exothermic peak accompanying with the phase change of the sample was calculated with extrapolation to determine the phase transition temperature.

Hereinafter, a crystal is represented by "K". In a case where two crystals are distinguished from each other, they are represented by "$K_1$" and "$K_2$". A smectic phase is represented by "Sm", a nematic phase is represented by "N", and a liquid (isotropic phase) is represented by "I". In case that a smectic B phase and a smectic A phase are distinguished from each other in the smectic phase, they are expressed as "SmB" and "5 mA". "BP" represents a blue phase or an optically isotropic liquid crystal phase. A biphase co-existence is sometimes represented by (N*+I) or (N*+BP). Specifically, (N*+I) represents a phase in which an isotropic phase and a chiral nematic phase coexist, and (N*+BP) represents a phase in which a BP phase or an optically isotropic liquid crystal phase and a chiral nematic phase coexist. "Un" represents a non-optically isotropic unidentified phase. For the expression of the phase transition temperature, for example, "K 50.0 N 100.0 I" means that the phase transition temperature ($T_{KN}$) from the crystal to the nematic phase is 50.0° C. and that ($T_{NI}$) from the nematic phase to the liquid is 100.0° C. This also applies to the cases of other expressions.

The upper-limit temperature of a nematic phase ($T_{NP}$ °C.): a sample as a mixture of a liquid crystal compound and a mother liquid crystal was placed on a hot plate (Hot Stage FP-52 by Mettler Corp.) in a melting point measuring apparatus equipped with a polarizing microscope, and was observed by the polarizing microscope while heated at a rate of 1° C./min. The temperature at which a part of the sample began to change from a nematic phase to an isotropic liquid was recorded as the upper-limit temperature of the nematic phase, which is sometimes abbreviated to "upper-limit temperature" hereinafter.

Low-temperature compatibility: samples were prepared by mixing a mother liquid crystal with a liquid crystal compound such that the content of the latter was 20 wt %, 15 wt %, 10 wt %, 5 wt %, 3 wt % or 1 wt %, and then placed into glass bottles. The glass bottles were kept in a freezer at −10° C. or −20° C. for a certain period, and the presence or absence of crystal or a smectic phase was observed.

Viscosity ($\eta$, determined at 20° C., mPa·s): the viscosity of a mixture of a liquid crystal compound and a mother liquid crystal was measured with an E-type viscometer.

Optical anisotropy ($\Delta n$): the measurement was done at 25° C. utilizing light of 589 nm, with an Abbe refractometer having a polarizing plate mounted on the ocular lens. After the surface of the main prism is rubbed in a direction, a sample as a mixture of a liquid crystal compound and a mother liquid crystal was dropped onto the main prism. The refractive index $n_\|$ was determined when the polarizing direction was parallel to the rubbing direction, and the refractive index $n_\perp$ was determined when the polarizing direction was perpendicular to the rubbing direction. The optical anisotropy ($\Delta n$) was calculated according to the equation of "$\Delta n = n_\| - n_\perp$".

Dielectric anisotropy ($\Delta\epsilon$: determined at 25° C.): a sample as a mixture of a liquid crystal compound and a mother liquid crystal was fed into a liquid crystal cell with a distance (cell gap) of 9 μm between two glass substrates and a twist angle of 80°. The liquid crystal cell was applied with a voltage of 20 V, and the dielectric constant ($\epsilon_\|$) in the major-axis direction of the liquid crystal molecule was determined Then, a voltage of 0.5 V was applied, and the dielectric constant ($\epsilon_\perp$) in the minor axis direction of the liquid crystal molecule was determined. The dielectric anisotropy ($\Delta\epsilon$) was calculated according to the equation of "$\Delta\epsilon = \epsilon_\| - \epsilon_\perp$".

Pitch (p, Determined at 25° C., m)

The pitch length was measured with selective reflection (Handbook of Liquid Crystal, p. 196, 2000, from Maruzen). For the selective reflection wavelength 2, the relationship <n>p/λ=1 exists, wherein <n> denotes the average refractive index and can be calculated from the equation of "$<n>=\{(n_\|^2 + n_\perp^2)/2\}^{1/2}$". The selective reflection wavelength can be determined by a microspectrophotometer MSV-350 made by Japan Electronics Co., Ltd. The pitch was calculated by dividing the obtained reflection wavelength with the average refractive index <n>. When the concentration of the optically active compound is low, the pitch of a cholesteric liquid crystal having a reflection wavelength at the long wavelength side of visible light is proportional to the reciprocal of the concentration. Therefore, multiple points were measured in the pitch length of the liquid crystal having a selective reflection wavelength in the visible light region, and then the pitch was calculated using linear extrapolation method. Herein, the "optically active compound" is equivalent to the chiral dopant in this invention.

In this invention, the characteristic values of a liquid crystal composition were measured by the methods below, which are mainly the methods described in EIAJ·ED-2521A of the Standard of Electric Industries Association of Japan, or modifications of the same. The TN device used in the measurement was not equipped with TFT.

Upper-limit temperature of a nematic phase (NI, ° C.): a sample was placed on a hot plate in a melting point measuring apparatus equipped with a polarizing microscope and heated at a rate of 1° C./min. The temperature at which a part of the sample began to change from a nematic phase to an isotropic liquid was recorded as the upper-limit temperature of the nematic phase, which is sometimes abbreviated to "upper-limit temperature" below.

Lower-limit temperature of a nematic phase ($T_C$, ° C.): a sample having a nematic phase was kept in a freezer at 0° C., −10° C., −20° C., −30° C. or −40° C. for 10 days, and observed for the liquid crystal phase. For example, in a case where the sample exhibits a nematic phase at −20° C. but changes to crystal or a smectic phase at −30° C., the $T_C$ is recorded as "≤−20° C.". Hereinafter, the lower-limit temperature of a nematic phase is often abbreviated to "lower-limit temperature".

Transition temperature of an optically isotropic liquid crystal phase: a sample was placed on a hot plate in a melting point measuring apparatus equipped with a polarizing microscope with crossed Nicols, which was initially heated to a temperature allowing formation of an isotropic phase, and then cooled in a rate of 1° C./min until a chiral nematic phase or an optically isotropic liquid crystal phase was completely formed. The phase transition temperature during this cooling process was measured. Then, the temperature was raised in a rate of 1° C./min, and the phase transition temperature during this heating process was measured. In this invention, unless specifically indicated, the phase transition temperature in the heating process was recorded as the phase transition temperature. When it was difficult to determine the phase transition temperature of the optically isotropic liquid crystal phase in the dark field under crossed Nicols, the phase transition temperature could be determined after the polarizing plate is deviated from the crossed Nicol state by 1° to 10°.

Viscosity ($\eta$, determined at 20° C., mPa·s): The viscosity was measured with an E-type viscometer.

Rotation Viscosity ($\gamma 1$, Determined at 25° C., mPa·s):

1) For a sample with a positive dielectric anisotropy: the measurement was done following the method described in M. Imai et al., *Molecular Crystals and Liquid Crystals*, Vol. 259, 37 (1995). The sample was placed into a TN device with a twist angle of 0° and a distance (cell gap) of 5 μm between two glass substrates. The TN device was applied with a voltage in a range of 16 to 19.5 V, stepwise by 0.5 V. After a period of 0.2 second with no application of voltage, a voltage application was repeated with a rectangular wave (rectangular pulse of 0.2 second) followed by a period of 2 seconds of no voltage. The peak current and the peak time of the transient current resulting from the application of the voltage were measured. Then, the value of rotation viscosity was calculated based on the measurements and Equation (8) described in page 40 of the paper of M. Imai et al. The dielectric anisotropy required for this calculation was obtained by using the device used in the measurement of the rotation viscosity, following the later-described method for determining dielectric anisotropy.

2) For a sample with a negative dielectric anisotropy: the measurement was done following the method described in M. Imai et al., *Molecular Crystals and Liquid Crystals*, Vol. 259, 37 (1995). The sample was placed into a vertical alignment device with a distance (cell gap) of 20 μm between two glass substrates. The device was applied with a voltage in a range of 30 to 50 V, stepwise by 1V. After a period of 0.2 second without voltage application, a voltage application was repeated with a rectangular wave (rectangular pulse of 0.2 second) followed by a period of 2 seconds of no voltage. The peak current and the peak time of the transient current resulting from the voltage application were measured. Then, the value of rotation viscosity was calculated based on the measurements and Equation (8) described in page 40 of the paper of M. Imai et al. The dielectric anisotropy value required for this calculation was obtained by using the method described below.

Optical anisotropy (Δn, determined at 25° C.): the measurement was done using light of 589 nm, with an Abbe refractometer having a polarizing plate mounted on the ocular lens. After the surface of the main prism was rubbed in a direction, the sample was dropped onto the main prism. The refractive index $n_\parallel$ was determined when the polarizing direction was parallel to the rubbing direction, and the refractive index $n_\perp$ was determined when the polarizing direction was perpendicular to the rubbing direction. The optical anisotropy was calculated according the equation "$\Delta n = n_\parallel - n_\perp$". When the sample was a composition, the above process could be used to determine the optical anisotropy.

Dielectric Anisotropy (Δ∈, Determined at 25° C.):

1) For a composition with a positive dielectric anisotropy: a sample was placed into a liquid crystal cell with a distance (cell gap) of 9 μm between two glass substrates and a twist angle of 80°. The liquid crystal cell was applied with a voltage of 20 V to determine the dielectric constant ($\in_\parallel$) in the major-axis direction of the liquid crystal molecule. Then, a voltage of 0.5 V was applied to determine the dielectric constant ($\in_\perp$) in the minor axis direction of the liquid crystal molecule. The dielectric anisotropy was calculated according to the equation of "$\Delta\in = \in_\parallel - \in_\perp$".

2) For a composition with a negative dielectric anisotropy: a sample was placed into a liquid crystal cell processed into homeotropic alignment, and applied with a voltage of 0.5 V to determine the dielectric constant $\in_{81}$. Then, the sample was placed into a liquid crystal cell processed into homogeneous alignment, and applied with a voltage of 0.5 V to determine dielectric constant $\in_\perp$. The dielectric anisotropy was calculated according to the equation of "$\Delta\in = \in_\parallel - \in_\perp$".

Threshold voltage (Vth, determined at 25° C., V):

1) For a composition with a positive dielectric anisotropy: a sample was placed into a liquid crystal display device of a normally white mode with a distance of (0.5/Δn) μm between two glass substrates and a twist angle of 80°, in which Δn was the optical anisotropy determined using the above method. A rectangular wave with a frequency of 32 Hz was applied to the device. Then, the magnitude of rectangular wave was increased, and the voltage value at which the transmittance of light through the device reached 90% was determined.

2) For a composition with a negative dielectric anisotropy: a sample was placed into a liquid crystal display device of a normally black mode, which has a distance (cell gap) of 9 μm between two glass substrates and was processed into homeotropic alignment. A rectangular wave with a frequency of 32 Hz was applied to the device. Then, the magnitude of the rectangular wave was increased, and the voltage value at which the transmittance of light through the device reached 10% was determined.

Voltage holding ratio (VHR, determined at 25° C., %): the TN device used for the determination had a polyimide alignment film, and had a distance (cell gap) of 6 μm between two glass substrates. The sample was placed into the device, which was then sealed with a UV-polymerizable adhesive. Then, the TN device was charged by applying a pulse voltage (5V, 60 ms). The voltage decay was determined using a high-speed voltmeter at an interval of 16.7 ms, and the area A between the voltage curve and the horizontal axis per unit cycle was calculated. The voltage holding ratio was the percentage of the area A relative to the non-decayed area B.

Helical pitch (determined at 20° C., μm): The helical pitch was measured by a conoscope. A sample was injected into a conoscope, and then the distance (a, μm) between the disinclination lines observed from the wedge-type liquid crystal cell was measured. The helical pitch (p) could be calculated according to the formula p=2·a·tan θ, wherein θ is the angle between the two glass plates in the wedge-type cell.

Alternatively, the pitch length can be determined with selective reflection (Handbook of Liquid Crystal, p. 196, 2000, by Maruzen). For the selective reflection wavelength λ, the relationship <n>·p/λ=1 exists, wherein <n> denotes the average refractive index and can be calculated following the equation "$<n>=\{(n_\parallel^2+n_\perp^2)/2\}^{1/2}$". The selective reflection wavelength was determined by a microspectrophotometer MSV-350 manufactured by Japan Electronics Co., Ltd. The pitch was obtained by dividing the measured reflection wavelength with the average refractive index.

When the concentration of the chiral reagent is low, the pitch of a cholesteric liquid crystal having a reflection wavelength at the long wavelength side of visible light is proportional to the reciprocal of the concentration. Therefore, multiple points were measured in the pitch length of the liquid crystal having selective reflection wavelength in the visible light region, and the pitch was calculated with linear extrapolation.

Hereinafter, the proportion (percentage) of a component or a liquid crystal compound is weight percentage (wt %) relative to the total weight of the liquid crystal compounds. The composition can be prepared by mixing the components including liquid crystal compounds after they are weighted. Thus, the wt % of each component can be easily calculated.

Example 1

A liquid crystal composition NLC-A was prepared by mixing the liquid crystal compounds below in the following weight percentages. The corresponding general formulae are recited at the right side of the structural formulae.

Liquid Crystal Composition NLC-A:
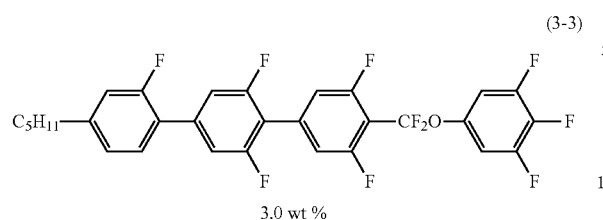
(3-3)
3.0 wt %
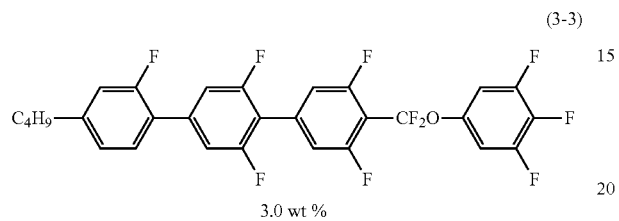
(3-3)
3.0 wt %
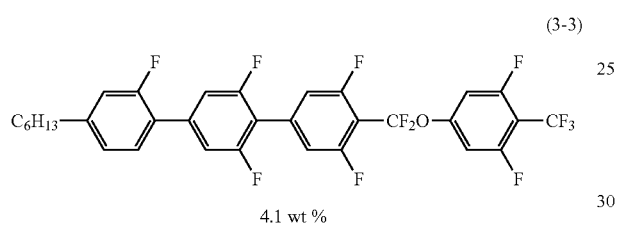
(3-3)
4.1 wt %
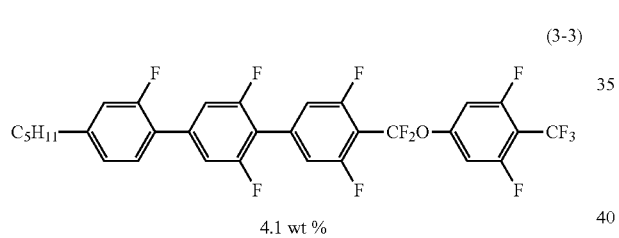
(3-3)
4.1 wt %
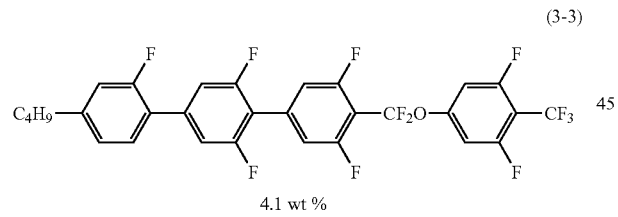
(3-3)
4.1 wt %
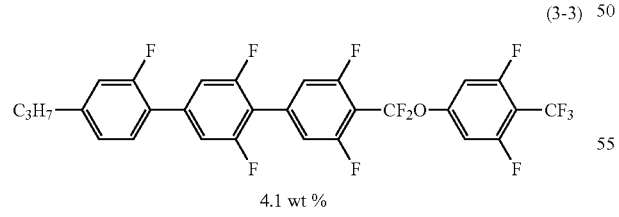
(3-3)
4.1 wt %
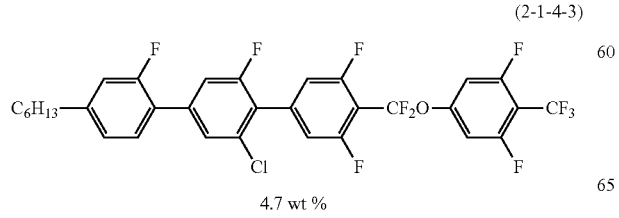
(2-1-4-3)
4.7 wt %
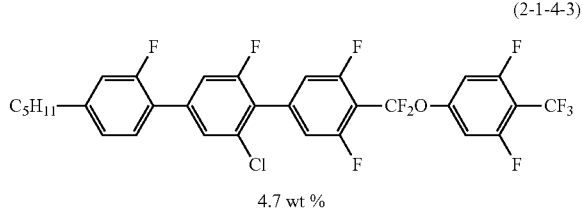
(2-1-4-3)
4.7 wt %
(2-1-4-3)
4.7 wt %
(4-4)
1.5 wt %
(4-4)
1.5 wt %
(4-4)
1.5 wt %
(3-3)
10.0 wt %
(1-2-5-1)
10.0 wt %

-continued

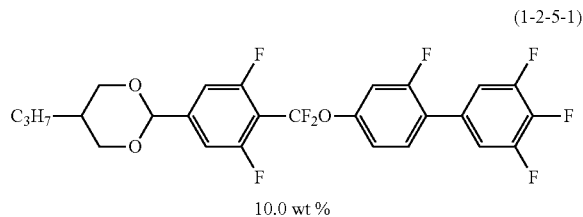

(1-2-5-1)

10.0 wt %

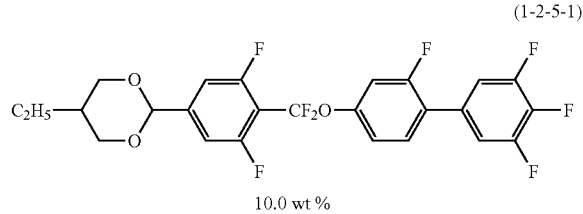

(1-2-5-1)

10.0 wt %

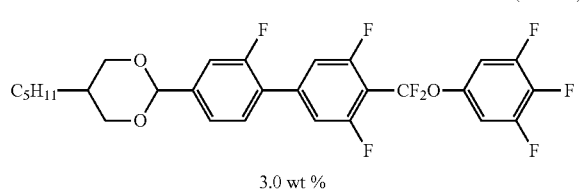

(1-2-2-1)

3.0 wt %

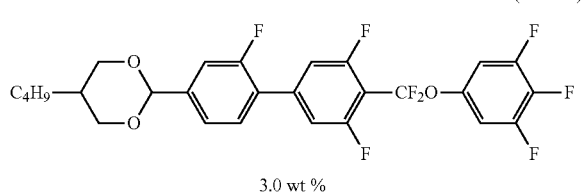

(1-2-2-1)

3.0 wt %

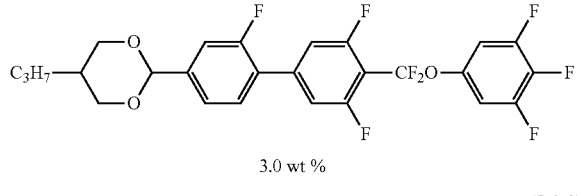

(1-2-2-1)

3.0 wt %

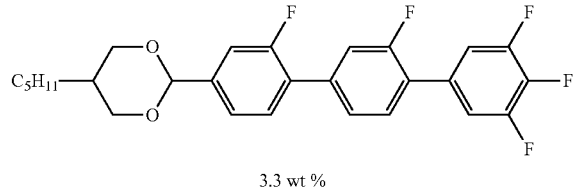

(5-2-2)

3.3 wt %

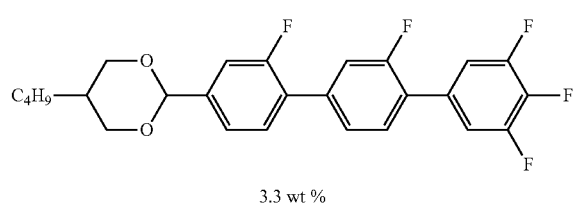

(5-2-2)

3.3 wt %

-continued

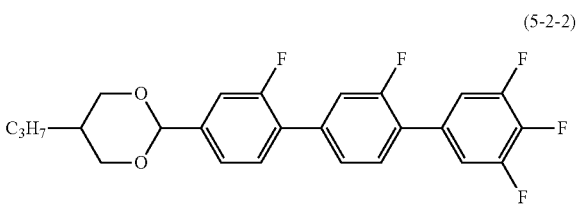

(5-2-2)

3.4 wt %

The phase transition temperature (° C.) of the liquid crystal composition NLC-A is expressed by "N 79.7 I".

Next, a liquid crystal composition CLC-A containing the liquid crystal composition NLC-A (94.7 wt %) and the chiral dopants BN-H4 (2.65 wt %) and BN-H5 (2.65 wt %) of the formula below was prepared.

The phase transition temperature (° C.) of the liquid crystal composition CLC-A is expressed by "N*69.7 BP 71.4 BP+I72.1 I".

Moreover, BN-H4 or BN-H5 was obtained from (R)-(+)-1,1'-bi(2-naphthol) and a corresponding carboxylic acid, with an esterification using dicyclohexylcarbodiimide (DCC).

BN-H4:

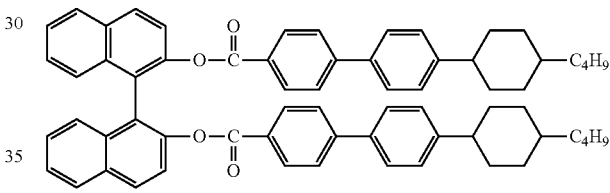

BN-H5:

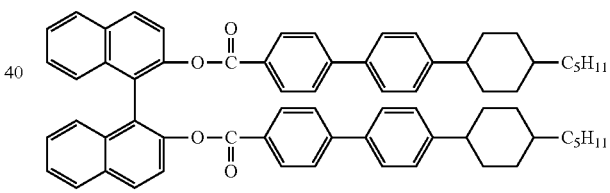

Example 2

Preparation of Mixture of Monomer and Liquid Crystal Composition

The liquid crystal composition CLC-A of 88.8 wt %, n-dodecyl acrylate of 6.0 wt %, 1,4-di(4-(6-(acryloyloxy)hexyloxy)benzoyloxy)-2-methylbenzene (LCA-6) of 4.8 wt %, and 2,2'-dimethoxyphenylacetophenone (DMPA) as a photo-polymerization initiator of 0.4 wt % were mixed to prepare a liquid crystal composition MLC-A as a mixture of a liquid crystal composition and a polymerizable monomer. The phase transition temperature (° C.) of the liquid crystal composition MLC-A is expressed by "N*39.6 BP 43.7 BP+I 46.1 I, I 45.8 BP+I 42.4 BP 37.3 N*".

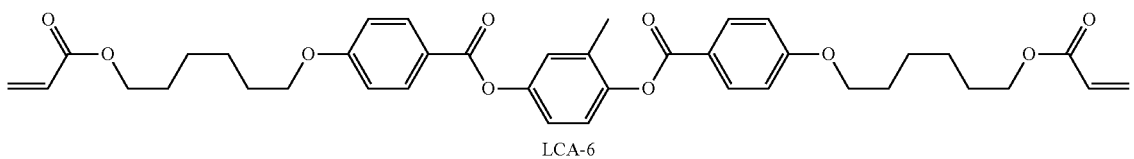 [SMILES: C=CC(=O)OCCCCCCOc1ccc(C(=O)Oc2ccc(OC(=O)c3ccc(OCCCCCCOC(=O)C=C)cc3)c(C)c2)cc1]

LCA-6

Preparation of Polymer/Liquid Crystal Composite Material

The liquid crystal composition MLC-A was held between a non-aligned comb-like electrode substrate and the opposite glass substrate (without electrode) with a cell gap of 7 μm, and then the resulting liquid crystal cell was heated until the liquid crystal became a blue phase at 40.0° C. In this state, the cell was irradiated with UV light of 365 nm in an intensity of 23 mW·cm$^{-2}$ for 1 min for polymerization.

The polymer/liquid crystal composite material (PSBP-A) thus prepared maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Example 3

Figure 2:
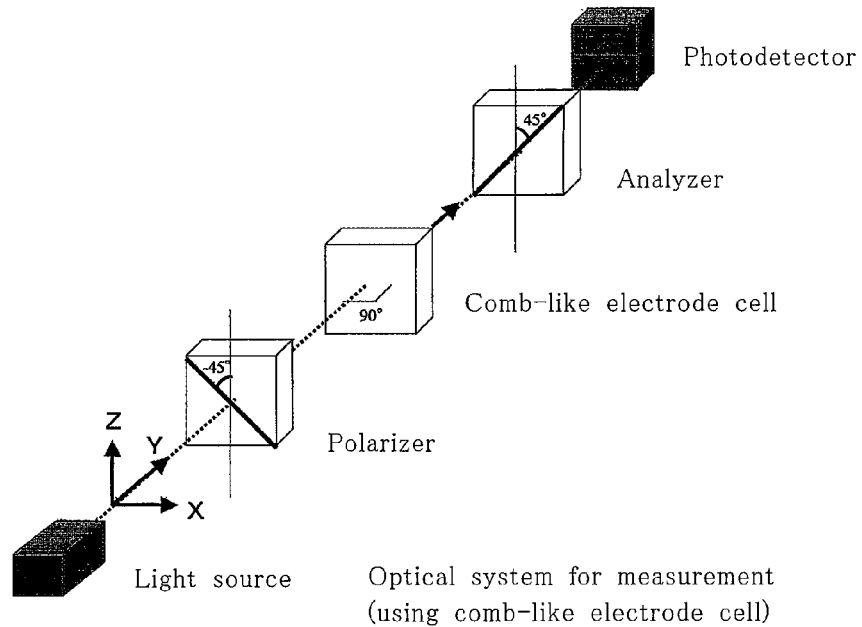
FIG. 2 shows an optical system used in an embodiment.

A liquid crystal cell holding the polymer/liquid crystal composite material PSBP-A obtained in Example 2 was arranged in the optical system of FIG. 2 to measure its electrooptical properties. The light source was the white light source of a polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 43 V was applied, the transmittance was up to 83.0% and the transmitted light intensity was saturated. The contrast ratio was 1040.

Example 4

A liquid crystal composition NLC-B was prepared by mixing the liquid crystal compounds below in the following percentages. The corresponding general formulae are recited at the right side of the structural formulae.

NLC-B:

(3-3)
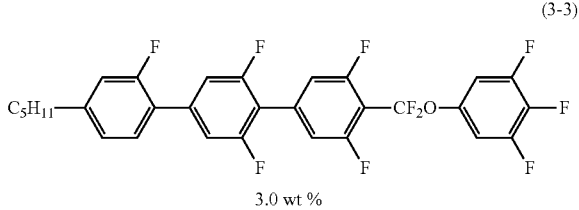
3.0 wt %

(3-3)
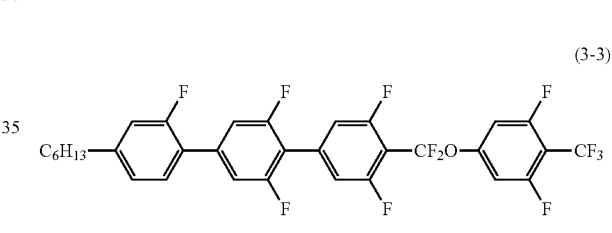
3.0 wt %

(3-3)
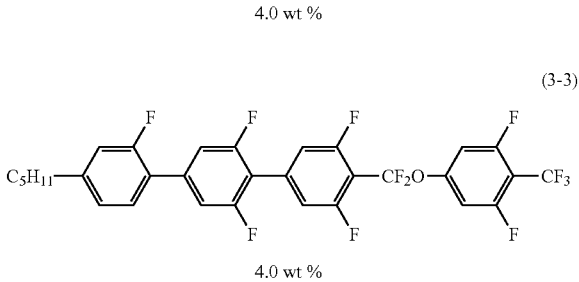
4.0 wt %

(3-3)
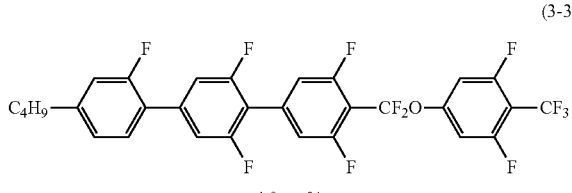
4.0 wt %

(3-3)
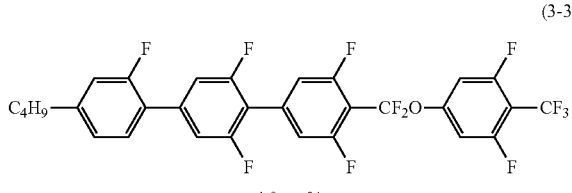
4.0 wt %

(3-3)
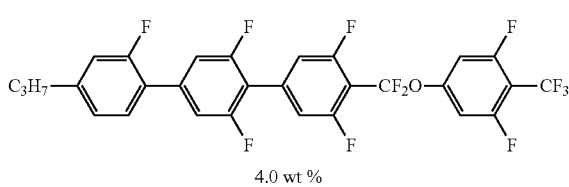
4.0 wt %

-continued (4-4)

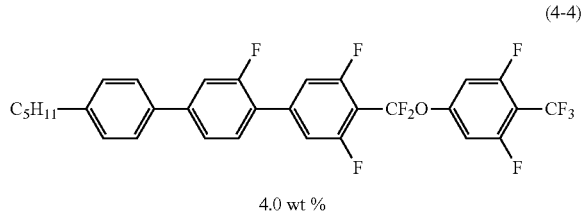

4.0 wt %

(4-4)

4.0 wt %

(3-3)

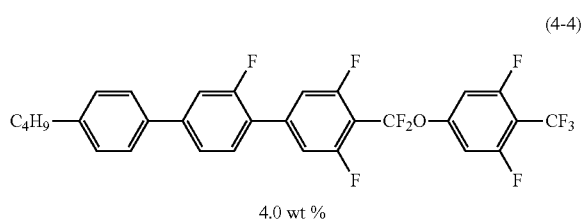

10.0 wt %

(1-2-5-1)

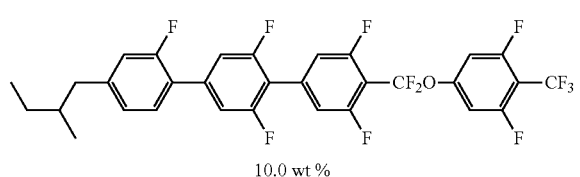

15.0 wt %

(1-2-5-1)

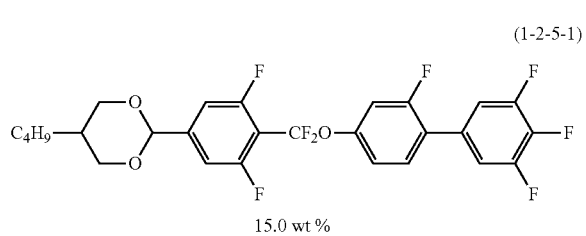

15.0 wt %

(1-2-5-1)

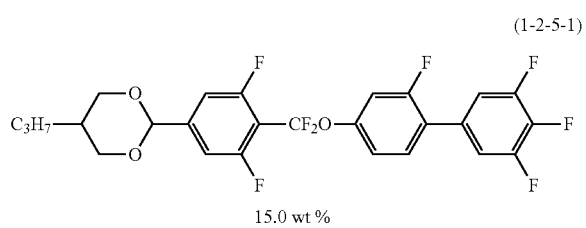

15.0 wt %

(1-2-2-1)

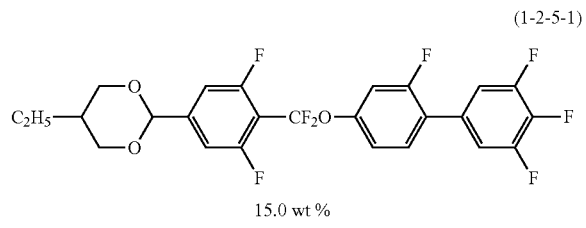

5.0 wt %

-continued (1-2-2-1)

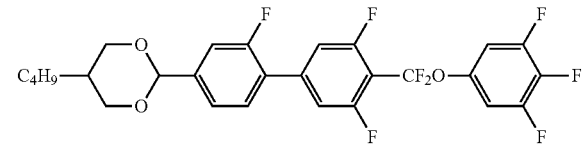

5.0 wt %

(1-2-2-1)

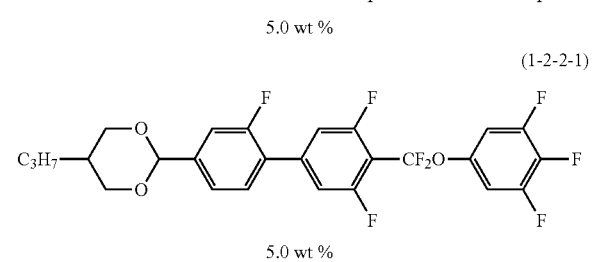

5.0 wt %

The phase transition temperature (° C.) of the liquid crystal composition NLC-B is expressed by "N 77.6 I".

Next, a liquid crystal composition CLC-B was prepared, which contains the liquid crystal composition NLC-B (94.8 wt %) and the aforementioned chiral agents BN-H4 (2.6 wt %) and BN-H5 (2.6 wt %).

The phase transition temperature (° C.) of the liquid crystal composition CLC-B is expressed by "N*69.8 BP 71.6 I".

Example 5

Preparation of Mixture of Monomer and Liquid Crystal Composition

The liquid crystal composition CLC-B of 88.8 wt %, n-dodecyl acrylate of 6.0 wt %, 1,4-di(4-(6-(acryloyloxy)hexyloxy)benzoyloxy)-2-methylbenzene (LCA-6) of 4.8 wt %, and 2,2'-dimethoxyphenylacetophenone (DMPA) as a photo-polymerization initiator of 0.4 wt % were mixed to prepare a liquid crystal composition MLC-B as a mixture of a liquid crystal composition and a polymerizable monomer. The phase transition temperature (° C.) of the liquid crystal composition MLC-B is expressed by "N*40.1 BP 44.6 BP+I45.2 I, I 144.2 BP 37.6 N*".

Preparation of Polymer/Liquid Crystal Composite Material

The liquid crystal composition MLC-B was held between a non-aligned comb-like electrode substrate and the opposite glass substrate (without electrode) with a cell gap of 7 µm, and then the resulting liquid crystal cell was heated until the liquid crystal became a blue phase at 40.5° C. In this state, the cell was irradiated with UV light of 365 nm in an intensity of 23 mW·cm$^{-2}$ for 1 min for polymerization.

The polymer/liquid crystal composite material (PSBP-B) thus prepared maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Example 6

A liquid crystal cell holding the polymer/liquid crystal composite material PSBP-B obtained in Example 5 was arranged in the optical system of FIG. 2 to measure its electrooptical properties. The light source was the white light source of the polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 43 V was applied, the transmittance was up to 85.0% and the transmitted light intensity was saturated. The contrast ratio was 1100. Regarding the response time (V10-90), the rise time was 1.2 ms and the fall time was 1.0 ms when 43 V was applied.

Example 7

A liquid crystal composition NLC-C was prepared by mixing the liquid crystal compounds below in the following percentages. The corresponding general formulae are recited at the right side of the structural formulae.

NLC-C:

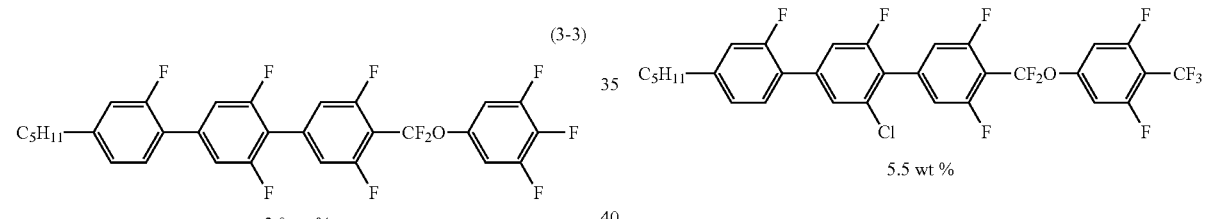

3.0 wt % (3-3)

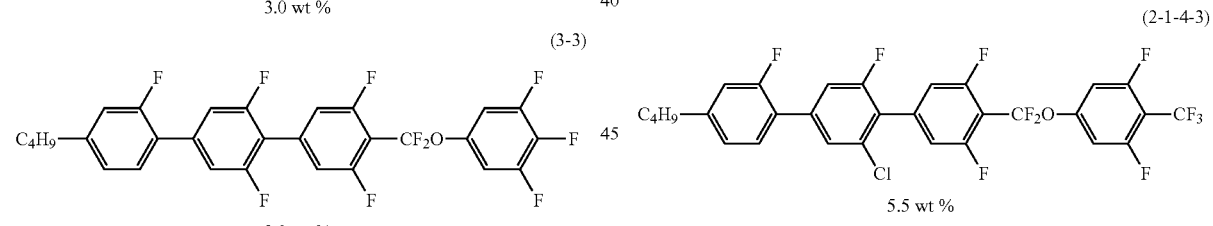

3.0 wt % (3-3)

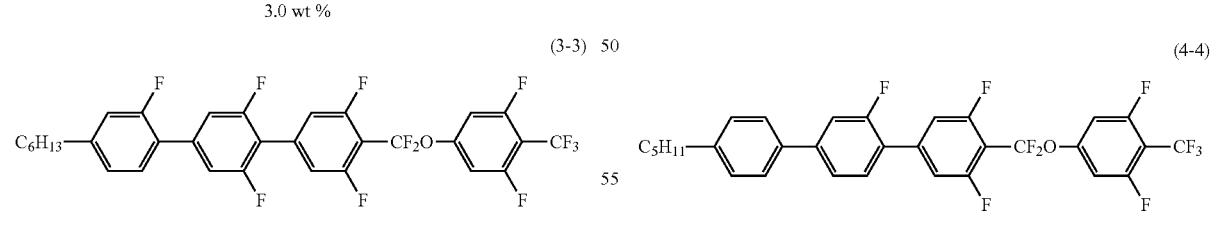

4.1 wt % (3-3)

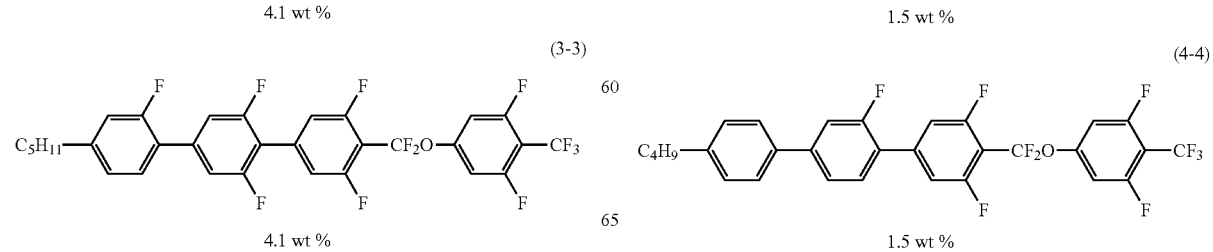

4.1 wt % (3-3)

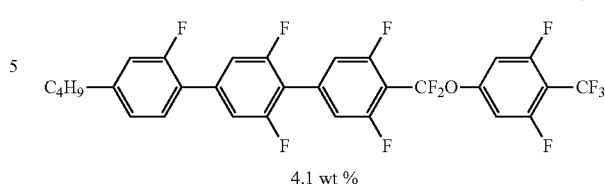

4.1 wt % (3-3)

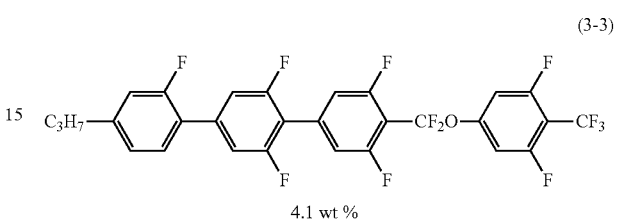

4.1 wt % (3-3)

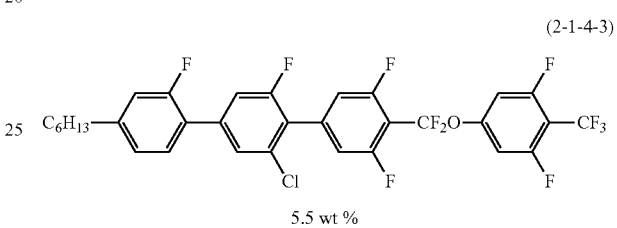

5.5 wt % (2-1-4-3)

(2-1-4-3) 5.5 wt %

(2-1-4-3) 5.5 wt %

(4-4) 1.5 wt %

(4-4) 1.5 wt %

-continued (4-4)
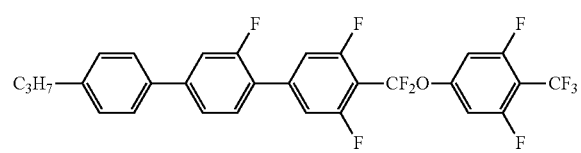
1.5 wt %

(1-2-5-1)
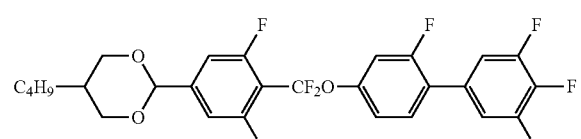
12.0 wt %

(1-2-5-1)
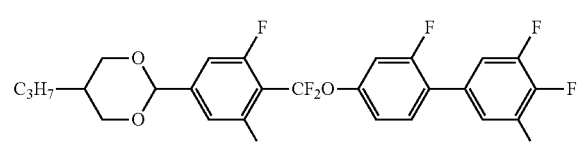
12.0 wt %

(1-2-5-1)
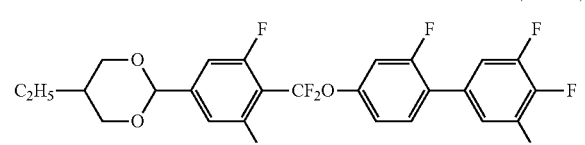
12.0 wt %

(1-2-2-1)
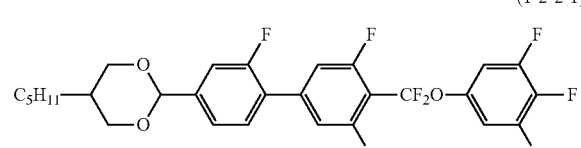
3.2 wt %

(1-2-2-1)
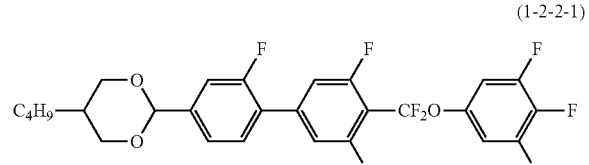
3.3 wt %

(1-2-2-1)
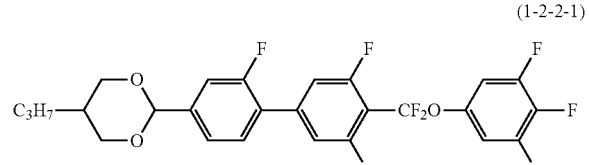
3.3 wt %

-continued (5-2-2)
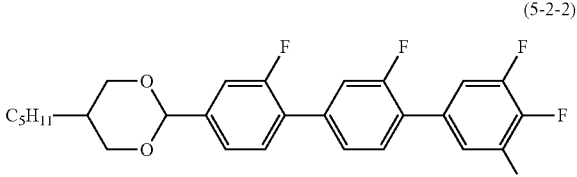
3.6 wt %

(5-2-2)
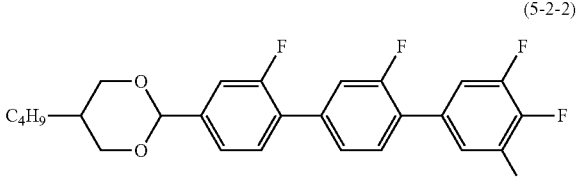
3.6 wt %

(5-2-2)
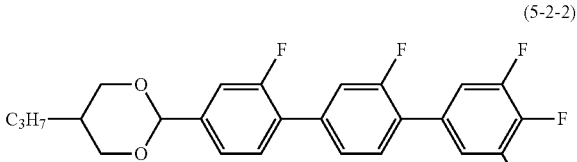
3.6 wt %

The phase transition temperature (° C.) of the liquid crystal composition NLC-C is expressed by "N 80.4 I".

Next, a liquid crystal composition CLC-C was prepared, which contains the liquid crystal composition NLC-C (94.7 wt %) and the aforementioned chiral agents BN-H4 (2.65 wt %) and BN-H5 (2.65 wt %).

The phase transition temperature (° C.) of the liquid crystal composition CLC-C is expressed by "N*67.6 BP 69.8 BP+I 70.7 I".

Example 8

Preparation of Mixture of Monomer and Liquid Crystal Composition

The liquid crystal composition CLC-C in 88.8 wt %, n-dodecyl acrylate in 6.0 wt %, 1,4-di(4-(6-(acryloyloxy) hexyloxy)benzoyloxy)-2-methylbenzene (LCA-6) in 4.8 wt %, and 2,2'-dimethoxyphenylacetophenone (DMPA) as a photo-polymerization initiator in 0.4 wt % were mixed to prepare a liquid crystal composition MLC-C as a mixture of a liquid crystal composition and a polymerizable monomer. The phase transition temperature (° C.) of the liquid crystal composition MLC-C is expressed by "N*42.0 BP 45.6 BP+I48.5 I".

Preparation of Polymer/Liquid Crystal Composite Material

The liquid crystal composition MLC-C was held between a non-aligned comb-like electrode substrate and the opposite glass substrate (without electrode) with a cell gap of 7 μm, and then the resulting liquid crystal cell was heated until the liquid crystal became a blue phase at 42.2° C. In this state, the cell was irradiated with UV light of 365 nm in an intensity of 23 mW·cm$^{-2}$ for 1 min for polymerization. The polymer/liquid crystal composite material (PSBP-C) thus prepared maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Example 9

A liquid crystal cell holding the polymer/liquid crystal composite material PSBP-C obtained in Example 8 was arranged in the optical system of FIG. 2 to measure its electrooptical properties. The light source was the white light source of the polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 57.6 V was applied, the transmittance was up to 87.0% and the transmitted light intensity was saturated. The contrast ratio was 1720.

Example 10

Preparation of Mixture of Monomer and Liquid Crystal Composition

The liquid crystal composition CLC-B of 92.6 wt %, trimethylolpropane triacrylate (TMPTA) of 3.9 wt %, 1,4-di(4-(6-(acryloyloxy)dodecyloxy)benzoyloxy)-2-methyl-benzene (LCA-12) of 3.1 wt %, and 2,2'-dimethoxyphenylacetophenone (DMPA) as a photopolymerization initiator of 0.4 wt % were mixed to prepare a liquid crystal composition MLC-B2 as a mixture of a liquid crystal composition and a polymerizable monomer. The phase transition temperature (° C.) of the liquid crystal composition MLC-B2 is expressed by "N*37.5-38.2 BP, BP 33.9 N*".

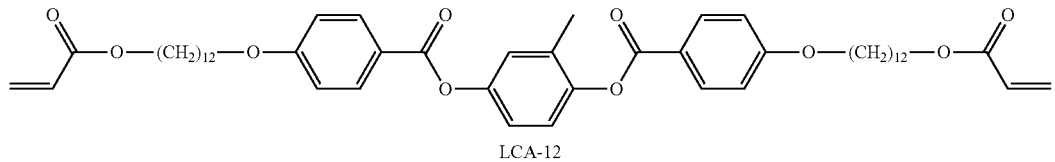

LCA-12

Preparation of Polymer/Liquid Crystal Composite Material

The liquid crystal composition MLC-B2 was held between a non-aligned comb-like electrode substrate and the opposite glass substrate (without electrode) with a cell gap of 7 μm, and then the resulting liquid crystal cell was heated until the liquid crystal became a blue phase at 37.7° C. In this state, the cell was irradiated with UV light of 365 nm in an intensity of 23 mW-cm$^{-2}$ for 1 min for polymerization.

The prepared polymer/liquid crystal composite material (PSBP-B2) maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Example 11

A liquid crystal cell holding the polymer/liquid crystal composite material PSBP-B2 obtained in Example 10 was arranged in the optical system of FIG. 2 to measure its electrooptical properties. The light source was the white light source of the polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 55 V was applied, the transmittance was up to 82% and the transmitted light intensity was saturated. The contrast ratio was 1100. Regarding the response time (V10-90), the rise time was 0.8 ms and the fall time was 0.7 ms when 55 V was applied.

Example 12

The nematic liquid crystal compositions (NLC) shown in Table 1 were prepared. The corresponding general formulae are recited in Table 1, and the phase transition temperatures listed in Table 2. Next, chiral liquid crystal compositions (CLC), each of which contained one of the nematic liquid crystal compositions NLC-D to NLC-J and the chiral dopants BN-H4 and BN-H5, were prepared. The components and the phase transition temperatures of the chiral liquid crystal compositions are listed in Table 3.

Next, liquid crystal compositions (MLC) each being a mixture of one of the chiral liquid crystal compositions (CLC) and a polymerizable monomer were prepared. The components and phase transition temperatures of respective MLCs are listed in Table 4.

TABLE 1
Components of Nematic Liquid Crystal Compositions
| | General formula | Compositions (wt %) | | | | | | |
|---|---|---|---|---|---|---|---|---|
| | | NLC-D | NLC-E | NLC-F | NLC-G | NLC-H | NLC-I | NLC-J |
| 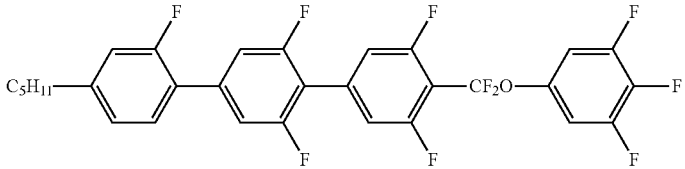 | (3-3) | 2.1 | 2.4 | 2.1 | 2.4 | 2.4 | 2.4 | |
| 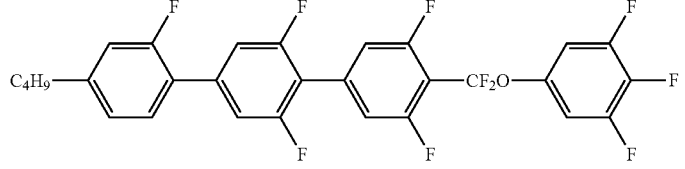 | (3-3) | 2.1 | 2.4 | 2.1 | 2.4 | 2.4 | 2.4 | |
| 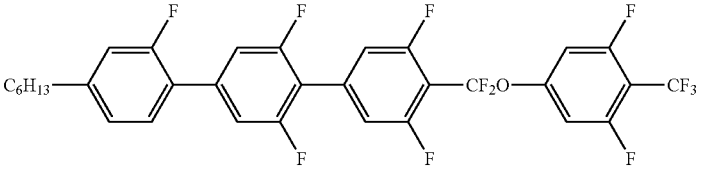 | (3-3) | 2.8 | 3.2 | 2.8 | 3.2 | 3.2 | 3.2 | 3.8 |
| 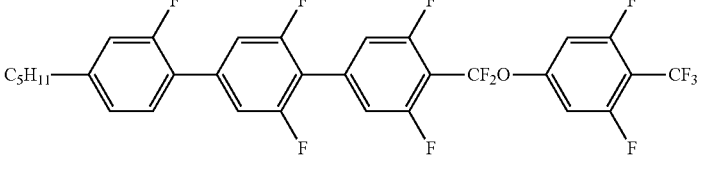 | (3-3) | 2.8 | 3.2 | 2.8 | 3.2 | 3.2 | 3.2 | 3.8 |
| 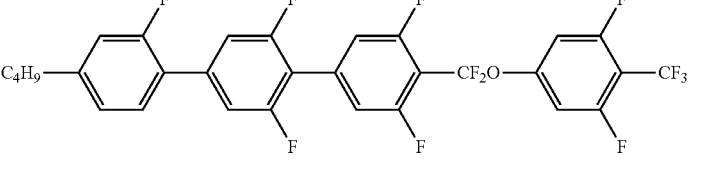 | (3-3) | 2.8 | 3.2 | 2.8 | 3.2 | 3.2 | 3.2 | 3.7 |
| 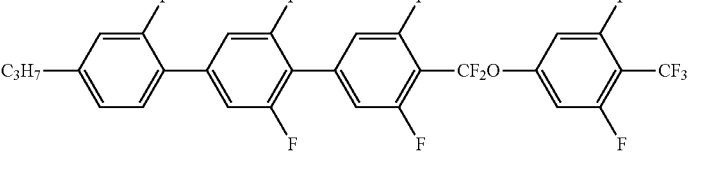 | (3-3) | 2.8 | 3.2 | 2.8 | 3.2 | 3.2 | 3.2 | 3.7 |
| 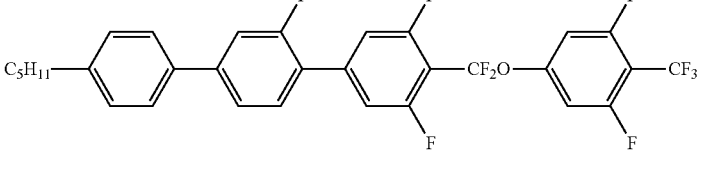 | (4-4) | 2.8 | 3.2 | 2.8 | 3.2 | 3.2 | 3.2 | |
| 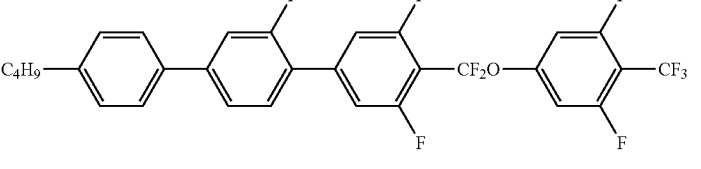 | (4-4) | 2.8 | 3.2 | 2.8 | 3.2 | 3.2 | 3.2 | |

TABLE 1-continued

Components of Nematic Liquid Crystal Compositions

| Structure | General formula | NLC-D | NLC-E | NLC-F | NLC-G | NLC-H | NLC-I | NLC-J |
|---|---|---|---|---|---|---|---|---|
| (iBu-phenyl)-phenyl-phenyl-CF2O-phenyl-CF3 (fluorinated) | (3-3) | 7.0 | 8.0 | 7.0 | 8.0 | 8.0 | 8.0 | |
| C4H9-dioxane-phenyl-CF2O-phenyl-phenyl (fluorinated) | (1-2-5-1) | 40.5 | 12.0 | 10.5 | 12.0 | 12.0 | 12.0 | 15.0 |
| C3H7-dioxane-phenyl-CF2O-phenyl-phenyl (fluorinated) | (1-2-5-1) | 10.5 | 12.0 | 10.5 | 12.0 | 12.0 | 12.0 | 15.0 |
| C2H5-dioxane-phenyl-CF2O-phenyl-phenyl (fluorinated) | (1-2-5-1) | 10.5 | 12.0 | 10.5 | 12.0 | 12.0 | 12.0 | 17.0 |
| C5H11-dioxane-phenyl-phenyl-CF2O-phenyl (fluorinated) | (1-2-2-1) | 3.5 | 4.0 | 3.5 | 4.0 | 4.0 | 4.0 | 7.0 |
| C4H9-dioxane-phenyl-phenyl-CF2O-phenyl (fluorinated) | (1-2-2-1) | 3.5 | 4.0 | 3.5 | 4.0 | 4.0 | 4.0 | 8.0 |
| C3H7-dioxane-phenyl-phenyl-CF2O-phenyl (fluorinated) | (1-2-2-1) | 3.5 | 4.0 | 3.5 | 4.0 | 4.0 | 4.0 | 8.0 |
| C5H11-dioxane-phenyl-CF2O-phenyl-phenyl-OCF3 (fluorinated) | (1-2-5-1) | | 20.0 | | | | | |

TABLE 1-continued

Components of Nematic Liquid Crystal Compositions

| Structure | General formula | Compositions (wt %) | | | | | | |
|---|---|---|---|---|---|---|---|---|
| | | NLC-D | NLC-E | NLC-F | NLC-G | NLC-H | NLC-I | NLC-J |
| C$_4$H$_9$–[dioxane]–[C$_6$H$_2$F$_2$]–CF$_2$O–[C$_6$H$_3$F]–[C$_6$H$_2$F]–CF$_3$ | (1-2-5-1) | | | | 30.0 | | | |
| C$_2$H$_5$–[dioxane]–[C$_6$H$_2$F$_2$]–CF$_2$O–[C$_6$H$_3$F]–[C$_6$H$_2$F]–Cl | (1-2-5-1) | | | | | 20.0 | | |
| C$_2$H$_5$–[dioxane]–[C$_6$H$_2$F$_2$]–CF$_2$O–[C$_6$H$_3$F]–[C$_6$H$_3$F]–OCF$_3$ | (1-2-7-1) | | | | | | 20.0 | |
| C$_2$H$_5$–[dioxane]–[C$_6$H$_2$F$_2$]–CF$_2$O–[C$_6$H$_3$F]–[C$_6$H$_3$F]–F | (1-2-7-1) | | | | | | | 20.0 |
| C$_4$H$_9$–[dioxane]–[C$_6$H$_2$F$_2$]–CF$_2$O–[C$_6$H$_2$F$_2$]–[C$_6$H$_2$F$_2$]–F | (1-2-6-1) | | | | | | | 15.0 |

Preparation of Polymer/Liquid Crystal Composite Material

Each liquid crystal composition MLC was held between a non-aligned comb-like electrode substrate and the opposite glass substrate (without electrode) with a cell gap of 7 μm, and then the resulting liquid crystal cell was heated until the liquid crystal became a blue phase. In this state, each cell was irradiated with UV light of 365 nm in an intensity of 23 mW·cm$^{-2}$ for 1 min for polymerization. The polymerization temperatures are listed in Table 5.

Each polymer/liquid crystal composite material (PSBP) thus prepared maintained an optically isotropic liquid crystal phase even being cooled to room temperature.

Example 13

For each polymer/liquid crystal composite material PSBP obtained in Example 12, a liquid crystal cell holding it therein was arranged in the optical system of FIG. 2 to measure its electrooptical properties. The light source was the white light source of the polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature.

The physical properties of the obtained polymer/liquid crystal composite material PSBPs are listed in Table 5. Moreover, the data of response time were obtained when the saturation voltage was applied or removed.

TABLE 2

N-I transition temperatures ($T_{NI}$: °C.) of the nematic liquid crystal compositions

| | NLC-D | NLC-E | NLC-F | NLC-G | NLC-H | NLC-I | NLC-J |
|---|---|---|---|---|---|---|---|
| $T_{NI}$ (°C.) | 73.3 | 82.4 | 72.3 | 78.6 | 78.1 | 77.6 | 78.7 |

TABLE 3

Components and phase transition temperatures of the chiral liquid crystal compositions

|  |  | CLC-D | CLC-E | CLC-F | CLC-G | CLC-H | CLC-I | CLC-J |
|---|---|---|---|---|---|---|---|---|
|  | Species of contained NLC | NLC-D | NLC-E | NLC-F | NLC-G | NLC-H | NLC-I | NLC-J |
| Content (wt %) | NLC | 94.7 | 94.7 | 94.7 | 94.7 | 94.7 | 94.7 | 94.7 |
|  | BN-H4 | 2.65 | 2.65 | 2.65 | 2.65 | 2.65 | 2.65 | 2.65 |
|  | BN-H5 | 2.65 | 2.65 | 2.65 | 2.65 | 2.65 | 2.65 | 2.65 |
|  | Phase transition temperature (° C.) | N* 65.0 BP 66.1 I I 64.7 BP 63.6 N* | N* 73.3 BP 74.8 BP + I 76.1 I I 75.4 I + BP 73.4 BP 71.3 N* | N* 61.9 BP 64.6 I I 62.1 BP 60.5 N* | N* 68.5 BP 70.6 BP + I 70.9 I I 69.4 BP 67.3 N* | N* 70.6 BP 74.5 I 71.7 BP 69.1 N* | N* 71.1-71.7 BP I ? I + BP 72.3 BP + I 72.9 I I 72.1 I + BP ? BP 70.6 N* | N* 70.8 BP 72.7 I I 72.5 BP 69.4 N* |

TABLE 4

Components and phase transition temperatures of the mixtures of monomer and chiral liquid crystal composition

|  |  | MLC-D | MLC-E | MLC-F | MLC-G | MLC-H | MLC-I | MLC-J |
|---|---|---|---|---|---|---|---|---|
|  | Species of contained CLC | CLC-D | CLC-E | CLC-F | CLC-G | CLC-H | CLC-I | CLC-J |
| Content (wt %) | CLC | 88.8 | 88.8 | 88.8 | 88.8 | 88.8 | 88.8 | 88.8 |
|  | n-dodecyl acrylate | 6.0 | 6.0 | 6.0 | 6.0 | 6.0 | 6.0 | 6.0 |
|  | n-hexadecyl acrylate |  |  |  |  |  |  |  |
|  | LCA-6 | 4.8 | 4.8 | 4.8 | 4.8 | 4.8 | 4.8 | 4.8 |
|  | LCA-12 |  |  |  |  |  |  |  |
|  | DMPA | 0.4 | 0.4 | 0.4 | 0.4 | 0.4 | 0.4 | 0.4 |
|  | Phase transition temperature (° C.) | N* 40.1 BP 44.6 I I 44.0 BP 38.2 N* | N* 42.3-43.0 BP 45.5 BP + I 48.5 I I 47.3 I + BP ? BP 40.5 N* | N* 34.6-35.0 BP 40.9 I I 39.6 BP 32.7 N* | N* 37.2-38.2 BP 40.5 BP + I 43.1 I I 41.2 I + BP ? BP 35.7 N* | N*39.5-40.2 BP 42.3 BP + I 45.7 I I 44.6 I + BP 42.0 BP 38.0 N* | N* 40.6-41.3 BP ? BP + I 46.9 I I 45.6 I + BP 42.9 BP 38.8 N* | N* 40.6 BP 45.2 BP + I 46.6 I I 44.5 BP 38.5 N* |

TABLE 5

Polymerization temperatures for preparing the polymer/liquid crystal composite materials and the physical properties of the obtained polymer/liquid crystal composite materials

|  | PSPB-D | PSPB-E | PSPB-F | PSPB-G | PSPB-H | PSPB-I | PSPB-J |
|---|---|---|---|---|---|---|---|
| Species of used MLC | MLC-D | MLC-E | MLC-F | MLC-G | MLC-H | MLC-I | MLC-J |
| Polymerization temperature (° C.) | 40.2 | 42.5 | 34.7 | 37.6 | 39.9 | 40.8 | 40.8 |
| $V_{max}$ (V) | 68 | 51 | 72 | 58 | 55 | 55 | 45 |
| Transmittance (%) at $V_{max}$ | 81 | 83 | 82 | 91 | 81 | 86 | 84 |
| Contrast ratio | 1620 | 840 | 1870 | 1280 | 1010 | 900 | 1150 |
| Rise time (V10-90) (ms) | 1.1 | 1.9 | 1.1 | 1.5 | 0.8 | 0.7 | 1.9 |
| Fall time (V10-90) (ms) | 1.1 | 1.1 | 1.2 | 0.8 | 0.8 | 1.0 | 0.9 |

As mentioned above, the optical device of this invention can be driven with a low voltage and has a high contrast ratio and a short response time, and is superior to those of the prior art.

[Industrial Utility]

The applications of this invention include, for example, optical devices, such as display devices using polymer/liquid crystal composites, and so on.

What is claimed is:

1. A liquid crystal composition exhibiting an optically isotropic liquid crystal phase, the liquid crystal composition comprising an achiral component T and a chiral dopant, wherein the achiral component T contains, as a first component thereof, at least one compound selected from the group consisting of compounds represented by formula (1) in an amount of 32 wt % to 85 wt % relative to a total weight of the achiral component T, (1)

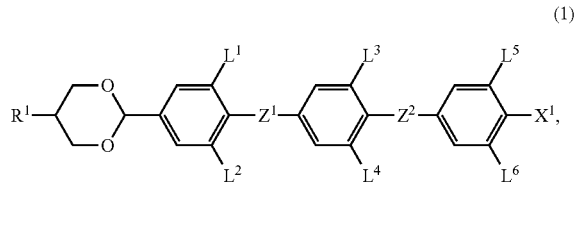

wherein $R^1$ is hydrogen, or $C_{1-20}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by halogen;

$L^1$, $L^2$, $L^3$, $L^4$, $L^5$ and $L^6$ are each independently hydrogen or fluorine;

$Z^1$ and $Z^2$ are each independently a single bond or —$CF_2O$—, wherein at least one of $Z^1$ and $Z^2$ is —$CF_2O$—; and $X^1$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen atom is optionally replaced by fluorine.

2. The liquid crystal composition of claim 1, wherein the first component of the achiral component T is at least one compound selected from the group consisting of compounds represented by formulae (1-1) to (1-3), (1-1)

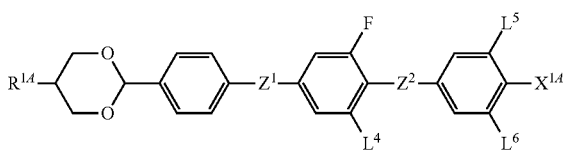

(1-2)

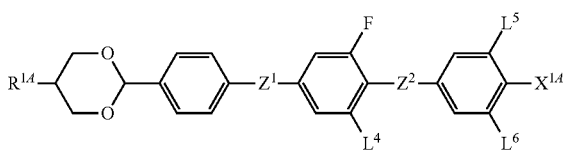

(1-3)

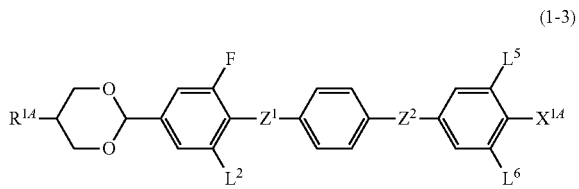

wherein $R^{1A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $L^2$, $L^4$, $L^5$ and $L^6$ are each independently hydrogen or fluorine; $Z^1$ and $Z^2$ are each independently a single bond or —$CF_2O$— with a proviso that at least one of $Z^1$ and $Z^2$ is —$CF_2O$—; and $X^{1A}$ is fluorine, chlorine, —$CF_3$ or —$OCF_3$.

3. The liquid crystal composition of claim 2, wherein the first component of the achiral component T is at least one compound selected from the group consisting of compounds represented by the formula (1-2).

4. The liquid crystal composition of claim 1, wherein the first component of the achiral component T is at least one compound selected from the group consisting of compounds represented by formulae (1-1-1), (1-1-2), (1-2-1) to (1-2-7), (1-3-1) and (1-3-2), (1-1-1)

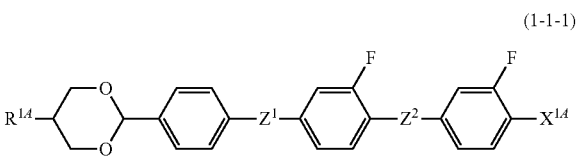

(1-1-2)

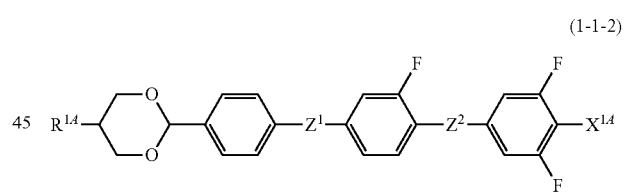

(1-2-1)

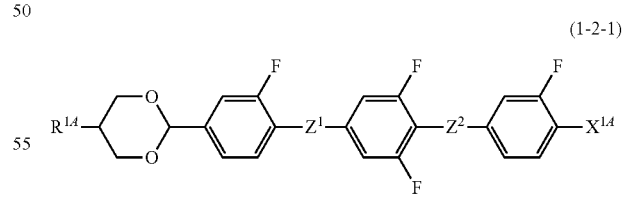

(1-2-2)

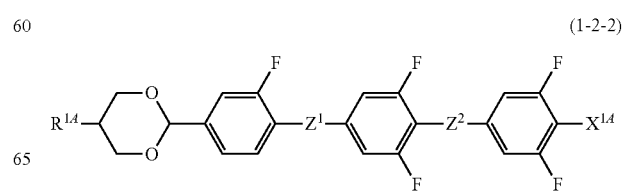

-continued (1-2-3)
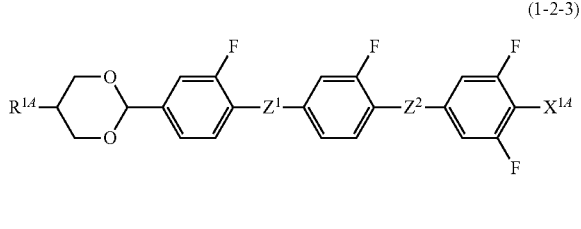

(1-3-1)
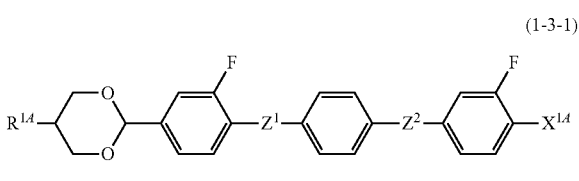

(1-2-4)
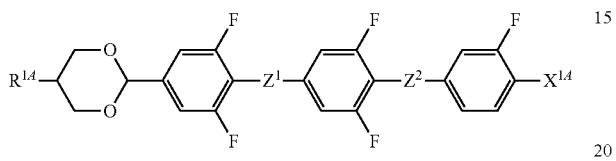

(1-2-5)
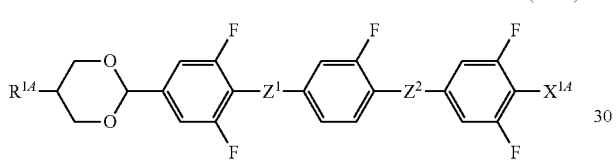

(1-3-2)

(1-2-6)
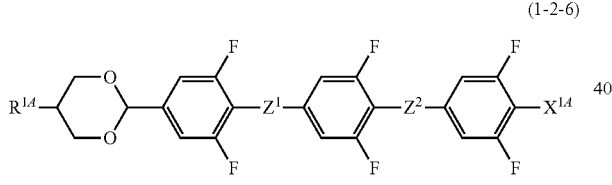

(1-2-7)
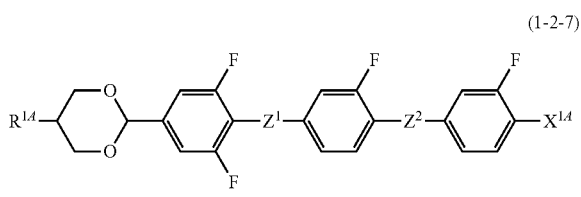

wherein $R^{1A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $Z^1$ and $Z^2$ are each independently a single bond or —$CF_2O$— with a proviso that at least one of $Z^1$ and $Z^2$ is —$CF_2O$—; and $X^{1A}$ is fluorine, chlorine, —$CF_3$ or —$OCF_3$.

5. The liquid crystal composition of claim 1, wherein a ratio of the first component of the achiral component T relative to the total weight of the achiral component T is in a range of 30 wt % to 70 wt %.

6. The liquid crystal composition of claim 1, further comprising, as a second component of the achiral component T, at least one compound selected from the group consisting of compounds represented by formula (2), (2)
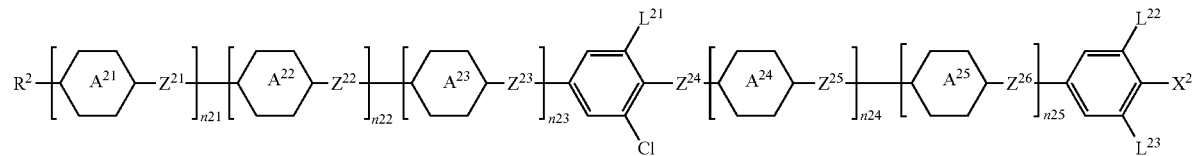

wherein $R^2$ is hydrogen, or $C_{1-20}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by halogen;

ring $A^{21}$, ring $A^{22}$, ring $A^{23}$, ring $A^{24}$ and ring $A^{25}$ are each independently 1,4-cyclohexylene, 1,3-dioxane-2,5-diyl, 1,4-phenylene, 1,4-phenylene with one or two hydrogen atoms being replaced by fluorine, 1,4-phenylene with one of two hydrogen atoms being replaced by fluorine and another one of the two hydrogen atoms being replaced by chlorine, pyridine-2,5-diyl, or pyrimidine-2,5-diyl;

$Z^{21}$, $Z^{22}$, $Z^{23}$, $Z^{24}$, $Z^{25}$ and $Z^{26}$ are each independently a single bond, or $C_{1-4}$ alkylene in which arbitrary —$CH_2$— is optionally replaced by —O—, —COO— or —$CF_2$O—;

$L^{21}$, $L^{22}$ and $L^{23}$ are each independently hydrogen or fluorine;

$X^2$ is fluorine, chlorine, —$CF_3$ or —$OCF_3$; and n21, n22, n23, n24 and n25 are each independently 0 or 1, and 2≤n21+n22+n23+n24+n25≤3.

7. The liquid crystal composition of claim 6, wherein the second component of the achiral component T is at least one compound selected from the group consisting of compounds represented by formulae (2-1-1-2), (2-1-2-1), (2-1-3-1), (2-1-3-2), (2-1-4-2) and (2-1-4-3),

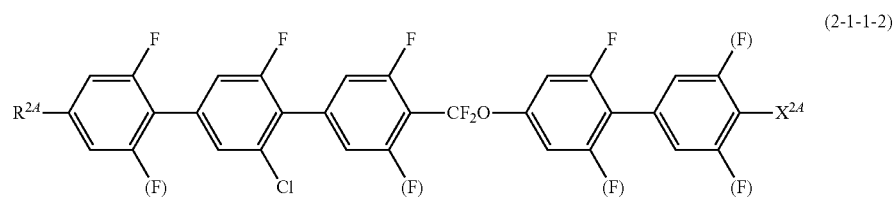
(2-1-1-2)

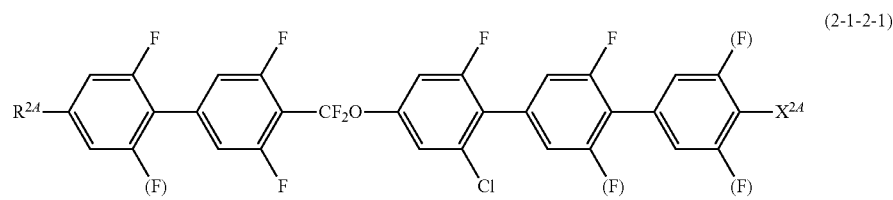
(2-1-2-1)

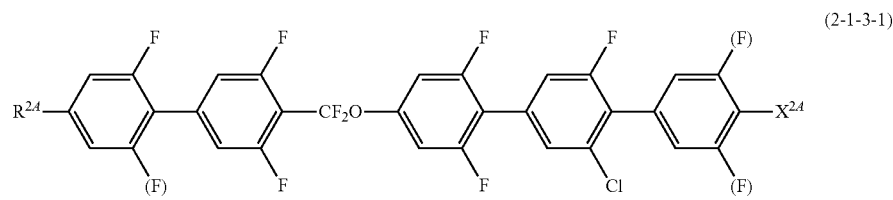
(2-1-3-1)

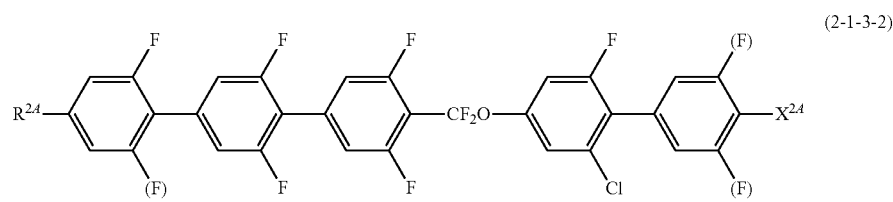
(2-1-3-2)

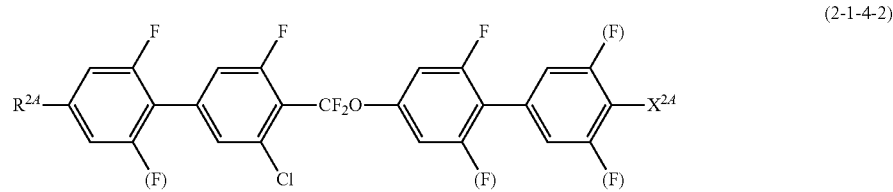
(2-1-4-2)

(2-1-4-3)

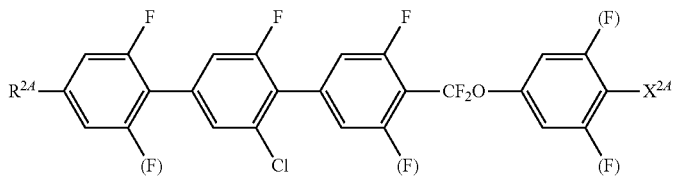

wherein $R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{2A}$ is fluorine, chlorine, —$CF_3$ or —$OCF_3$.

8. The liquid crystal composition of claim 7, wherein the second component of the achiral component T is at least one compound selected from the group consisting of compounds represented by formula (2-1-1-2).

9. The liquid crystal composition of claim 7, wherein the second component of the achiral component T is at least one compound selected from the group consisting of compounds represented by formula (2-1-4-3).

10. The liquid crystal composition of claim 7, wherein the second component of the achiral component T is a mixture of at least one compound selected from the group consisting of compounds represented by formula (2-1-1-2) and at least one compound selected from the group consisting of compounds represented by formula (2-1-4-3).

11. The liquid crystal composition of claim 6, wherein a ratio of the second component of the achiral component T relative to the total weight of the achiral component T is in a range of 5 wt % to 70 wt %.

12. The liquid crystal composition of claim 1, further comprising, as a third component of the achiral component T, at least one compound selected from the group consisting of compounds represented by formula (3), (3)

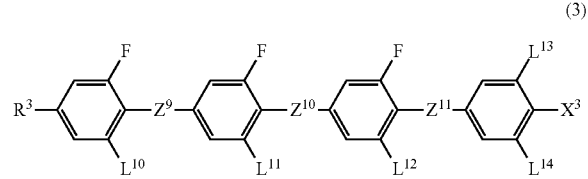

wherein $R^3$ is hydrogen, or $C_{1-20}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by halogen;

$Z^9$, $Z^{10}$ and $Z^{11}$ are each independently a single bond, —COO— or —$CF_2O$—, with a proviso that at least one of $Z^9$, $Z^{10}$ and $Z^{11}$ is —$CF_2O$—;

$L^{10}$, $L^{11}$, $L^{12}$, $L^{13}$ and $L^{14}$ are each independently hydrogen or fluorine;

$X^3$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by fluorine.

13. The liquid crystal composition of claim 12, wherein the third component of the achiral component T is at least one compound selected from the group consisting of compounds represented by formulae (3-2)-(3-3)

(3-2)

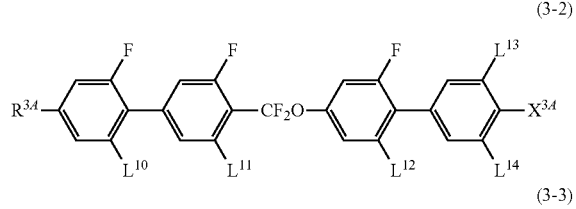

(3-3)

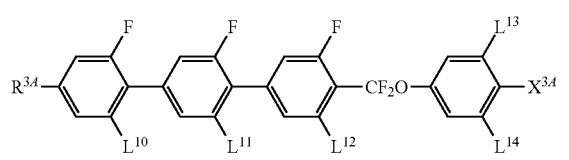

wherein each $R^{3A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{3A}$ is fluorine, chlorine, —$CF_3$ or —$OCF_3$; and $L^{10}$-$L^{14}$ are each independently hydrogen or fluorine.

14. The liquid crystal composition of claim 12, wherein in formula (3), $R^3$ has a straight chain.

15. The liquid crystal composition of claim 13, wherein the third component of the achiral component T is at least one compound selected from the group consisting of compounds represented by formula (3-2).

16. The liquid crystal composition of claim 13, wherein the third component of the achiral component T is at least one compound selected from the group consisting of compounds represented by formula (3-3).

17. The liquid crystal composition of claim 12, wherein a ratio of the third component of the achiral component T relative to the total weight of the achiral component T is in a range of 5 wt % to 70 wt %.

18. The liquid crystal composition of claim 12, wherein relative to the total weight of the achiral component T, a ratio of the first component of the achiral component T is in a range of 3 wt % to 70 wt %, a ratio of the second component of the achiral component T is in a range of 10 wt % to 50 wt %, and a ratio of the third component of the achiral component T is in a range of 10 wt % to 50 wt %.

19. The liquid crystal composition of claim 1, further comprising, as a fourth component of the achiral component T, at least one compound selected from the group consisting of compounds represented by formula (4),

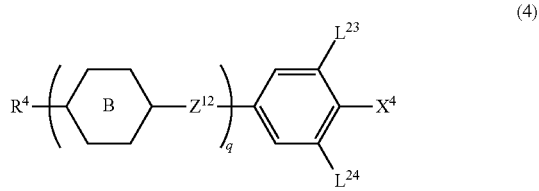

(4)

wherein $R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine; each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene, or pyrimidine-2,5-diyl; each $Z^{12}$ is independently a single bond, ethylene, —COO—, —OCO—, —CF$_2$O— or —OCF$_2$—; $L^{23}$ and $L^{24}$ are each independently hydrogen or fluorine; $X^4$ is fluorine, chlorine, —CF$_3$ or —OCF$_3$; q is 1, 2, 3 or 4; when q is 3 or 4, one $Z^{12}$ is —CF$_2$O— or —OCF$_2$—; and when q is 3, not all of the rings B are fluorine-substituted 1,4-phenylene.

20. The liquid crystal composition of claim 19, wherein the fourth component of the achiral component T is at least one compound selected from the group consisting of compounds represented by formulae (4-1)-(4-9),

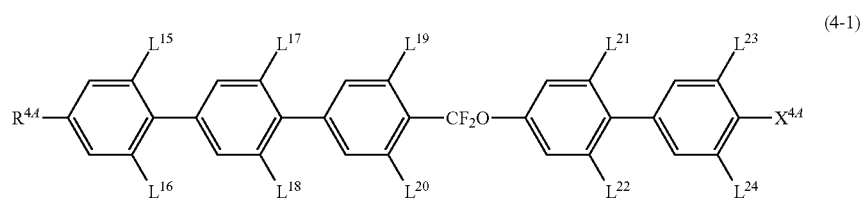

(4-1)

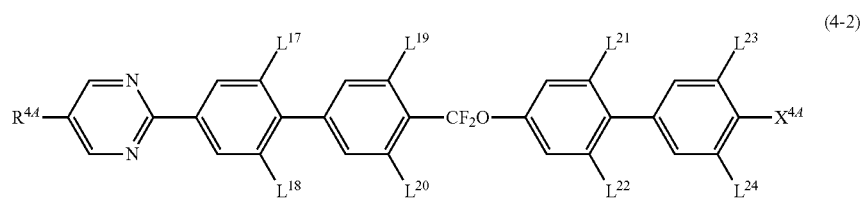

(4-2)

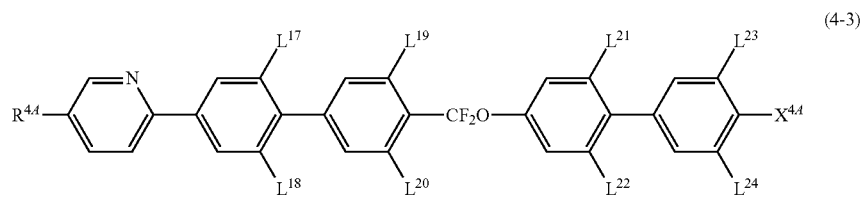

(4-3)

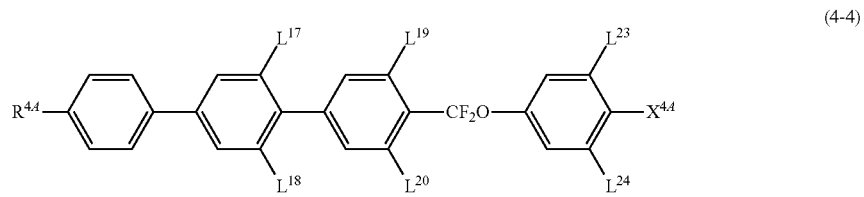

(4-4)

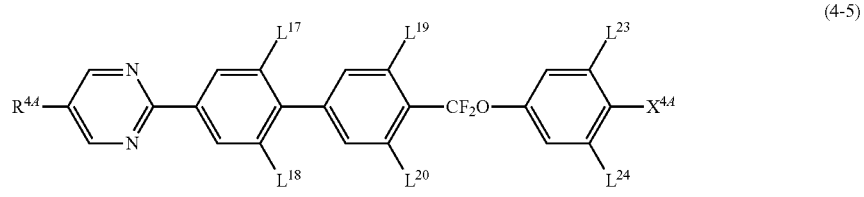

(4-5)

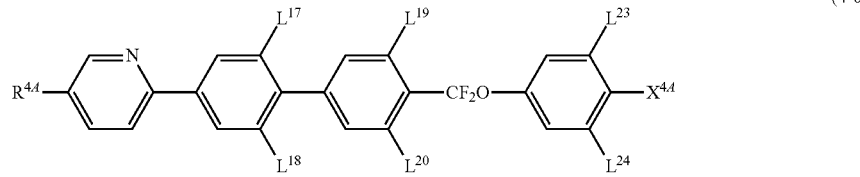

(4-6)

-continued

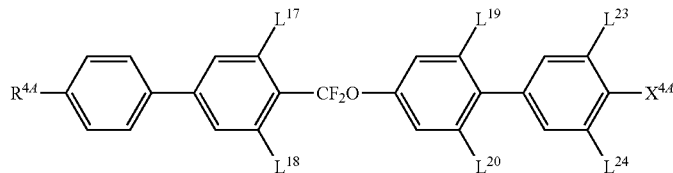
(4-7)

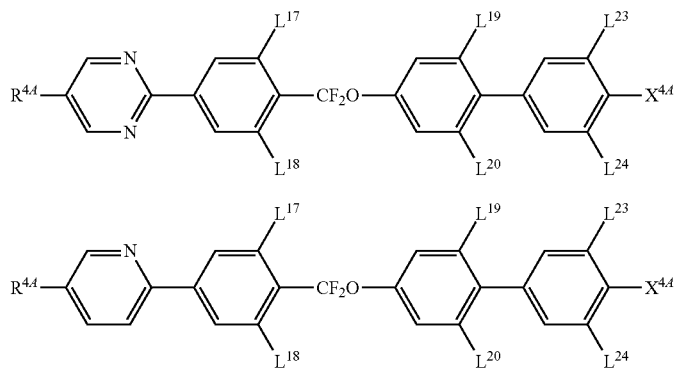
(4-8)

(4-9)

wherein each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{3A}$ is fluorine, chlorine, —$CF_3$ or —$OCF_3$; and $L^{15}$-$L^{24}$ are each independently hydrogen or fluorine.

21. The liquid crystal composition of claim 1, further comprising, as a fifth component of the achiral component T, at least one compound selected from the group consisting of compounds represented by formula (5),

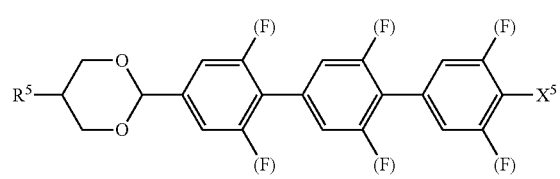
(5)

wherein $R^5$ is hydrogen, or $C_{1-20}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by halogen;

each (F) is independently hydrogen or fluorine; and
$X^5$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C— with a proviso that —O— is not adjacent to —CH=CH— and —CO— is not adjacent to —CH=CH—, and in the alkyl and the alkyl in which arbitrary —$CH_2$— is replaced by —O—, —S—, —COO—, —OCO—, —CH=CH—, —CF=CF— or —C≡C—, arbitrary hydrogen is optionally replaced by fluorine.

22. The liquid crystal composition of claim 21, wherein the fifth component of the achiral component T is at least one compound selected from the group consisting of compounds represented by formulae (5-1)-(5-3),

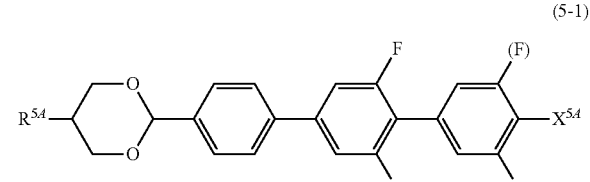
(5-1)

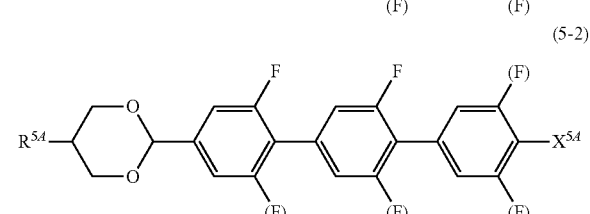
(5-2)

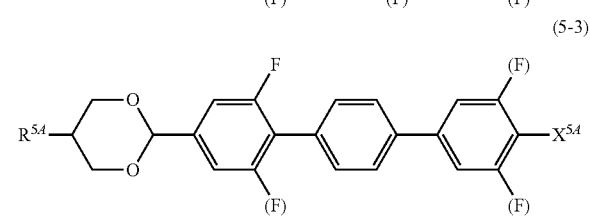
(5-3)

wherein $R^{5A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{5A}$ is fluorine, chlorine, —$CF_3$ or —$OCF_3$.

23. The liquid crystal composition of claim 21, wherein a ratio of the fifth component of the achiral component T relative to a total weight of the achiral component T is in a range of 1 wt % to 20 wt %.

24. The liquid crystal composition of claim 1, further comprising, as a sixth component of the achiral component T, at least one compound selected from the group consisting of compounds represented by formula (6), (6)

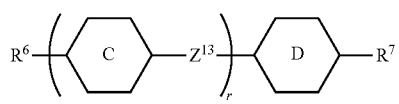

wherein $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine; ring C and ring D are each independently 1,4-cyclohexylene, 1,4-phenylene, 2-fluoro-1,4-phenylene, 3-fluoro-1,4-phenylene, or 2,5-difluoro-1,4-phenylene; each $Z^{13}$ is independently a single bond, ethylene, —COO— or —OCO—; and r is 1, 2 or 3.

25. The liquid crystal composition of claim 24, wherein the sixth component of the achiral component T is at least one compound selected from the group consisting of compounds represented by formulae (6-1) to (6-13), (6-1)
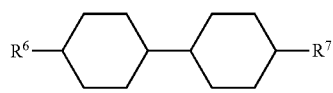

(6-2)
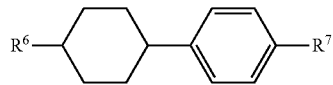

(6-3)
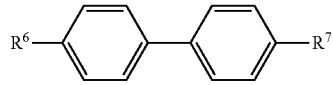

(6-4)
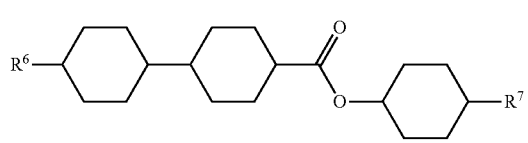

(6-5)

(6-6)

(6-7)
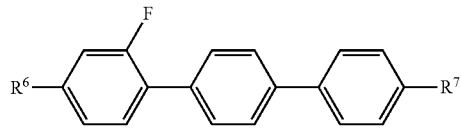

(6-8)
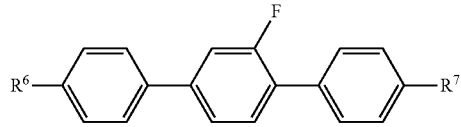

(6-9)
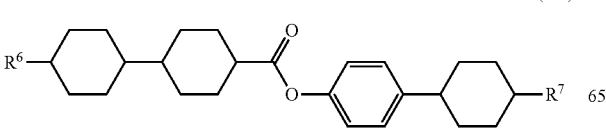

(6-10)
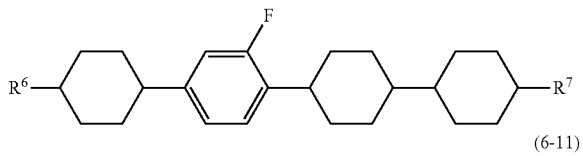

(6-11)
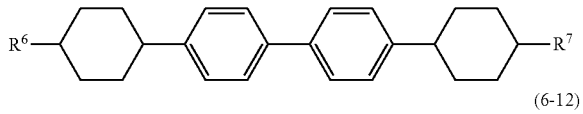

(6-12)
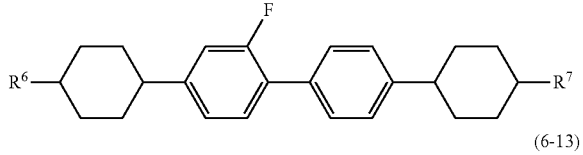

(6-13)
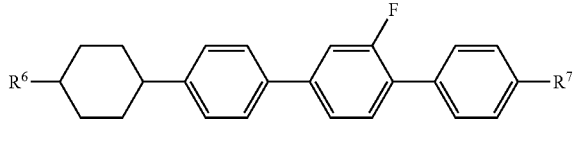

wherein $R^6$ and $R^7$ are each independently $C_{1-12}$ alkyl, $C_{1-12}$ alkoxy, $C_{2-12}$ alkenyl, or $C_{2-12}$ alkenyl in which arbitrary hydrogen is replaced by fluorine.

26. The liquid crystal composition of claim 25, wherein the sixth component of the achiral component T is at least one compound selected from the group consisting of compounds represented by formula (6-3).

27. The liquid crystal composition of claim 25, wherein the sixth component of the achiral component T is at least one compound selected from the group consisting of compounds represented by formula (6-8).

28. The liquid crystal composition of claim 25, wherein the sixth component of the achiral component T is at least one compound selected from the group consisting of compounds represented by formula (6-13).

29. The liquid crystal composition of claim 1, wherein the chiral dopant is at least one compound selected from the group consisting of compounds represented by formulae (K1)-(K5), (K1)
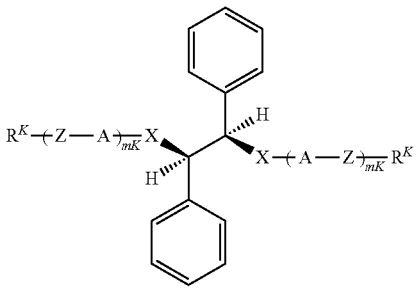

(K2)
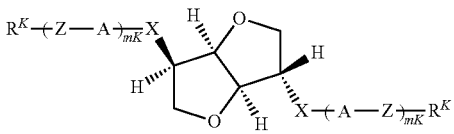

-continued (K3)
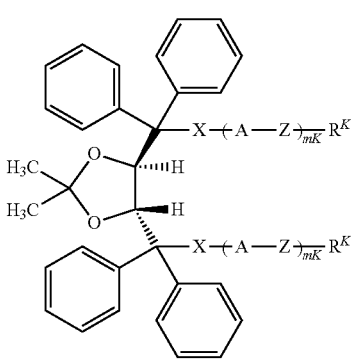

(K4)
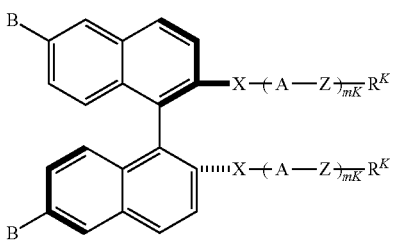

(K5)
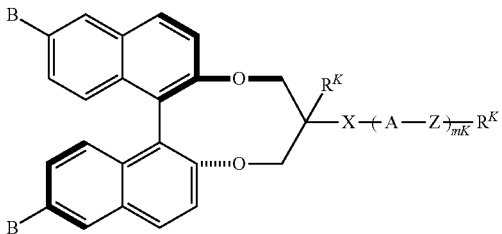

wherein each $R^K$ is independently hydrogen, halogen, —C≡N—, —N═C═O, —N═C═S or $C_{1-20}$ alkyl in which arbitrary —CH$_2$— is optionally replaced by —O—, —S—, —COO— or —OCO—, arbitrary —CH$_2$—CH$_2$— is optionally replaced by —CH═CH—, —CF═CF— or —C≡C—, and arbitrary hydrogen is optionally replaced by halogen;

each A is independently an aromatic six- to eight-membered ring, a non-aromatic three- to eight-membered ring, or a fused ring of 9 or more carbons, and in these rings arbitrary hydrogen is optionally replaced by halogen, $C_{1-3}$ alkyl or $C_{1-3}$ haloalkyl, —CH$_2$— is optionally replaced by —O—, —S— or —NH—, and —CH═ is optionally replaced by —N═;

each B is independently hydrogen, halogen, $C_{1-3}$ alkyl, $C_{1-3}$ haloalkyl, an aromatic six- to eight-membered ring, a non-aromatic three- to eight-membered ring, or a fused ring of 9 or more carbons, and in these rings arbitrary hydrogen is optionally replaced by halogen, $C_{1-3}$ alkyl or $C_{1-3}$ haloalkyl, —CH$_2$— is optionally replaced by —O—, —S— or —NH—, and —CH═ is optionally replaced by —N═;

each Z is independently a single bond, or $C_{1-8}$ alkylene in which arbitrary —CH$_2$— is optionally replaced by —O—, —S—, —COO—, —OCO—, —CSO—, —OCS—, —N═N—, —CH═N— or —N═CH—, arbitrary —CH$_2$—CH$_2$— is optionally replaced by —CH═CH—, —CF═CF— or —C≡C—, and arbitrary hydrogen is optionally replaced by halogen;

X is a single bond, —COO—, —OCO—, —CH$_2$O—, —OCH$_2$—, —CF$_2$O—, —OCF$_2$— or —CH$_2$CH$_2$—; and mK is an integer of 1-4.

30. The liquid crystal composition of claim 29, wherein the chiral dopant is at least one compound selected from the group consisting of compounds represented by formulae (K4-1) to (K4-6) and (K5-1) to (K5-3)

(K4-1)
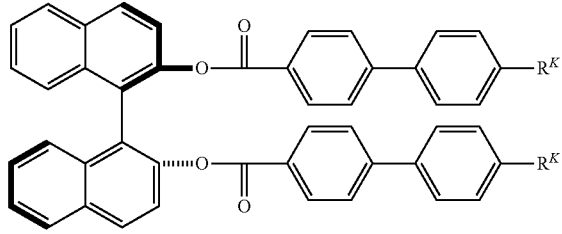

(K4-2)
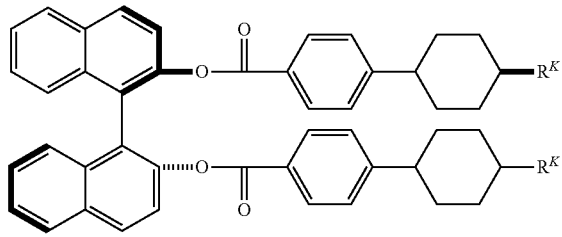

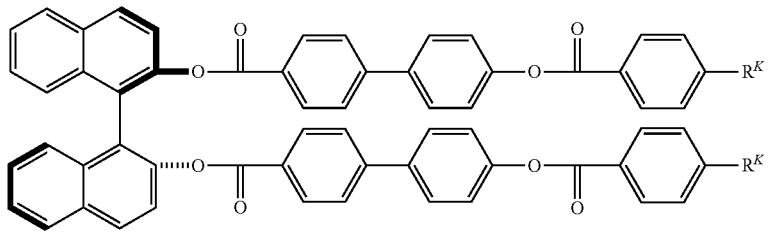
(K4-3)
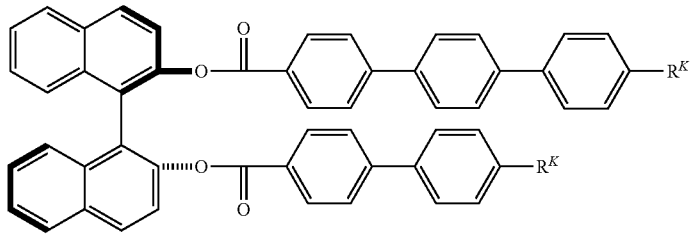
(K4-4)
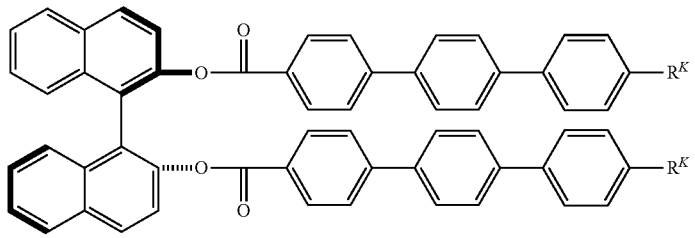
(K4-5)
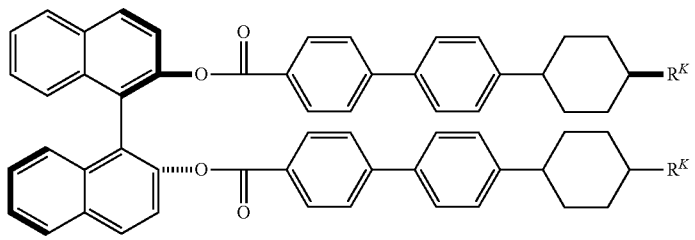
(K4-6)
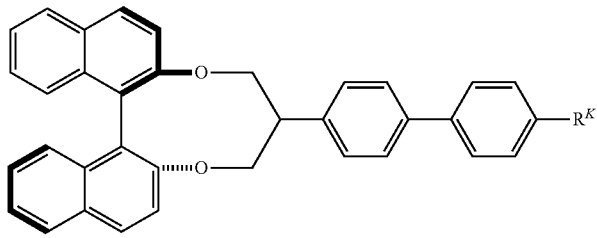
(K5-1)
(K5-2)

(K5-3)

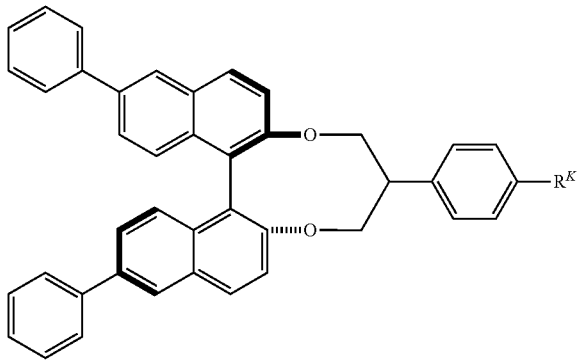

wherein each $R^K$ is independently $C_{3-10}$ alkyl or $C_{3-10}$ alkoxy, and in the alkyl and the alkoxy, arbitrary —$CH_2$— may be replaced by —CH=CH—, and —O— is not adjacent to —C≡C—.

31. The liquid crystal composition of claim 1, which exhibits a chiral nematic phase at any temperature in a range of 70° C. to −20° C. and has a helical pitch of 700 nm or less at a temperature in at least a part of the range of 70° C. to −20° C.

32. The liquid crystal composition of claim 1, further comprising at least one antioxidant, at least one ultraviolet absorbent, or at least one antioxidant and at least one ultraviolet absorbent.

33. A mixture, comprising the liquid crystal composition of claim 1, and a polymerizable monomer.

34. A polymer/liquid crystal composite material, being obtained by polymerizing the mixture of claim 33 and used in a device driven in an optically isotropic liquid crystal phase.

35. A polymer/liquid crystal composite material to be driven in an optically isotropic liquid crystal phase, being obtained by polymerizing the mixture of claim 33 in an isotropic phase or in an optically isotropic liquid crystal phase.

36. An optical device, comprising: two substrates, electrodes disposed on a surface of one or both of the substrates, a liquid crystal medium disposed between the two substrates, and an electric-field applying means for applying an electric field to the liquid crystal medium via the electrodes, wherein the liquid crystal medium is the polymer/liquid crystal composite material of claim 34.

37. An optical device, comprising: two substrates with one or both thereof disposed with electrodes thereon and at least one thereof being transparent, a liquid crystal medium disposed between the two substrates, a polarizer disposed on an outer side of the substrates, and an electric-field applying means for applying an electric field to the liquid crystal medium via the electrodes, wherein the liquid crystal medium is the polymer/liquid crystal composite material of claim 34.

38. The optical device of claim 36, wherein on at least one of the two substrates, the electrodes are constructed in a manner such that the electric field is applied in at least two directions.

39. The optical device of claim 36, wherein the two substrates are arranged parallel to each other, and on one or both of the two substrates, the electrodes are constructed in a manner such that the electric field is applied in at least two directions.

40. The optical device of claim 36, wherein the electrodes are disposed in a matrix form to form pixel electrodes, and each pixel is provided with an active device being a thin film transistor (TFT).

* * * * *